(12) United States Patent
Choyi et al.

(10) Patent No.: US 9,743,280 B2
(45) Date of Patent: Aug. 22, 2017

(54) ENHANCEMENTS TO ENABLE FAST SECURITY SETUP

(71) Applicant: InterDigital Patent Holdings, Inc., Wilmington, DE (US)

(72) Inventors: Vinod K. Choyi, Norristown, PA (US); Yogendra C. Shah, Exton, PA (US); Dolores F. Howry, Malvern, PA (US); Alpaslan Demir, East Meadow, NY (US); Amith V. Chincholi, Sunnyvale, CA (US); Sanjay Goyal, Ozone Park, NY (US); Yousif Targali, Sammamish, WA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 21 days.

(21) Appl. No.: 14/992,681

(22) Filed: Jan. 11, 2016

(65) Prior Publication Data

US 2016/0142915 A1    May 19, 2016

Related U.S. Application Data

(63) Continuation of application No. 13/967,484, filed on Aug. 15, 2013, now Pat. No. 9,237,448.

(Continued)

(51) Int. Cl.
*H04W 12/06*    (2009.01)
*H04W 12/04*    (2009.01)
(Continued)

(52) U.S. Cl.
CPC .......... *H04W 12/06* (2013.01); *H04L 63/061* (2013.01); *H04L 63/08* (2013.01); *H04W 12/04* (2013.01);
(Continued)

(58) Field of Classification Search
None
See application file for complete search history.

(56) References Cited

U.S. PATENT DOCUMENTS

| 8,959,607 B2 | 2/2015 | Yadav et al. |
| 9,237,448 B2 * | 1/2016 | Choyi ............... H04L 63/08 |

(Continued)

FOREIGN PATENT DOCUMENTS

| EP | 1 775 972 | 4/2007 |
| WO | 2013/126859 | 8/2013 |
| WO | 2013/165605 | 11/2013 |

OTHER PUBLICATIONS

Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 9: Interworking with External Networks, IEEE Std. 802.11u-2011 (Feb. 25, 2011).

(Continued)

*Primary Examiner* — Christopher Revak
(74) *Attorney, Agent, or Firm* — Volpe and Koenig, P.C.

(57) ABSTRACT

WTRUs, ARSs, APs, WLG/AAA proxies, networks, and methods thereon are disclosed for fast security setup on a multi-RAT WTRU. Methods of sharing security associations between RATs on a multi-RAT WTRU are disclosed. Methods of caching security associations are disclosed. Methods are disclosed for alerting an ANDSF server of an AP that should be considered for association. Enhancements to advertisements from an AP are disclosed where the advertisements may include SSID with a FQDN, a HESSID type information, or TAI type information. Methods of resolving AP identities to a reachable address are disclosed. An address resolution protocol is disclosed for resolving AP identities. ARSs are disclosed that may resolve a BSSID to (Continued)

a network routable address. Protocols for carrying AP identities and security parameters are disclosed. Methods are disclosed of using ANDSF to provide the WTRU with security information and parameters of an AP. An RSN may indicate security capabilities.

8 Claims, 50 Drawing Sheets

Related U.S. Application Data

(60) Provisional application No. 61/683,569, filed on Aug. 15, 2012, provisional application No. 61/683,827, filed on Aug. 16, 2012.

(51) Int. Cl.
*H04W 12/08* (2009.01)
*H04L 29/06* (2006.01)
*H04W 88/06* (2009.01)
*H04W 84/12* (2009.01)

(52) U.S. Cl.
CPC .............. *H04W 12/08* (2013.01); *H04L 63/18* (2013.01); *H04W 84/12* (2013.01); *H04W 88/06* (2013.01)

(56) References Cited

U.S. PATENT DOCUMENTS

| | | |
|---|---|---|
| 2006/0007897 A1* | 1/2006 | Ishii ............... H04L 12/2856 370/338 |
| 2006/0083200 A1 | 4/2006 | Emeott et al. |
| 2008/0076386 A1 | 3/2008 | Khetawat et al. |
| 2008/0076392 A1 | 3/2008 | Khetawat et al. |
| 2008/0076393 A1 | 3/2008 | Khetawat et al. |
| 2008/0076411 A1* | 3/2008 | Khetawat ............ H04W 24/02 455/432.1 |
| 2008/0076412 A1* | 3/2008 | Khetawat ............ H04W 24/02 455/432.1 |
| 2008/0247368 A1 | 10/2008 | Uppala et al. |
| 2008/0253562 A1 | 10/2008 | Nyberg |
| 2009/0276629 A1* | 11/2009 | Wu .................... H04L 63/0435 713/175 |
| 2011/0122843 A1 | 5/2011 | Iwamura et al. |
| 2012/0147798 A1* | 6/2012 | Miller, II ................. G06K 1/18 370/310 |
| 2012/0183141 A1* | 7/2012 | Hapsari ............... H04L 63/061 380/272 |
| 2012/0250657 A1* | 10/2012 | Zhou .................... H04W 12/06 370/331 |
| 2012/0294275 A1 | 11/2012 | Krishnaswamy et al. |
| 2014/0341182 A1* | 11/2014 | Gage .................... H04W 12/04 370/331 |

OTHER PUBLICATIONS

Draft Standard for Information Technology—Telecommunications and information exchange between systems—Local and metropolitan area networks—Specific requirements Part 11: Wireless LAN Medium Access Control (MAC) and Physical Layer (PHY) Specifications Amendment 7: Fast Initial Link Setup, IEEE P802.11ai/D0.4 (Jan. 2013).
IEEE Standard for Information Technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2007 (Jun. 12, 2007).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems—Local and metropolitan area networks—Specific requirements; Part 11: Wireless LAN Medium Access Control (MAC) and Physical Layer (PHY) specifications; Amendment 6: Medium Access Control (MAC) Security Enhancements, IEEE Std. 802.11i-2004 (Jul. 2004).
IEEE Standard for Local and metropolitan area networks, Port-Based Network Access Control, IEEE Std 802.1x-2004 (Dec. 2004).
Mockapetris, "Domain Names—Implementation and Specification," Network Working Group, Request for Comments: 1035 (Nov. 1987).
Prasad et al., "Roaming Key based Fast Handover in WLANs," IEEE Wireless Communications and Networking Conference, vol. 3, pp. 1570-1576 (Mar. 2005).
Third Generation Partnership Project, "Technical Specification Group Core Network and Terminals; Access to the 3GPP Evolved Packet Core (EPC) via non-3GPP access networks; Stage 3 (Release 8)," 3GPP TS 24.302 V8.10.0 (Sep. 2011).
Third Generation Partnership Project, "Technical Specification Group Core Network and Terminals; Access to the 3GPP Evolved Packet Core (EPC) via non-3GPP access networks; Stage 3 (Release 9)," 3GPP TS 24.302 V9.7.0 (Sep. 2011).
Third Generation Partnership Project, "Technical Specification Group Core Network and Terminals; Access to the 3GPP Evolved Packet Core (EPC) via non-3GPP access networks; Stage 3 (Release 10)," 3GPP TS 24.302 V10.7.0 (Mar. 2012).
Third Generation Partnership Project, "Technical Specification Group Core Network and Terminals; Access to the 3GPP Evolved Packet Core (EPC) via non-3GPP access networks; Stage 3 (Release 11)," 3GPP TS 24.302 V11.3.0 (Jun. 2012).
Third Generation Partnership Project, "Technical Specification Group Core Network and Terminals; Access to the 3GPP Evolved Packet Core (EPC) via non-3GPP access networks; Stage 3 (Release 11)," 3GPP TS 24.302 V11.7.0 (Jun. 2013).
Third Generation Partnership Project, "Technical Specification Group Core Network and Terminals; Access to the 3GPP Evolved Packet Core (EPC) via non-3GPP access networks; Stage 3 (Release 12)," 3GPP TS 24.302 V12.1.0 (Jun. 2013).
Third Generation Partnership Project, "Technical Specification Group Core Network and Terminals; Access Network Discovery and Selection Function (ANDSF) Management Object (MO) (Release 8)," 3GPP TS 24.312 V8.6.0 (Jun. 2012).
Third Generation Partnership Project, "Technical Specification Group Core Network and Terminals; Access Network Discovery and Selection Function (ANDSF) Management Object (MO) (Release 9)," 3GPP TS 24.312 V9.3.0 (Jun. 2012).
Third Generation Partnership Project, "Technical Specification Group Core Network and Terminals; Access Network Discovery and Selection Function (ANDSF) Management Object (MO) (Release 10)," 3GPP TS 24.312 V10.6.0 (Jun. 2012).
Third Generation Partnership Project, "Technical Specification Group Core Network and Terminals; Access Network Discovery and Selection Function (ANDSF) Management Object (MO) (Release 11)," 3GPP TS 24.312 V11.3.0 (Jun. 2012).
Third Generation Partnership Project, "Technical Specification Group Core Network and Terminals; Access Network Discovery and Selection Function (ANDSF) Management Object (MO) (Release 11)," 3GPP TS 24.312 V11.6.0 (Mar. 2013).
Third Generation Partnership Project, "Technical Specification Group Core Network and Terminals; Access Network Discovery and Selection Function (ANDSF) Management Object (MO) (Release 12)," 3GPP TS 24.312 V12.1.0 (Jun. 2013).
Wong et al., "Proposed TGah Draft Amendment," IEEE P802.11 Wireless LANs, IEEE 802.11-13/0500r0 (May 2013).

\* cited by examiner

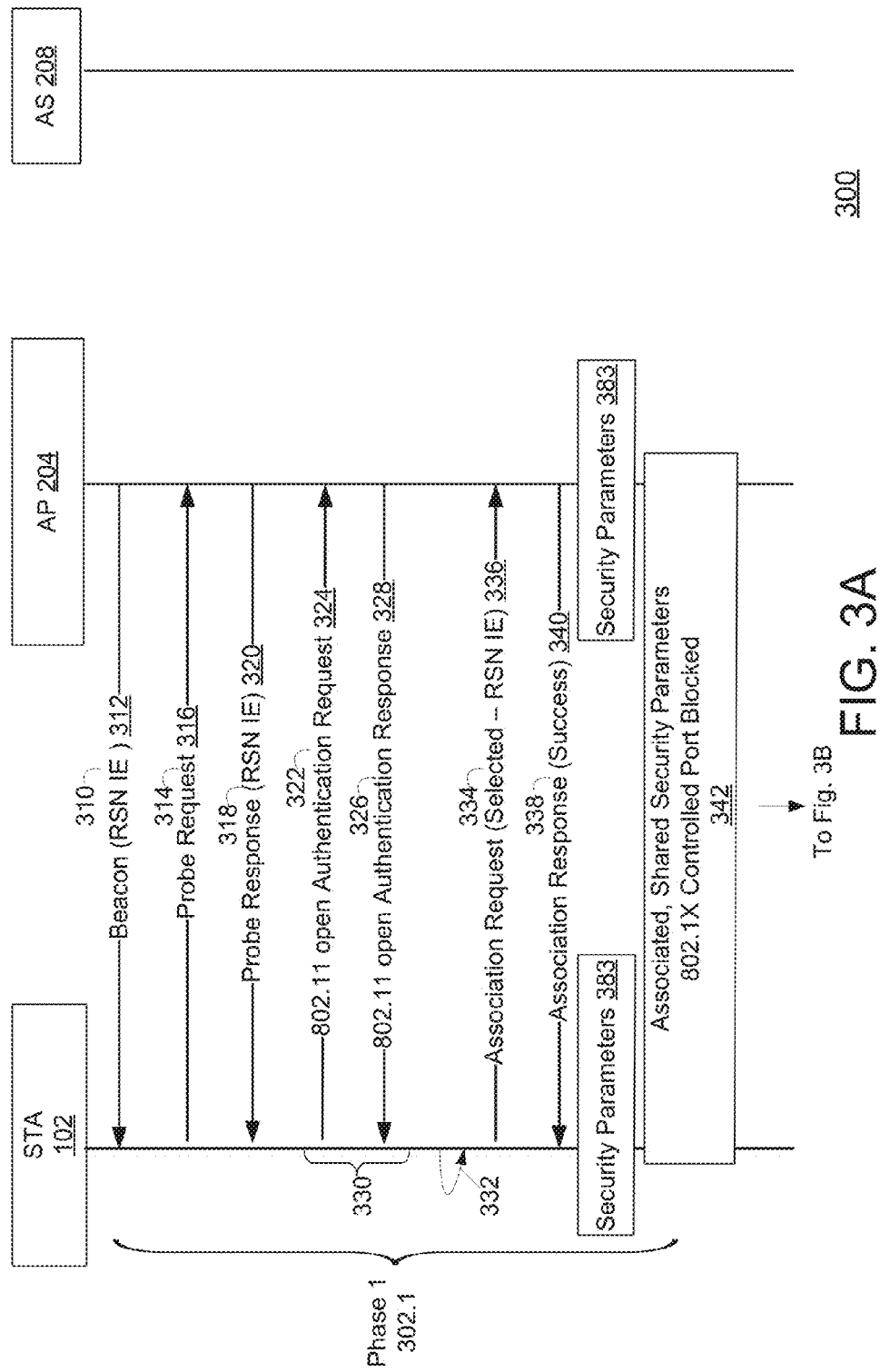

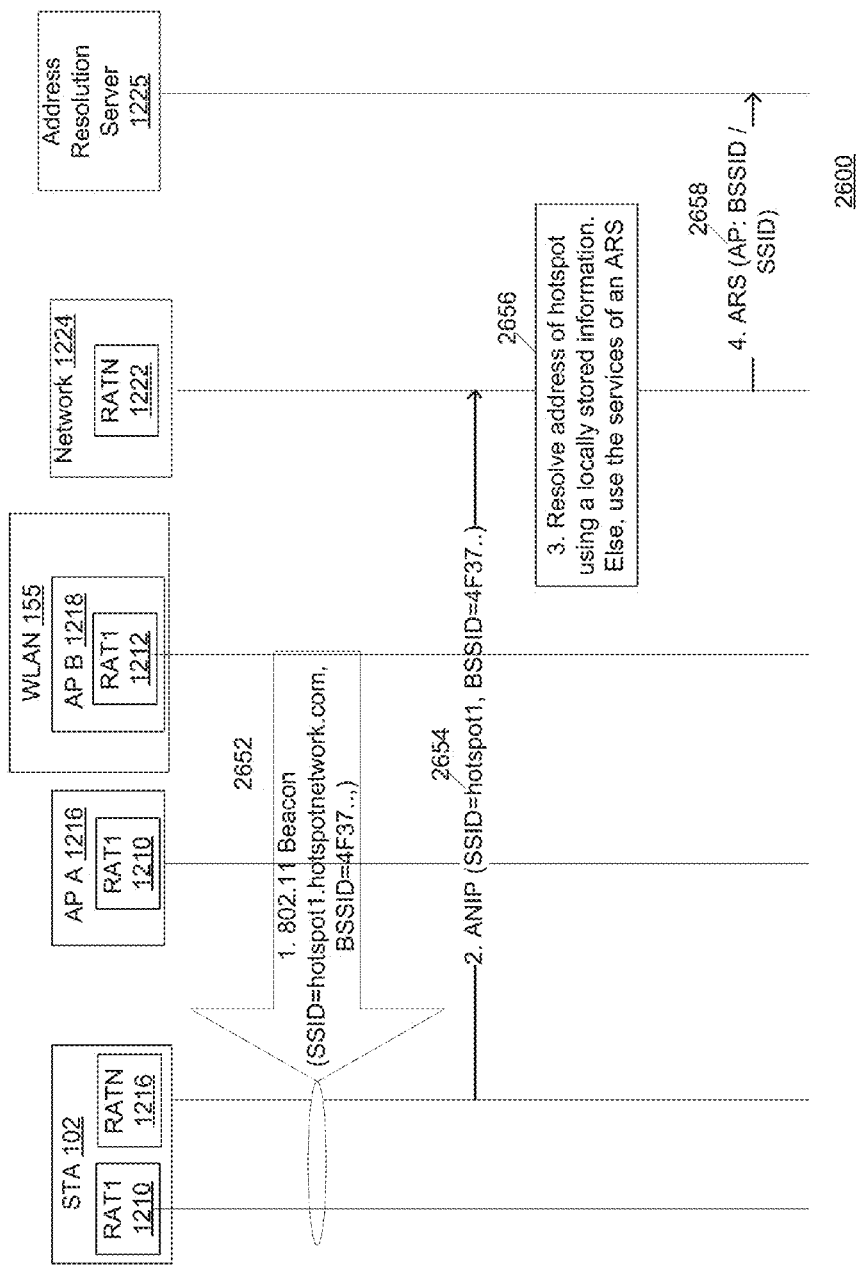

| Element ID | Length | Capabilities |
|---|---|---|
| 2702 | 2704 | 2706 |

Octets: 1  1  n

FIG. 27  2700

| SND Element ID | Length | Domain Name field | Length | NAI Realm Count (optional) | NAI Realm Data #1 (optional) | ... | NAI Realm Data #N (optional) | HESSID (optional) |
|---|---|---|---|---|---|---|---|---|

Octets: 1  1  m  1  2804  2804  ...  2804  2806
                              0 or 1   0 or n       0 or n    0 or 6

FIG. 28

| NAI Realm Data Field Length | NAI Realm Encoding | NAI Realm Length | NAI Realm | EAP Method Count | EAP Method #1 (optional) | ... | EAP Method #N (optional) |
|---|---|---|---|---|---|---|---|

Octetes: 2  1  1  variable  1  variable  ...  variable 2904  2902

FIG. 29  2900

| Element ID | Length | Version | Group Data Cipher Suite | Pairwise Cipher Suite Count | Pairwise Cipher Suit List |
|---|---|---|---|---|---|
| 1 | 1 | 2 | 4 | 2 | 4xm |

Octets

Continued →

| AKM SUITE COUNT | AKM Suite List | RSN Capabilities | PMKID Count | PKMID List | Group Management Cipher Suit |
|---|---|---|---|---|---|
| 2 | 4xn | 2 | 2 | 16xs | 4 |

Continued ←

Octets

| OUI | Suite Type |
|---|---|
| 3 | 1 |

Octets

| EID | Length | Version | Group Data Cipher Suite | Pairwise Cipher Suite Count | Group Management Cipher Suit | → Continued |
|---|---|---|---|---|---|---|
Octets: 1 | 1 | 2 | 4 | 2 | 4xm |

Continued →

| AKM SUITE COUNT | AKM Suite List | RSN Capabilities | RSN Count | PKMID List | Group Management Cipher Suit |
|---|---|---|---|---|---|
Octets: 2 | 4xn | 2 | 2 | 16xs | 4

ENHANCEMENTS TO ENABLE FAST SECURITY SETUP

CROSS REFERENCE TO RELATED APPLICATIONS

This application is a continuation of U.S. Pat. No. 9,237,448, filed on Aug. 15, 2013, which claims the benefit of U.S. Provisional Patent Application No. 61/683,569, filed on Aug. 15, 2012, and U.S. Provisional Patent Application No. 61/683,827, filed on Aug. 16, 2012, the entire contents of which are hereby incorporated by reference herein.

BACKGROUND

Secure communications is often used between a wireless network and a wireless device. The wireless device may be a device such as a cellular telephone, computer, tablet, or other wireless devices that communicates with the wireless network. Often to establish secure communications an establishment procedure is followed that may include exchanging messages between the wireless network and the wireless device. The establishment procedure results in providing the wireless network and the wireless device with authentication, integrity, and encryption keys to secure communicate. However, the establishment procedure takes time, and users of the wireless devices continue to demand faster and faster devices.

SUMMARY

A method of fast security setup on a multi-RAT wireless transmit/receive unit (WTRU) is disclosed. The method may include a WTRU receiving identity information of a second access point (AP) from at least one of a beacon frame from the second AP, a probe response frame from the second AP, or an access network discovery and selection function (ANDSF) server message from a network. The WTRU and the network may communicate using at least one of a first AP or a base station. The method may include the WTRU sending the identity information of the second AP and security parameters of the WTRU to the network. The WTRU and the network may have an existing security association. The method may include the network resolving the identity information to a network routable address. The method may include the network sending to the second AP a master session key and at least one of a temporary identification of the WTRU or a permanent identification of the WTRU. The method may include the WTRU and the second AP performing a fast security setup. The second AP may use the master session key received from the network.

A method on a multi-RAT wireless transmit/receive unit (WTRU) of establishing secure communications is disclosed. The method may include determining security parameters for the WTRU to use for the secure communications using a first RAT with a first access point (AP). The method may include authenticating the WTRU with the first AP, wherein authenticating generates a pairwise master key (PMK). The method may include determining temporal keys to use for the secure communication. The method may include using at least one of: the determined security parameters, the PMK, or the determined temporal keys, for establishing secure communications between a second RAT of the multi-RAT WTRU and at least one of the first AP or a second AP.

A method of fast security setup on a multi-RAT wireless transmit/receive unit (WTRU) is disclosed. The method may include associating with a first AP having a first RAT. The method may include authenticating the WTRU using the first AP with a network. The WTRU authenticating may generate a master key on the WTRU and on the network. The method may include discovering a second AP having a second RAT. The method may include sending identity information of the second AP to the network. The method may include using the master key for establishing secure communications with the second AP.

A protocol for carrying wireless local area network identity and security parameters is disclosed. Enhancements to advertisements from AP are disclosed. Methods of resolving WLAN identities to reachable addresses are disclosed.

BRIEF DESCRIPTION OF THE DRAWINGS

A more detailed understanding may be had from the following description, given by way of example in conjunction with the accompanying drawings wherein:

FIGS. 3A, 3B, 3C, and 3D schematically illustrate a method for establishing secure communications;

FIGS. 26A and 26B illustrate a method for transporting identity and security capability information according to some disclosed embodiments;

FIG. 27 is a diagram of the extended capabilities element format;

FIG. 28 is a diagram of the SND element format;

FIG. 29 is a diagram of the NAI Real Data field format;

FIG. 34 is a diagram of the RSNE format;

FIG. 35 is a diagram of the suite selector format; and

FIG. 36 illustrates a RSN IE with an AKM suite list according to some disclosed embodiments.

DETAILED DESCRIPTION

Figure 1A:
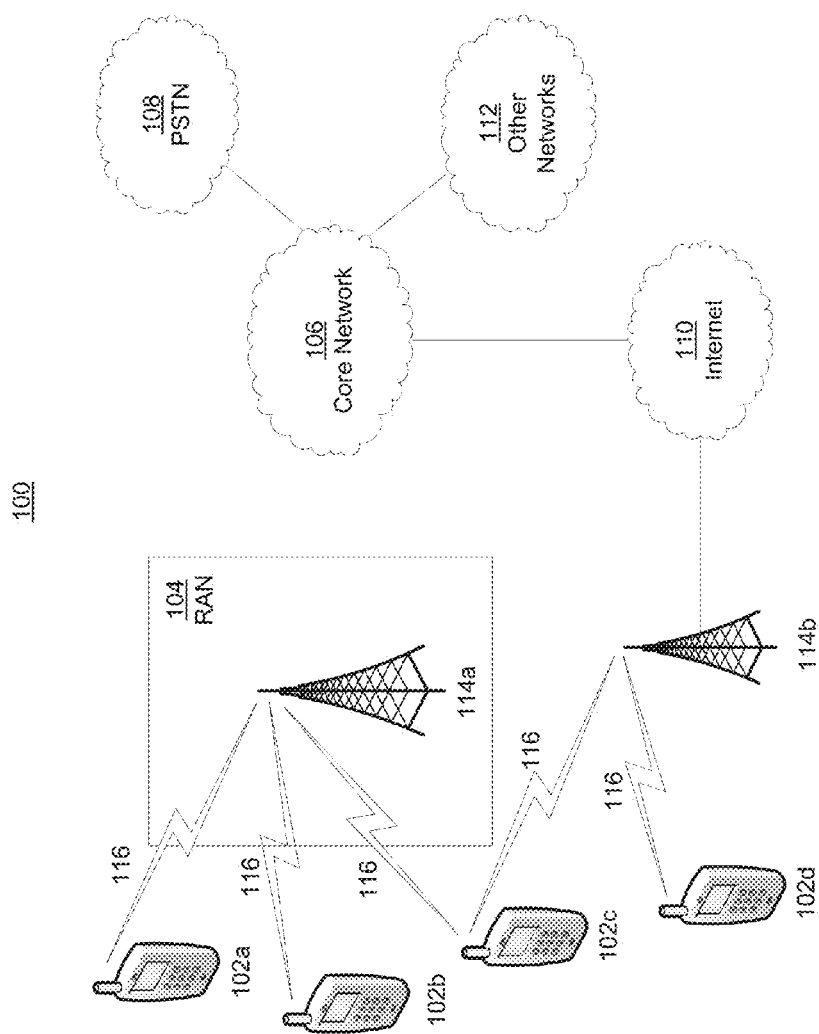
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as Institute of Electrical and Electronic Engineers (IEEE) 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
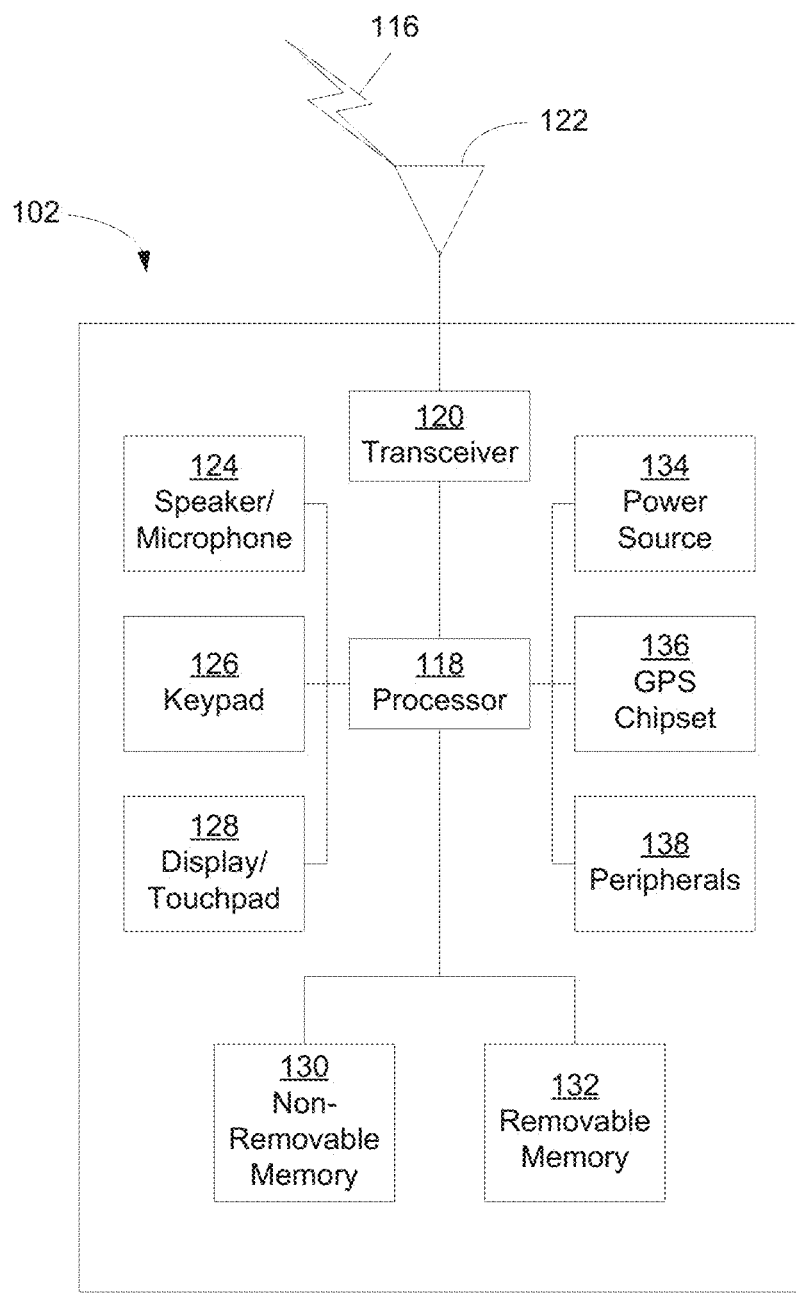
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
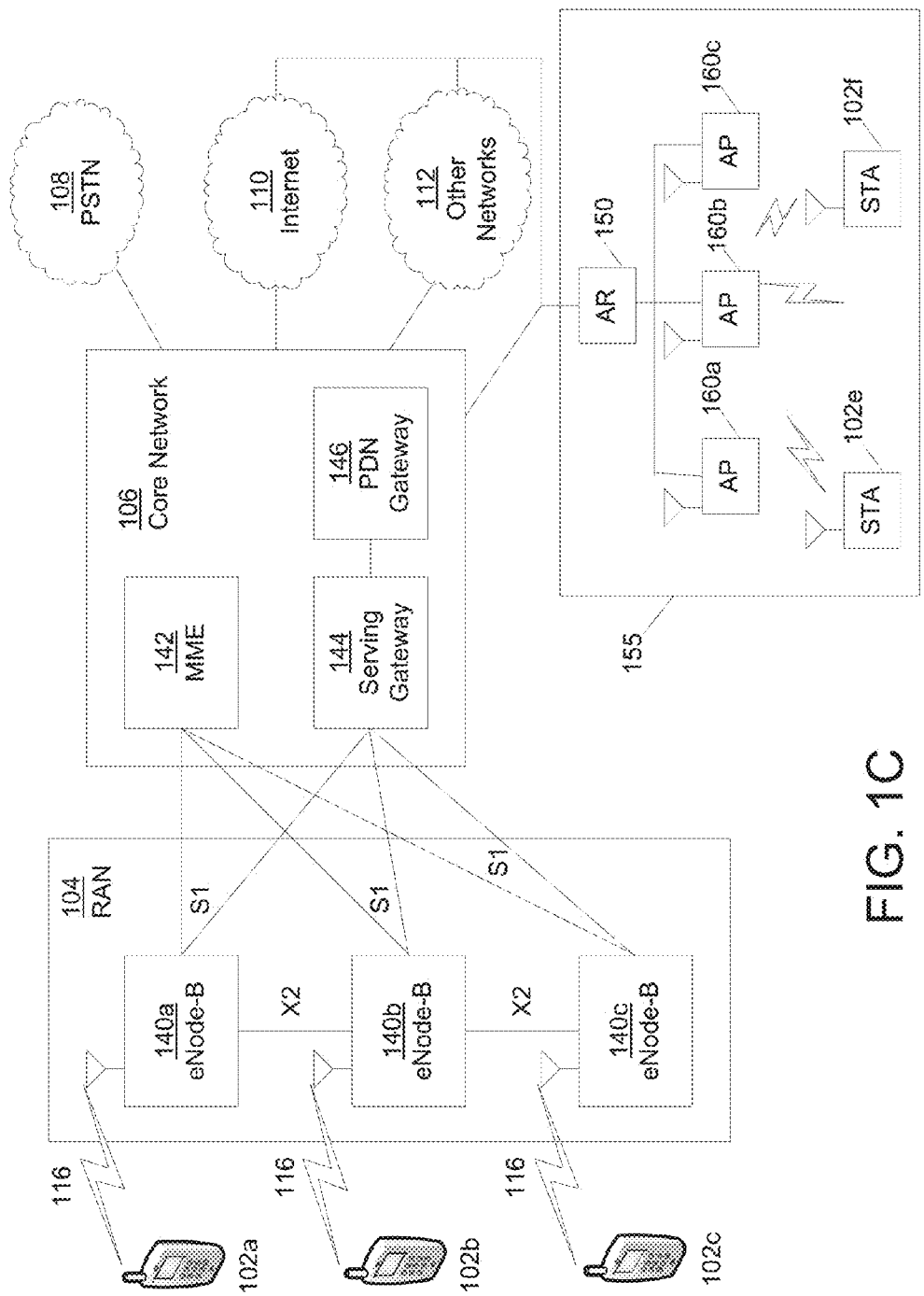
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode-Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode-B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices. An access router (AR) 150 of a wireless local area network (WLAN) 155 may be in communication with the Internet 110. The AR 150 may facilitate communications between APs 160a, 160b, and 160c. The APs 160a, 160b, and 160c may be in communication with STAs 170a, 170b, and 170c. A STA 170 may be a wireless device such as WTRU 102.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the other networks 112, which may include other wired or wireless networks that are owned and/or operated by other service providers.

In some embodiments, the WTRU 102 may be a device that generates data such as a water meter, inventor detector, door sense, temperature sensor, video camera, etc.

Figure 2:
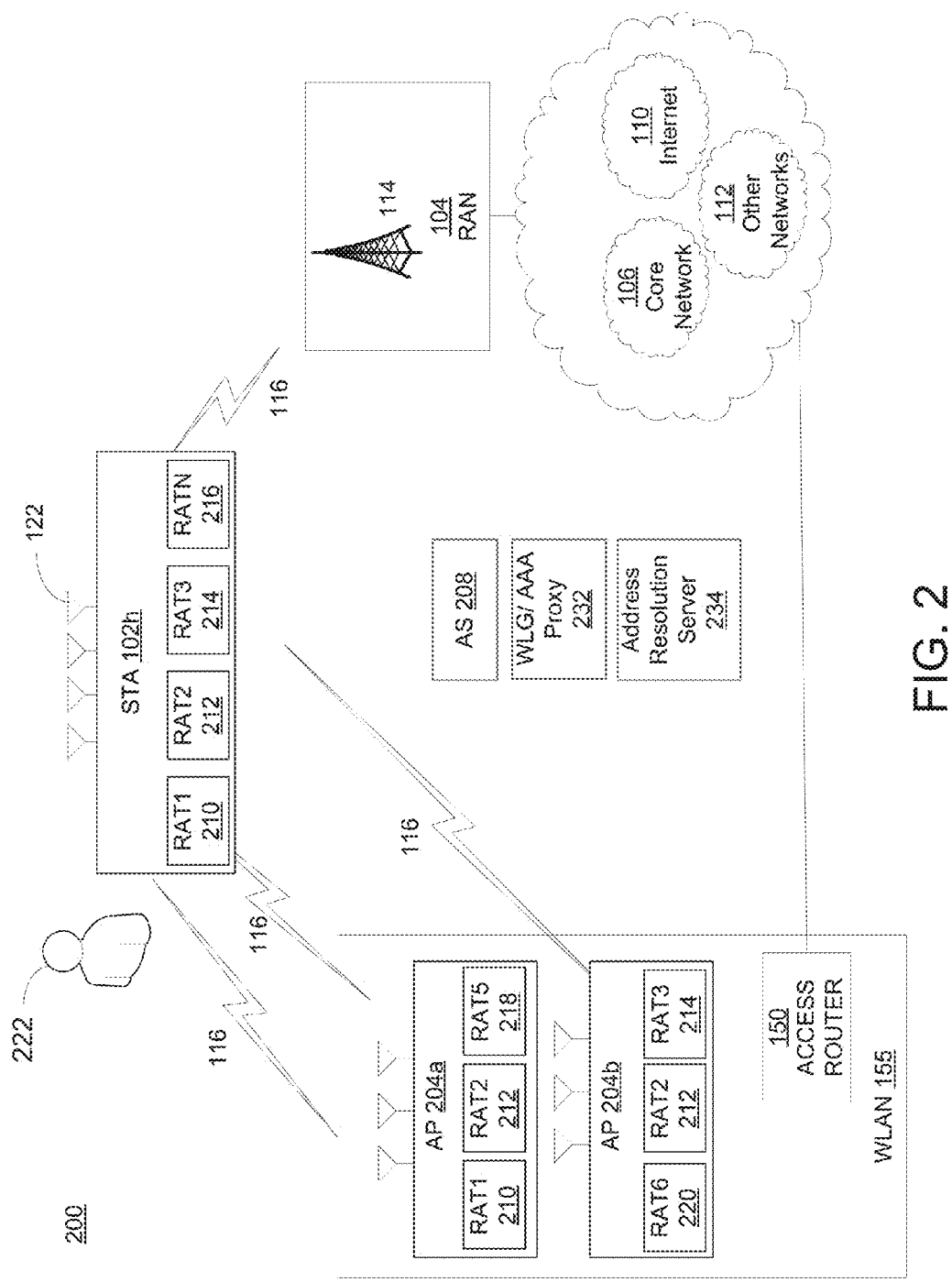
FIG. 2 illustrates a network and wireless local area network according to an embodiment.

FIG. 2 illustrates an example network 200 in which one or more disclosed embodiments may be implemented.

Illustrated in FIG. 2 is a STA 102h, a user 222, a WLAN 155, an authentication server (AS) 208, a Wireless local area network (LAN) Gateway (WLG) WLG controller function and/or authentication, authorization and accounting (AAA)-proxy entity (WLG/AAA proxy) 232, an address resolution server 234, a core network 106, the Internet 110, other networks 112, RAN 104.

The STA 102h may be a multi-RAT STA 102h. The STA 102h may include one or more transmit/receive elements 122. The RATs 210, 212, 214, 216 of STA 102h may all use one or more of the same transmit/receive elements 122 or different transmit/receive elements 122.

The AP 204a may be a multi-RAT AP. The AP 204a may include one or more transmit/receive elements 122. The RATs 210, 212, 218 of AP 204a may all use one or more of the same transmit/receive elements 122 or different transmit/receive elements 122.

The AP 204b may be a multi-RAT AP. The AP 204b may include one or more transmit/receive elements 122. The RATs 220, 212, 214 of AP 204b may all use one or more the same transmit/receive element 122 or different transmit/receive elements 122.

As illustrated, RAT1 210 of STA 102h may be associated with RAT1 210 of AP 204a. RAT2 212 of STA 102h may be associated with RAT2 212 of AP 204a. RAT3 214 of STA 102h may be associated with RAT3 214 of AP 204b. RATN 216 of of STA 102h may be associated with base station 114.

Base station 114 may be in association with RATN 216 using RATN 114. For example, RAT N may be LTE. RAT1 210 may be 802.11b, RAT2 212 may be 802.11n, and RAT3 214 may be 802.11ab. The RATs may be other radio access technologies such as Bluetooth, etc.

The AS 208 may be part of the WLAN 155, core network 106, Internet 110, or other network 112. The AS 208 may be in communication with STA 102h, WLAN 155, and base station 114.

The address resolution server 234 may be part of the WLAN 155, core network 106, Internet 110, or other network 112. The address resolution server 234 may be in communication with one or more of STA 102h, WLAN 155, and base station 114.

The WLG/AAA proxy 232 may be part of the WLAN 155, core network 106, Internet 110, or other network 112. The WLG/AAA proxy 232 may be in communication with one or more of STA 102h, WLAN 155, and base station 114.

The WLAN 155 may include the WLG/AAA proxy 232 and may be considered a hotspot network according to IEEE 802.11u.

FIGS. 3A, 3B, 3C, and 3D schematically illustrate a method 300 for establishing secure communications. FIGS. 3A, 3B, 3C, and 3D illustrate a STA 102, an AP 204, and an access server (AS) 208. In some embodiments, the STA 102 may be an 802.1X supplicant, and the AP 204 may an 802.1X authenticator. In some embodiments, the STA 102 and the AP 204 may be a mesh association where there may not be a distinction between a supplicant and an authenticator. In some embodiments, the method 300 for establishing secure communications may be a Robust Security Network Association (RSNA) establishment procedure as described in Institute of Electrical and Electronic Engineers (IEEE) 802.11i. FIGS. 3A, 3B, 3C, and 3D illustrate four phases 302 that comprises the method 300.

FIG. 3A illustrates phase one 302.1, which may be a discovery and association phase. In phase one 302.1 the STA 102, AP 204, and, in some embodiments the AS 208, may determine security parameters 383 to use. Example security parameters 383 include parameters such as whether to use 802.1X, pre-shared key (PSK), counter mode with cipher block chaining message authentication code (CBC-MAC) protocol (CCMP), or a temporal key integrity protocol (TKIP). Pre-authentication capabilities may also be determined for phase one 302.1.

The method 300 may begin with the AP 204 sending a beacon 312 at 310. The beacon 312 may include security capabilities supported by the AP 204. The security capabilities 312 may be included in a robust security network (RSN) information element (RSNIE), which may be included in the beacon 312. In some embodiments, a beacon 312 that includes a RSNIE may be in response to a request (not illustrated) from the STA 102.

In some embodiments, the method 300 may include the STA 102 sending 314 a probe request 316. The probe request 316 may include a request for the AP 204 to send security capabilities supported by the AP 204. The AP 204 may respond to the probe request 316 by sending 318 a probe response 320 that includes security capabilities supported by the AP 204. In some embodiments, the response 320 includes a RSNIE which includes the security capabilities of the AP 204.

In addition, or alternatively, in some embodiments, a protocol at 330 with messages 324, 328 may be used. The STA 102 may send 322 an 802.11x open authentication request 324. The term 802.11x may be used to refer to different protocols definitions of IEEE 802.11. For example, 802.11x may refer to 802.11a, 802.11b, 802.11g, 802.11-2007, 802.11n, 802.11-2012, 802.11ac, 802.11ad, and others that may be defined by IEEE or proprietary standards.

The AP 204 may respond by sending 326 an 802.11x open authentication response 328. The messages 324, 328 may be an open authentication method used to exchange security information. In some embodiments, the protocol 330 is compatible with protocols prior to the use of IEEE 802.11x RSN. If the protocol 330 is used, then the method 300 may continue to phase two 302.2.

The method 300 may continue at 332 with the STA 102 determining a set of security capabilities that are supported by both the STA 102 and the AP 204 based on the received security capabilities of the AP 204.

The method 300 may continue with the STA 102 sending 334 the selected security capabilities to the AP. For example, the STA 102 may send 334 an association request 336. The association request 336 may include an RSNIE 336 that includes the determined security capabilities 336.

The method 300 may continue with the AP 204 sending 338 an association response 340. The association response 340 may include an indication of whether or not the association was successful. As illustrated at 342 the association was successful. The association between the STA 102 and AP 204 result in security parameters 383 that the STA 102 and AP 204 will use for secure communications. In some embodiments, the AP 204 will block the association request 336, if the AP 204 determines it is not a good match between the security capabilities of the AP 204 and the STA 102. In some embodiments, the STA 102 may determine not to send the association request 336. In some embodiments, the STA 102 may refuse the association response 340. The STA 102 may determine not to associate with the AP 204. For example, the STA 102 may determine that the AP 204 is a rogue AP 204, or that another entity (not illustrated) is inserting frames into one or more of the messages 312, 316, 320, 324, 328, 336, 340.

At the conclusion 342 of phase one 302.1, the STA 102 and AP 204 may be associated with security parameters 383. In some embodiments, a controlled port of 802.1X may be blocked, which may indicate that secure communications between the STA 102 and the AP 204 have not yet been established.

Figure 3B:
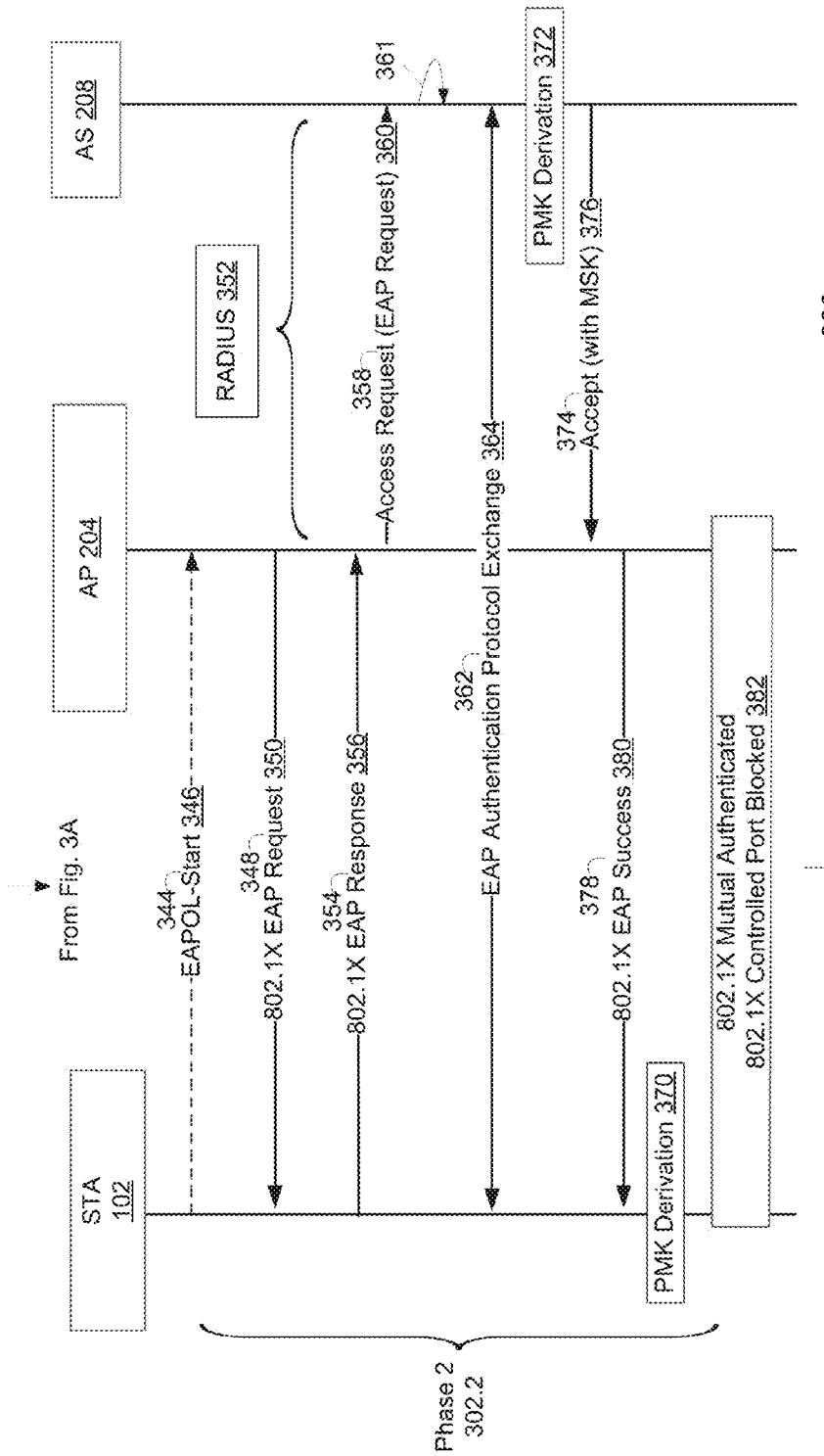

FIG. 3B illustrates phase two 302.2, which may be an authentication phase. For example, in some embodiments, phase two 302.2 is a IEEE 802.1X authentication process based on Extensible Authentication Protocol (EAP), in which the STA 102, which would be an IEEE 802.1X supplicant, and the AP 204, which would be an IEEE 802.1X authenticator, perform an authentication protocol with the authentication server (AS) 208, which would be an IEEE 802.1X authentication server, where the AP 204 relays messages back and forth between the STA 102 and the AS 208.

Phase two 302.2 may include several message transfers between the STA 102 and the AS 208 that pass through the AP 204. In some embodiments, one or more messages in phase two 302.2 between the STA 102 and the AP 204 may use extensible authentication protocol (EAP) over local area network (LAN) (EAPOL). In some embodiments, one or more messages in phase two 302.2 between the AP 204 and the AS 208 may use Remote Authentication Dial In User Service (RADIUS) 352 to transport EAP or EAPOL messages.

Phase two 302.2 of method 300 may begin with the STA 102 sending 344 an EAPOL-start message 346. The EAPOL-start 346 may be an indication that the STA 102 wants to start the authentication process. In some embodiments, the STA 102 does not send the EAPOL-start message 346.

The method 300 may continue with the AP 204 sending 348 an 802.1X EAP request 350. The 802.1X EAP request message 350 may be a message that indicates the STA 102 should identify itself for authentication.

The method 300 may continue with the STA 102 sending 354 an 802.1X EAP response 356. The 802.1X EAP response message 356 may include identity information regarding the STA 102.

The method 300 may continue with the AP 204 sending 358 an access request (Radius request) 360. The access request (Radius request) message 360 may include the identity information regarding the STA 102.

The method 300 may continue at 361 with the AS 208 determining the type of authentication required.

The method 300 may continue at 362 with EAP authentication protocol exchange 364. The EAP authentication protocol exchange 362 may include one or more messages. The EAP authentication protocol exchange 364 may include certificate exchanges and other information exchanges that may be based on challenge/response, which is used to authenticate the STA 102 and also optionally authenticate the AS 208.

If the authentication is successful, the AS 208 may derive a Master Session Key (MSK) out of which a Pair-wise Master Key (PMK) at 372 may be determined. The method 300 may continue with the AS 208 sending 374 accept message 374. The accept message 376, which may include the MSK and the PMK, may accept the authentication of STA 102. Since, in some embodiments, the PMK is extracted out of the MSK, the terms MSK and PMK may be used interchangeably. The AS 208 may transfer the MSK/PMK securely to the AP 204. The AP 204 may store a received MSK that may be received from the AS 208.

The method 300 may continue with the AP 204 sending 378 802.1X EAP success 380. The 802.1X EAP success message 380 may indicate to the STA 102 that authentication is successful.

The STA 102 and the AS 208 may have authenticated each other and generated a common key, which may be referred to as the Master Session Key (MSK). The STA 102 uses the MSK to derive a Pairwise Master Key (PMK) 370

Successful completion of EAP authentication over IEEE 802.1X may establishes a PMK at the supplicant, which in this case is STA 102. The Authenticator, which in this case is the AP 204, receives the PMK when the AS 208 completes authentication. The PMK may be a portion of the master session key (MSK). The Authenticator, which in some embodiments is the AP 204, creates a PMK security association (PMKSA) using the PMK. The PMKSA may be cached. If the Supplicant and Authenticator lose synchronization with respect to the PMKSA, then phase three 302.3 may fail.

Alternatively, or additionally, phase two 802.2 may be completely or partially skipped, if the STA 102 and the AP 204 are configured using a static pairwise static key (PSK.) The STA 102 and the AP 204 may use the PSK to derive the PMK, so that phase two 802.2 may be skipped. The PSK is often stored on the STA 102 and AP 204 and is often the same for all STAs 102 so that a PSK may not be as secure as IEEE 802.1X authentication.

PSKs may be used for home and small network applications in order to avoid phase two 802.2, which may be an IEEE 802.1X authentication process. However, for enterprise and large networks, phase two 802.2 IEEE 802.1X is often used. After obtaining the PMK successfully, both the STA 102 and AP 204 use the PMK for security association. This PMK Security Association (PMKSA) is created by the STA's 102 Station Management Entity (SME) (not illustrated) when EAP authentication is completed successfully or the PSK has been configured.

The PMKSA is created by the AP's 204 SME when the PMK has been created from the keying information transferred from the AS 208 or when the PMK has been derived from the PSK. The PMKSA is used to create the Pairwise Transient Key (PTK) Security Association (PTKSA), which is disclosed in phase three 302.3. PMKs and PMKSAs may be cached for their lifetime, which may be a parameter of the PMK.

The PMKSA comprises the following elements: (1) the PMK identification (PMKID) that is derived from the PMK and which includes the authenticator's media access control (MAC) address, the station's MAC address, and the security association; (2) the authenticator's MAC address; (3) the PMK; (4) lifetime of the PMKSA, (5) the Authentication and Key Management Protocol (AKMP); (5) and all authorization parameters specified by the AS 208 or the local configuration, which can include parameters such as the STA's 102 authorized service set identifier (SSID).

In some embodiments, EAP authentication occurs through the IEEE 802.1X uncontrolled port on the AP 204. Non-EAP data frames may be passed or blocked via the IEEE 802.1X controlled port depending upon the success or failure of IEEE 802.1X authentication using the EAP. This process may be referred to as port-based access control. Using this concept, IEEE 802.1X achieves the objective of blocking access for unauthorized parties in an IEEE 802.11 WLAN 202.

The method 300 may continue with phase three 302.3, which may be called the four-way hand shake. Phases three 302.3 and phase four 302.4 may be for key generation and distribution at both the STA 102 and the AP 204. Temporary keys may be created and updated during phase three 302.3 and/or phase hour 302.4 in order to improve secure data communication.

Phase three 302.3 may begin with the PMK known 384, 386. Both the STA 102 and the AP 204 may have the PMK stored prior to the start of phase three 302.3. The STA 102 and the AP 204 may know the PMK by, for example, deriving the PMK from phase two 302.2 802.1X authentication, by using a PSK, or by reusing a cached PMK.

Phase three 302.3 may continue with the AP 204 sending 388 message 1 EAPOL-key 390. Message 1 390 may contain information for the STA 102 to derive the PTK at 392. For example, message 1 390 may be an EAPOL-Key (0,0,1,0,P,0,0,ANonce,0,DataKD_M1), where ANonce, which may be a random or pseudo-random value contributed by the AP 204 for the STA 102 to generate the PTK. DataKD_M1 may be 0 or the PMKID of a PMK for PTK generation.

Phase three 302.3 may continue with the STA 102 deriving the PTK 392. For example, the STA 102 may derive the PTK using the information in message 1 390, PMK, and information derived at the STA 102. For example, the PTK may be derived from the PMK, which may be a fixed string, the Service Set identification (SSID) of the STA 102, the MAC address of the AP 204, which may be referred to as the authenticator address (AA), the MAC address of the STA 102, which may be referred as supplicant address (SPA), the ANonce, and the SNonce, where SNonce may be a random or pseudo-random value contributed by the STA 102. For example, the following may be used:

PTK=PRF-X (PMK, "Pairwise key expansion", Min (AA, SPA)||Max (AA, SPA)||Min (ANonce, SNonce)||Max (ANonce, SNonce)).

PRF-X may be a pseudo random function to generate a vector of length X, where the value of X depends on the required data confidentiality and integrity protocol with larger X's providing more data security, but larger messages. PTK may comprise 512 bits for TKIP and 384 bits for CCMP. Part of the PTK may be used for encryption of all unicast data frames. Several keys may be extracted from PTK for different purposes such as a temporary key that is used for data encryption. A key hierarchy illustrated in FIG. 5.

The method 300 may continue with the STA 102 sending 394 message 2: EAPOL 396. Message 2 396 may include information such as (0,1,0,0,P,0,0,SNonce,MIC,DataKD_M2), where SNonce is a random or pseudo-random value contributed by the STA 102 to generate the PTK and DataKD_M2=RSNIE for creating PTK generation. Other information may be included in message 2 396.

The method 300 may continue with the AP 204 deriving the PTK 398. In some embodiments, the PTK 398 and PTK 392 must be the same and if the AP 204 determines that the PTK 392, 398 do not match, then the AP 204 may de-authenticate the STA 102.

The method 300 may continue with generating a GTK and encrypting the GTK with the PTK 399.

The method 300 may continue with the AP 204 sending 400 message 3 402. Message 3 402 may include EAPOL-Key(1,1,1,1,P,0,KeyRSC,ANonce,MIC,DataKD_M3), where ANonce is the same value as in message 1 390 and DataKD_M3=RSNIE, which may be the same as in the AP's 204 beacon/probe response frame's RSNIE. The STA 102 may verify that a RSNIE in message 3 402 is the same as a RSNIE sent to the AP 204 by the STA 102 in message 336 (FIG. 3A) and perform de-authentication if the two RSNIE do not match.

Optionally, a second RSNIE that is the AP's 204 pairwise cipher suite assignment may be included in message 3 402. If this second RSNIE is used by the AP 204, then this pairwise cipher suite will be used for encryption. DataKD_M3=GTK [N] may be the encrypted Group Transient Key (GTK).

The method 300 may continue with the STA 102 sending 404 message EAPOL 406. Message 4 406 may include EAPOL-Key(1,1,0,0,P,0,0,0,MIC,DataKD_M4) where DataKD_M4=0. Message 4 406 may include an acknowledgement of the received GTK. The method 300 may continue with install PTK 408, 410, and install GTK 409, 411. Both the STA 102 and the AP 204 may install the PTK and the GTK for secure data communication.

At the end of phase three 302.3 both the STA 102 and the AP 204 may have the PTK installed 408, 410. At the end of phase three 302.3 both the STA 102 and the AP 204 may have the GTK installed 409, 411.

Phase three 302.3 may perform the following: (1) confirming the PMK, (2) ensuring derivation of a fresh PTK, (3) synchronizing the installation of the PTK in the AP 204 and the STA 102, (4) generating a GTK at the AP 204, (5) transferring and installing the GTK at the STA 102 from the AP 204, and (6) confirming the cipher suite selection.

After stage three 302.3, the PTK security association (PTKSA) and the GTK security association (GTKSA) are created at both the STA 102 and the AP 204. The PTKSA will be used to protect unicast data, and the GTKSA will be used to protect multicast and broadcast data. The PTKSA may consist of the following elements: (1) PTK, (2) pairwise cipher suite selector (3) the STA 102 MAC address, and (4) the AP's MAC address.

After phase three 302.3 the IEEE 802.1X controlled port may be unblocked for actual data communication 412. After phase three 302.3 the AP 204 and the STA 102 may communicate using secure data transmission by using a cipher suite such as TKIP or CCMP where the encryption and decryption may be performed using the PTKSA and GTKSA.

Figure 3C:
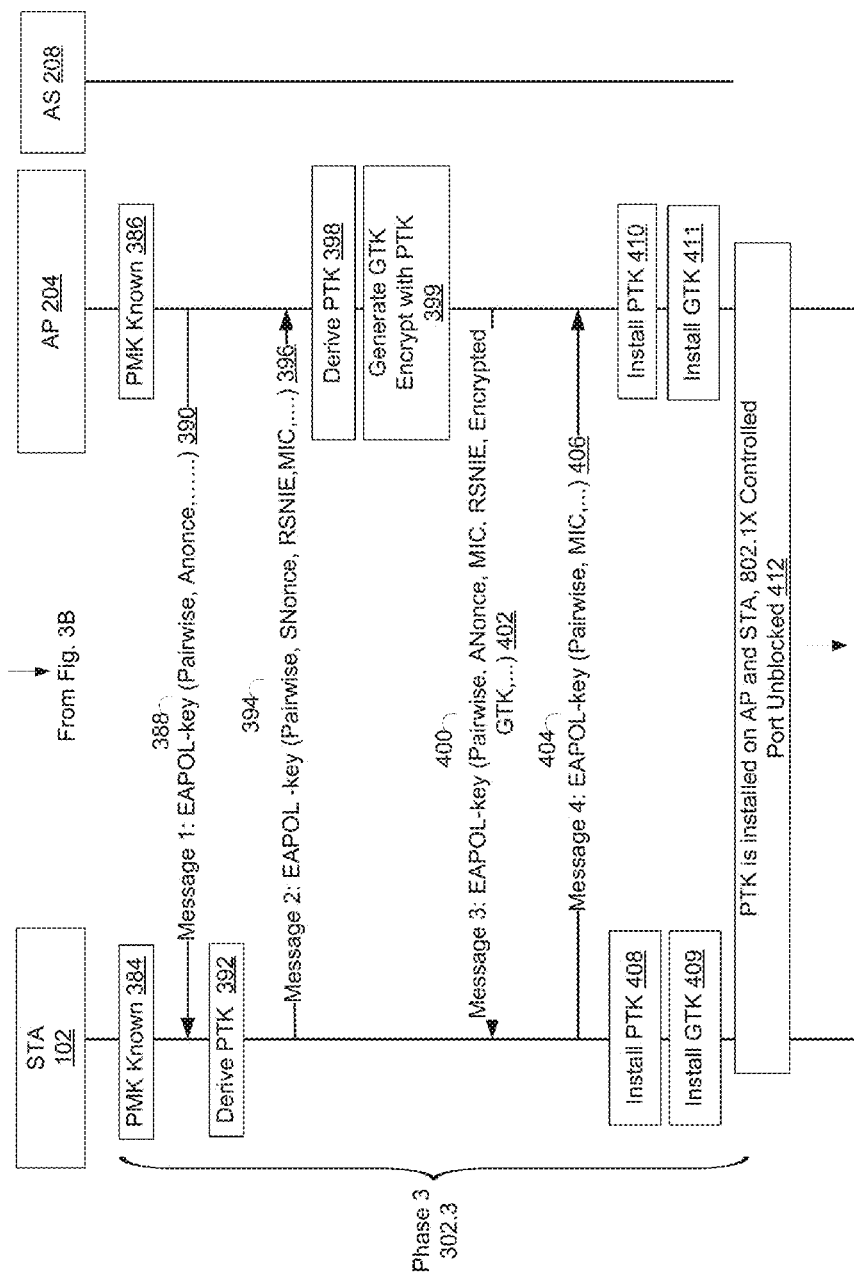
Figure 3D:
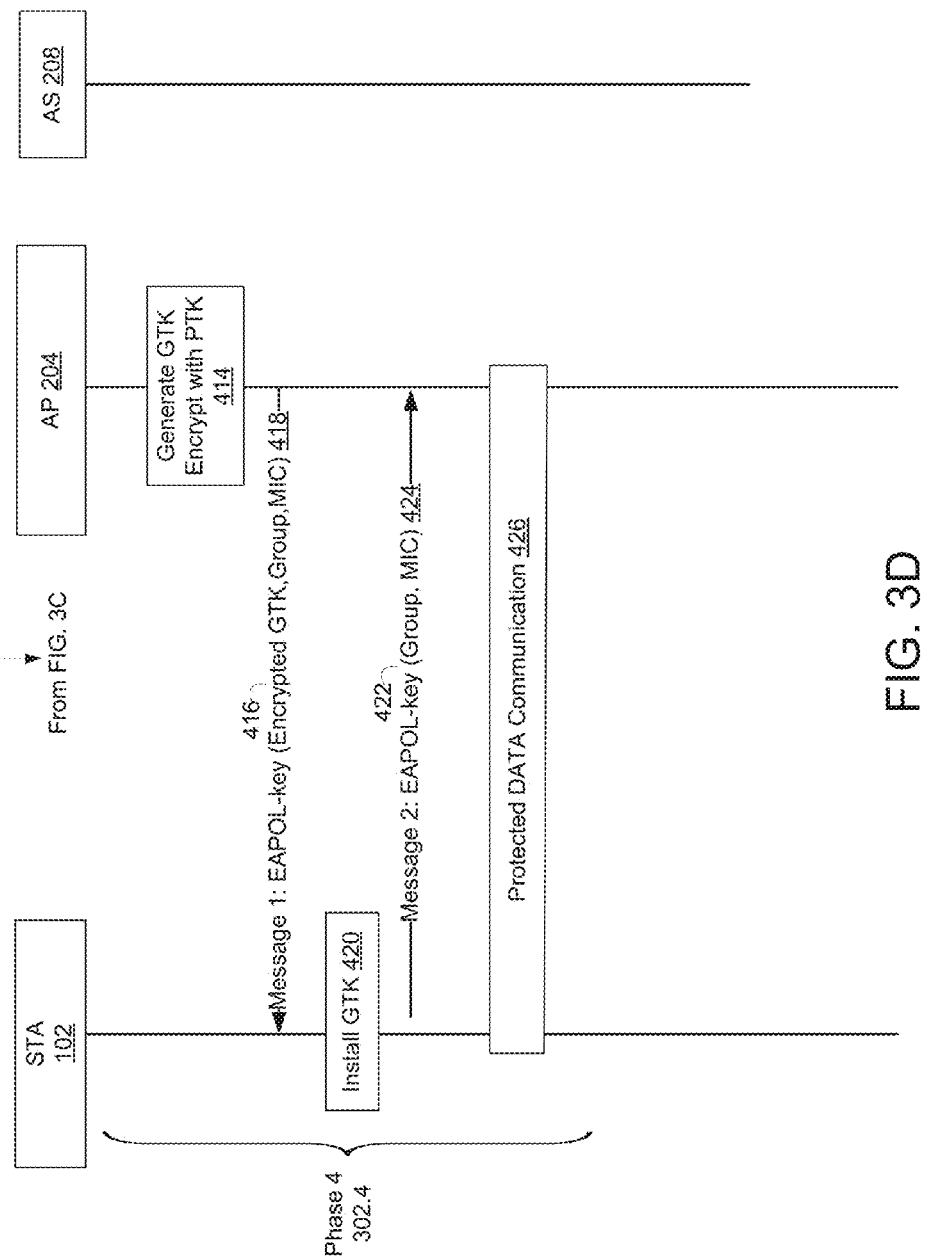

FIG. 3D schematically illustrates phase four 302.4, which may be called the group key handshake, and which may update the GTK with a fresh GTK. The GTK may already have been distributed to the STA 102 in phase three 302.3. Phase four 302.4 may be used to refresh the GTK.

The method 300 may continue with the AP 204 generating 414 a GTK and encrypting the generated GTK with the PTK. For example, the GTK may be generated by the AP 204 by using the MAC address of the AP 204, which may be called the authenticator address (AA), the group master key (GMK), which may be generated at the AP 204, a fixed string, and a random number, which may be called GNonce. For example, the following may be used to generate the GTK. GTK=PRF-X (GMK, "Group key expansion"||AA-||GNonce). X may be the length of GTK, which may be 256 bits for TKIP and which may be 128 bits for CCMP. A temporal key may be generated from the GTK as described in conjunction with FIG. 4.

The method 300 may continue with the AP 204 sending 416 the GTK to the STA 120 in message 1 418 The AP 204 may use key confirmation key (KCK) and key encryption key (KEK), which are parts of PTK as an encryption key, to send 416 the message 1 418 with GTK. The GTK message 418 may include EAPOL-Key(1,1,1,0,G,0,Key RSC,0, MIC,GTK[N]), where GTK[N] is encrypted GTK.

The method 300 may continue with the STA 102 installing the GTK 420.

The method 300 may continue with the STA 102 sending 422 message 2 422. Message 2 424 may be an EAPOL-key message 424, which may include EAPOL-Key(1,1,0,0,G,0, 0,0,MIC,0). The EAPOL-key message 424 may be an acknowledgement message of message 1 418.

At the end of phase four 302.4 the STA 102 and AP 204 may communicate with protected data communication 426. The term security setup may refer to one or more of phase 1, phase 2, phase 3, and phase 3, additionally, security setup may include determining an identification of an AP and sending information regarding the AP to the network 1224 (see FIG. 12.) Additionally, the term fast security setup may be used to refer to the network 1224 and/or other network entities such as address resolution server 1225, WLG/AAA 1221, or access server 1220 resolving an address of the AP and sending the AP information regarding a security setup. Additionally, fast security setup may refer to any of the methods, apparatuses, computer readable media, or data structures that are described herein, and more particularly that are described in conjunction with FIGS. 2-36.

Figure 4:
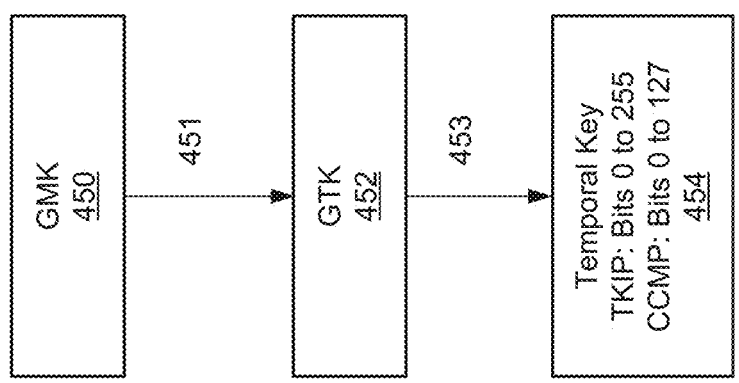
FIG. 4 schematically illustrates the generation of a group temporal key GTK.

FIG. 4 illustrates the generation of a group temporal key GTK 452. An AP 204 may have a group master key (GMK) 450 stored. The AP 204 may generate 451 a GTK 452 using the following expression: GTK=PRF-X (GMK, "Group key expansion"||AA||GNonce), where X is the length of GTK, which is 256 bits for TKIP and 128 bits for CCMP, AA is the authenticator address which may be the MAC address of the AP, and GNonce may be a random number.

For example, the AP 204 may generate 451 a GTK at step 414 of FIG. 3D and step 399 of FIG. 3C. The station management entity (SME) of the STA 204 or AP 204 may generate 453 a temporal key 454 in order to encrypt or decrypt a group message.

The SME of the AP 204 may change the GTK 452 of the AP 204 after the AP 204 has sent the GTK 452 to all STAs 102 with which it has a PTKSA. A GTK security association (GTKSA) consists of the following elements: (1) direction vector (whether the GTK 450 is used for transmit or receive), (2) group cipher suite selector, (3) GTK 452, (4) MAC address of the AP 204, (5) and all authorization parameters specified by local configuration, which can include parameters such as the authorized Service set identification (SSID) of the STA 102.

Figure 5:
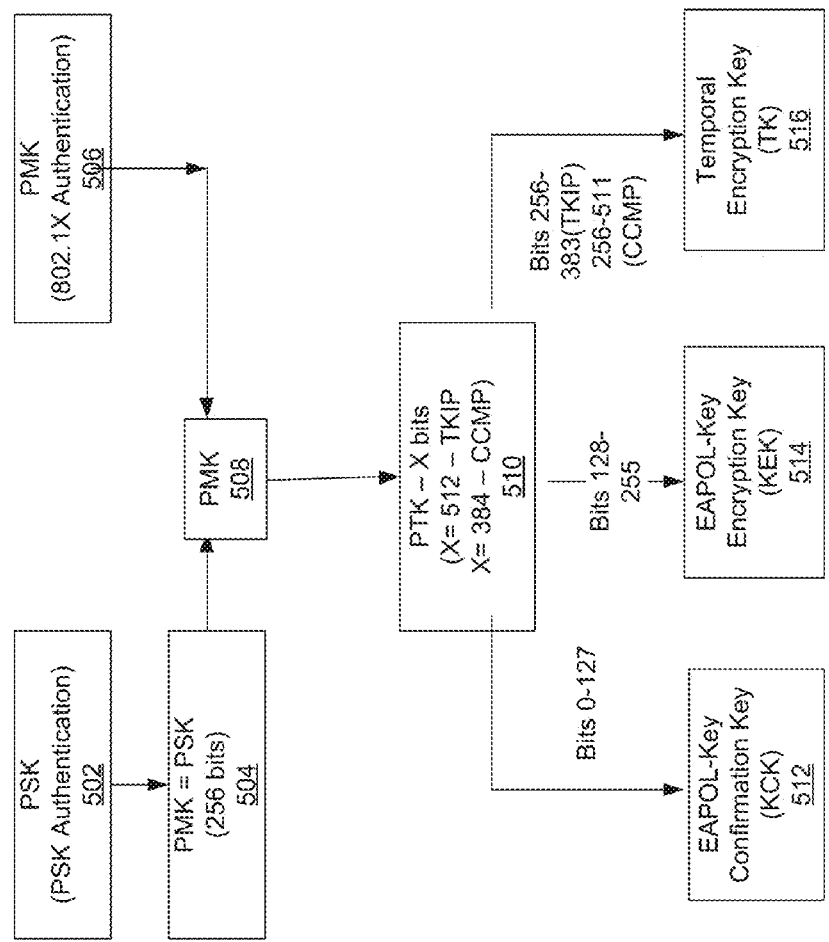
FIG. 5 schematically illustrates the derivation of security keys according to some disclosed embodiments.

FIG. 5 illustrates a security key hierarchy according to some disclosed embodiments. PMK 508 may be derived from at least one of a pre-shared key (PSK) 502 or an 802.1X authentication 506. The PSK 502 may be a password that is stored at the STA 102 and the AP 204. Each STA 102 may have the same PSK 502. The pairwise master key (PMK) 508 may be derived from the PSK 502 at 504. The 802.1X authentication 506 may be a process that includes an access server 232 and that generates the PMK 508.

The pairwise temporal key (PTK) may be derived from the PMK 508 as follows: PTK=PRF-X (PMK, "Pairwise key expansion", Min (AA, SPA)||Max (AA, SPA)||Min (ANonce, SNonce)||Max (ANonce, SNonce)). RF-X may mean a pseudo random function to generate a vector of length X, where X depends on the required data confidentiality and integrity protocol. AA may be the MAC address of the authentication server. PTK 510 may be 512 bits for TKIP and 384 bits for CCMP. Part of the PTK 510 may be used for encryption of all unicast data frames. Several keys may be further extracted from PTK 510 for different purposes. For example, an EAPOL-Key confirmation key (KCK) 512 may be extracted from bits 0-127 of the PTK 510. EAPOL-Key 514 may be extracted from bits 128-255 of the PTK 510. Temporal encryption key (TK) may be extracted from bits 256-383 of the PTK for TKIP and bits 256-511 for CCMP.

Figure 6:
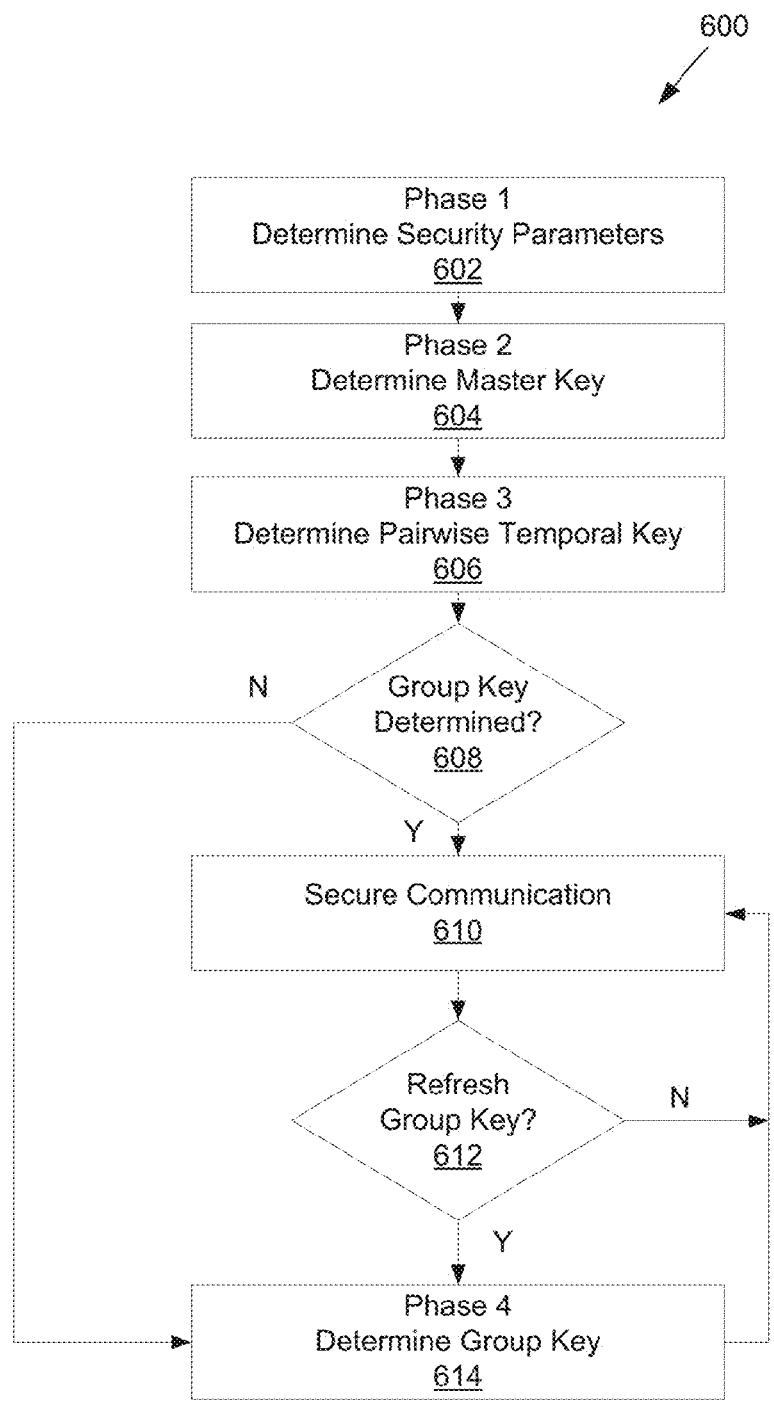
FIG. 6 schematically illustrates a method for fast security setup according to some disclosed embodiments.

FIG. 6 illustrates a method for fast security setup according to some disclosed embodiments. The method 600 may begin at 602 with phase 1 determining security parameters 602. For example, as described in conjunction with FIG. 3A, the STA 102 and AP 204 may determine a set of security parameters 383. Alternatively, or additionally, security parameters may be determined as described in conjunction with FIGS. 8A and 8B. For example, the security parameters of a STA 102 may be sent from the STA 102 to a network 1224 and then the network 1224 may send the security parameters to an AP 1216, 1218.

Figure 9:
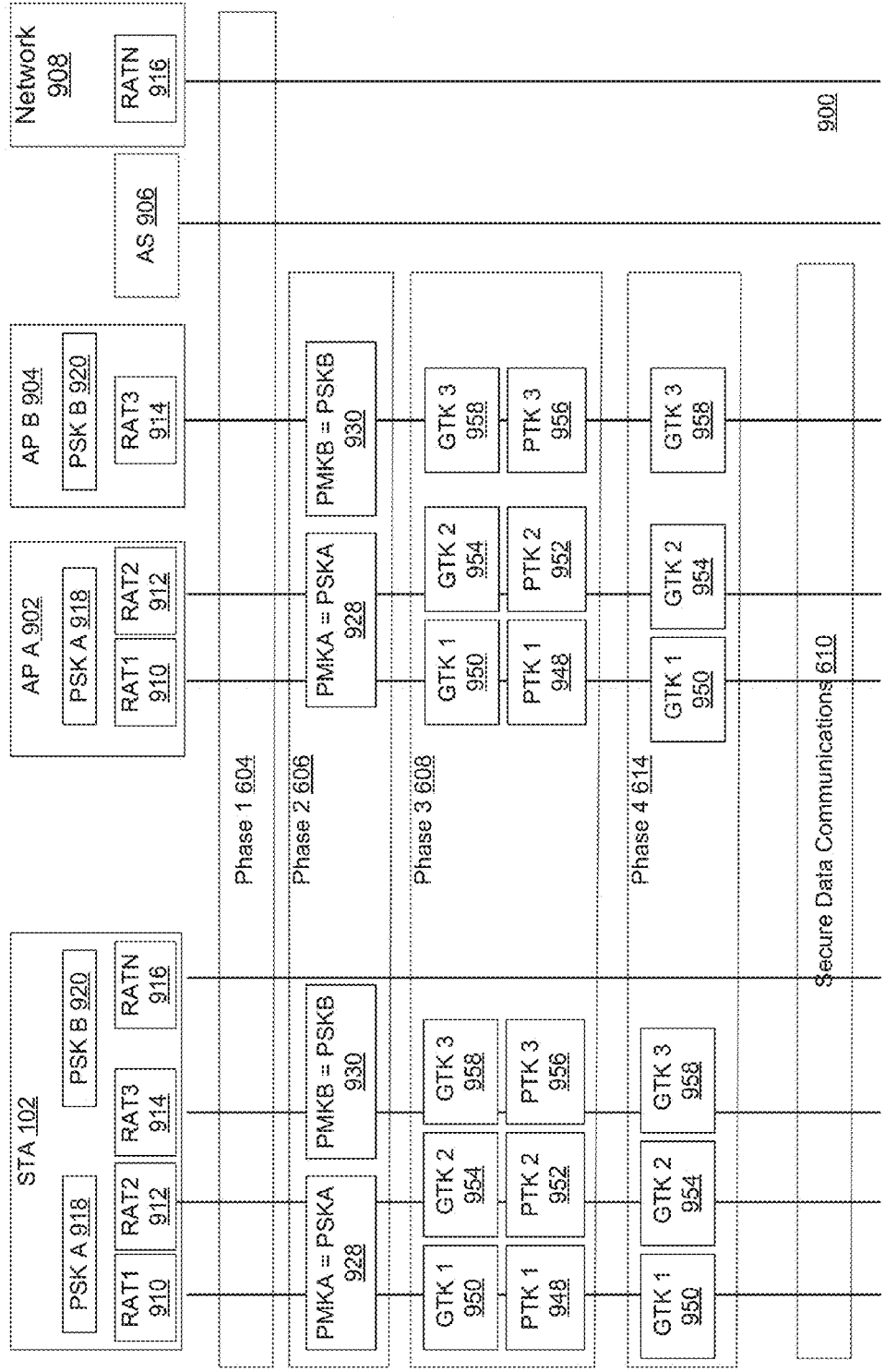
FIG. 9 schematically illustrates a method for fast security setup.

Alternatively, or additionally, security parameters may be determined as described in conjunction with FIG. 9. Alternatively, or additionally, security parameters may be determined as described in conjunction with FIG. 10A. Alternatively, or additionally, security parameters may be determined as described in conjunction with FIG. 11A. Alternatively, or additionally, security parameters may be determined as described in conjunction with FIG. 12A. Alternatively, or additionally, security parameters may be determined as described in conjunction with FIG. 13.

Figure 14A:
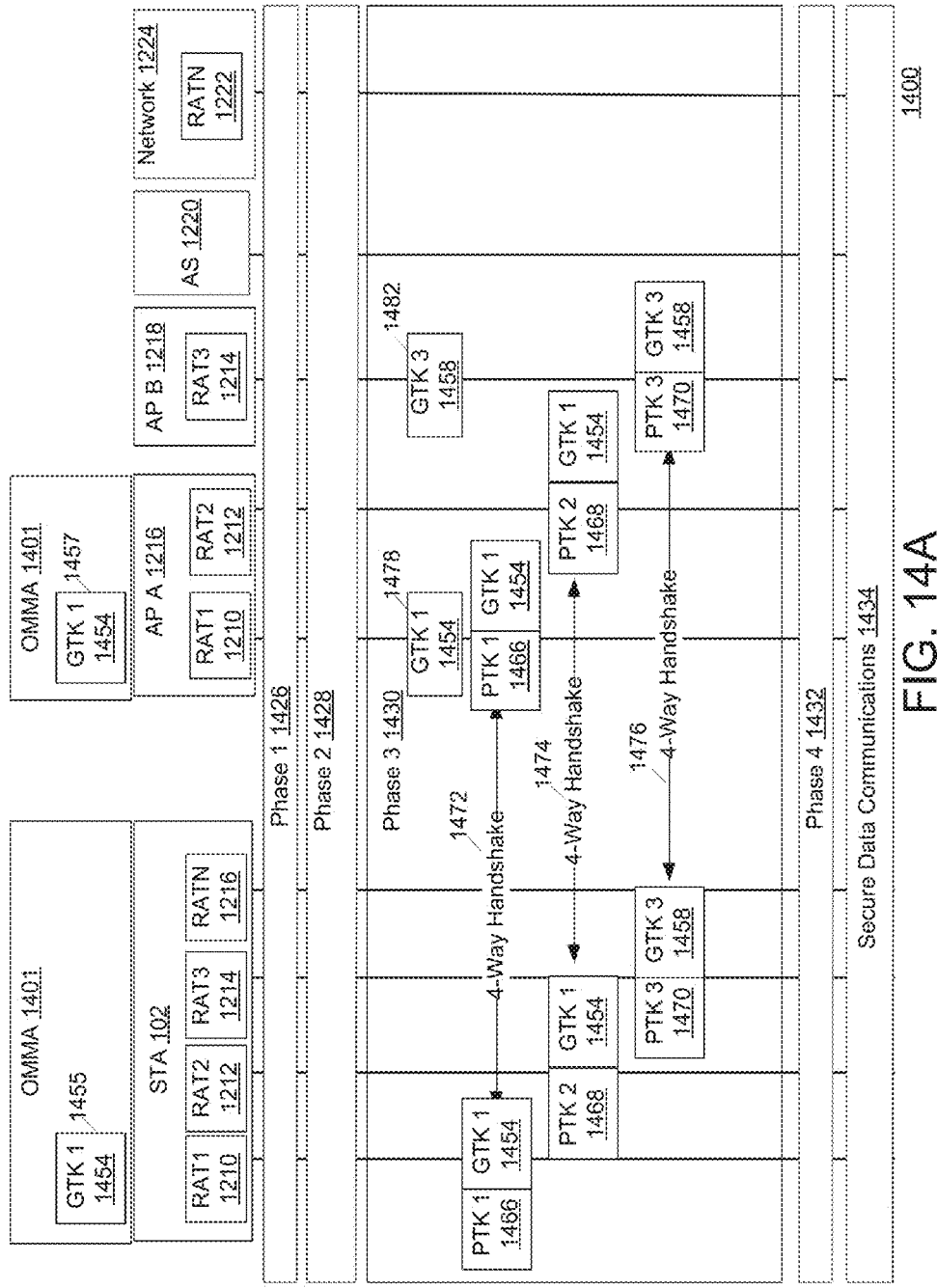
FIGS. 14A and 14B schematically illustrate a method for fast security setup.

Alternatively, or additionally, security parameters may be determined as described in conjunction with FIG. 14A. Alternatively, or additionally, security parameters may be determined as described in conjunction with FIG. 15.

Figure 16A:
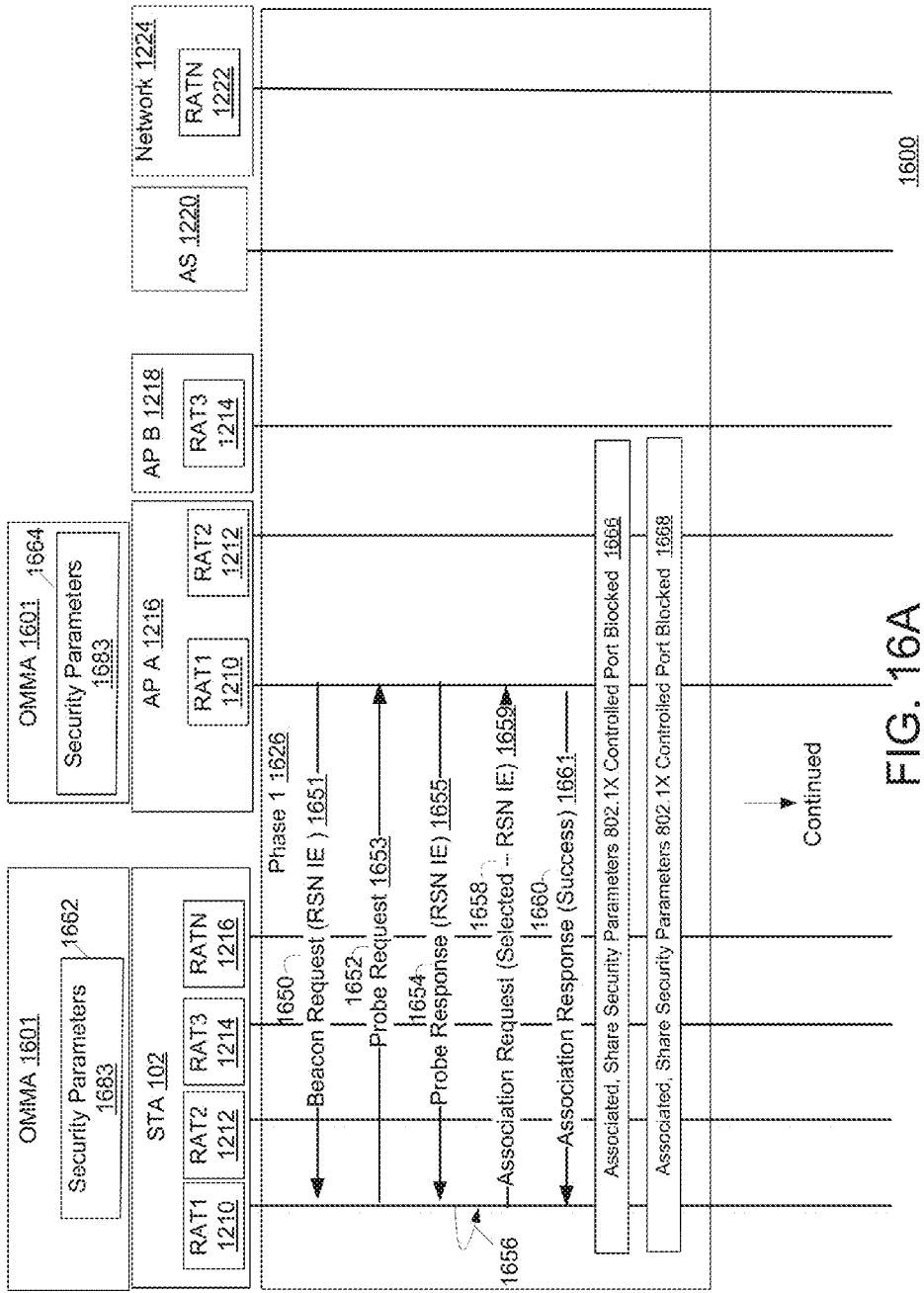
FIGS. 16A, 16B, and 16C illustrate a method for fast security setup.

Alternatively, or additionally, security parameters may be determined as described in conjunction with FIG. 16A where two or more RATs of a multi-RAT device may share the same security parameters. The security parameters may be determined by only one of the two or more RATs that are sharing the security parameters. In some embodiments, the RATs that share the security parameters may have the same MAC address. Alternatively, or additionally, security parameters may be determined as described in conjunction with FIG. 16B. Alternatively, or additionally, security parameters may be determined as described in conjunction with FIG. 17 where the security parameters may be determined in a similar way as how PMK is determined. Alternatively, or additionally, security parameters may be determined as described in conjunction with FIG. 18 where the security parameters may be determined in a similar way as how master key may be determined. Alternatively, or additionally, security parameters may be determined as described in conjunction with FIG. 19 where the security parameters may be determined in a similar way as how master key may be determined. Alternatively, or additionally, security parameters may be determined as described in conjunction with FIG. 20. Alternatively, or additionally, security parameters may be determined as described in conjunction with FIG. 21. Alternatively, or additionally, security parameters may be determined as described in conjunction with FIG. 22. Alternatively, or additionally, security parameters may be determined as described in conjunction with FIG. 23. Alternatively, or additionally, security parameters may be determined as described in conjunction with FIG. 24. Alternatively, or additionally, security parameters may be determined as described in conjunction with FIG. 25. Alternatively, or additionally, security parameters may be determined as described in conjunction with FIG. 26. Alternatively, or additionally, security parameters may be determined as described in conjunction with FIG. 31. Alternatively, or additionally, security parameters may be determined as described in conjunction with FIG. 33.

The method 600 may continue at 604 with determining master key. For example, as described in conjunction with FIG. 3B, the STA 102 and AP 204 use 802.1X based authentication to determine a PMK. Additionally, or alternatively, as described in conjunction with FIG. 3B, the STA 102 and AP 204 may use a PSK to derive a PMK.

Alternatively, or additionally, the STA 102 and/or AP 204 may have a cached PMK that may be determined based on a PMKID. For example, the STA 102 may send a message to the AP 204 with the PMKID and the AP 204 may determine whether or not there is a valid PMKSA associated with the PMKID.

Figure 8A:
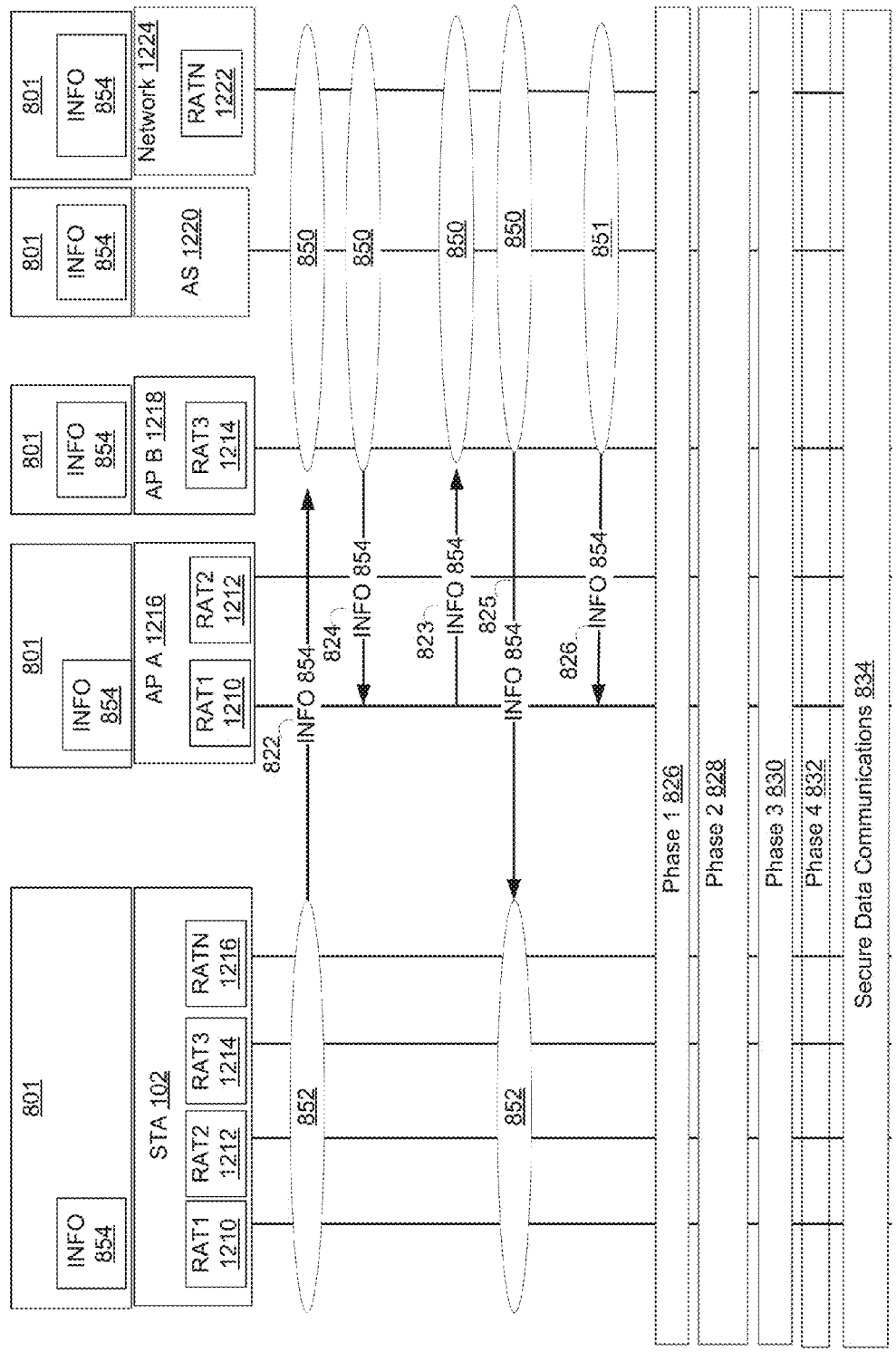
FIG. 8A illustrates a method for fast security setup.
Figure 8B:
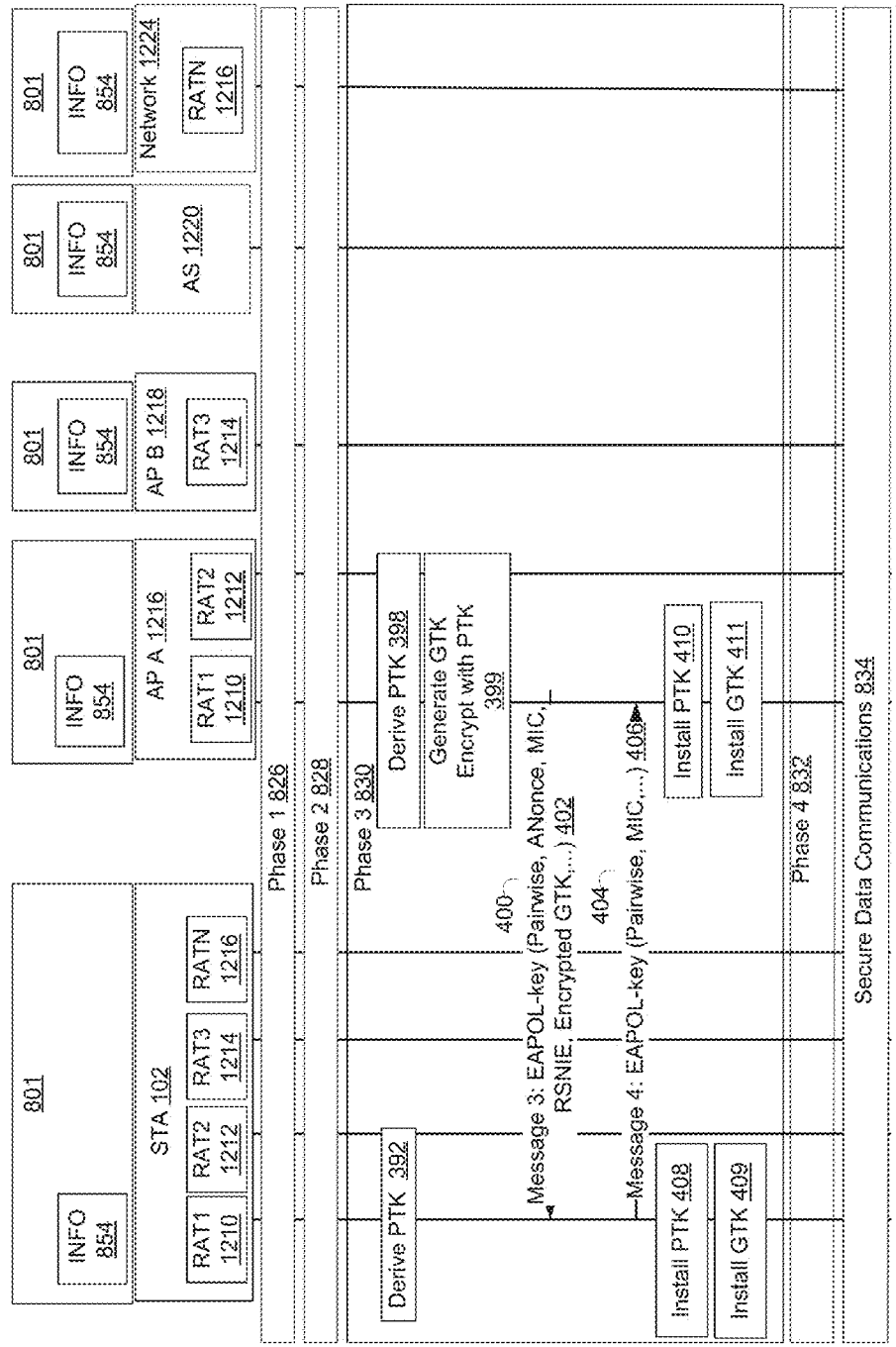
FIG. 8B illustrates the 4-way handshake reduced to a 2-way handshake according to some disclosed embodiments.

Alternatively, or additionally, the master key may be determined as disclosed in conjunction with FIGS. 8A and 8B. For example, the master key may be determined at an AS 1220 and at the STA 102. The AS may then send the master key to APs 1618 to pre-authenticate the STA 102.

Alternatively, or additionally, the master key may be determined as disclosed in conjunction with FIG. 9. Alternatively, or additionally, the master key may be determined as disclosed in conjunction with FIG. 10A. Alternatively, or additionally, the master key may be determined as disclosed in conjunction with FIG. 11A. Alternatively, or additionally, the master key may be determined as disclosed in conjunction with FIG. 12A. Alternatively, or additionally, the master key may be determined as disclosed in conjunction with FIG. 13 where one or more RATs of a multi-RAT device share a master key. Alternatively, or additionally, the master key may be determined as disclosed in conjunction with FIG. 14A. Alternatively, or additionally, the master key may be determined as disclosed in conjunction with FIG. 15. Alternatively, or additionally, the master key may be determined as disclosed in conjunction with FIG. 16C. Alternatively, or additionally, the master key may be determined as disclosed in conjunction with FIG. 17. Alternatively, or additionally, the master key may be determined as disclosed in conjunction with FIG. 18. Alternatively, or additionally, the master key may be determined as disclosed in conjunction with FIG. 19. Alternatively, or additionally, the master key may be determined as disclosed in conjunction with FIG. 20. Alternatively, or additionally, the master key may be determined as disclosed in conjunction with FIG. 21. Alternatively, or additionally, the master key may be determined as disclosed in conjunction with FIG. 22. Alternatively, or additionally, the master key may be determined as disclosed in conjunction with FIG. 23. Alternatively, or additionally, master key may be determined as described in conjunction with FIG. 24. Alternatively, or additionally, master key may be determined as described in conjunction with FIG. 25. Alternatively, or additionally, master key may be determined as described in conjunction with FIG. 26. Alternatively, or additionally, master key may be determined as described in conjunction with FIG. 31. Alternatively, or additionally, master key may be determined as described in conjunction with FIG. 33.

The method 600 may continue at 606 with determining one or more pairwise temporal keys. In some embodiments, one or more RATs of a mult-RAT device may have a same MAC address. In some embodiments, the RATs of a mult-RAT device may have different MAC addresses.

For example, as described in conjunction with FIG. 3C, the STA 102 and AP 204 may exchange information and derive PTK and PTKSA. Additionally, the AP 204 may generate a GTK and share the GTK with the STA 102. The STA 102 and AP 204 may perform a 4-way handshake to exchange information for determining the PTK.

Alternatively, or additionally, the PTK and GTK may be determined as disclosed in conjunction with FIG. 9. Alternatively, or additionally, the PTK and GTK may be determined as disclosed in conjunction with FIG. 10A. Alternatively, or additionally, the PTK and GTK may be determined as disclosed in conjunction with FIG. 11A. Alternatively, or additionally, the PTK and GTK may be determined as disclosed in conjunction with FIG. 12B. Alternatively, or additionally, the PTK and GTK may be determined as disclosed in conjunction with FIG. 13. Alternatively, or additionally, the PTK and GTK may be determined as disclosed in conjunction with FIG. 14A where two or more RATs of a multi-RAT device may share the same GTK. Alternatively, or additionally, the PTK and GTK may be determined as disclosed in conjunction with FIG. 15. Alternatively, or additionally, the PTK and GTK may be determined as disclosed in conjunction with FIG. 16.

The method 600 may continue at 608 with group key determined? For example, as described in conjunction with FIG. 3D, and elsewhere herein, it may be determined whether or not there is a group key that can be used.

The method 600 may continue with phase 4 determine group key 614, if the group key has not been determined. For example, as described in conjunction with FIG. 3D, the AP 204 may generate a GTK and send it to the STA 102. The method to send the GTK to the STA 102 may be called a group key handshake.

Alternatively, or additionally, the group key may be determined as disclosed in conjunction with FIG. 9. Alternatively, or additionally, the group key may be determined as disclosed in conjunction with FIG. 10B. Alternatively, or additionally, the GTK may be determined as disclosed in conjunction with FIG. 11B where RAT MAC addresses may be different and where the GTK may be shared among two or more RATs of a mult-RAT device. Alternatively, or additionally, the group may be determined as disclosed in conjunction with FIG. 12C. Alternatively, or additionally, the group key may be determined as disclosed in conjunction with FIG. 13. Alternatively, or additionally, the GTK may be determined as disclosed in conjunction with FIG. 14B where two or more RATs of a multi-RAT device may share the same GTK and the RATs may have different MAC addresses. Alternatively, or additionally, the group key may be determined as disclosed in conjunction with FIG. 15. Alternatively, or additionally, the group key may be determined as disclosed in conjunction with FIG. 16C.

The method 600 may continue at 610 with secure communications. For example, as disclosed in conjunction with FIG. 3D and elsewhere herein.

The method 600 may continue at 612 with refresh group key? For example, the STA 102, AP 204, or network 1224, may determine that the group key needs to be refreshed.

The method 600 may end. For example, a STA 102, network 1224, or AP 204 may terminate the communications.

In some embodiments, in method 600, for phase 1 602 and phase 2 604, phase 3 606, and phase 4, the STA 102 may send identity information to the network to identify the AP, and the network may then use the information to resolve the identity of the AP, and then send the AP information such as a master key or security parameters. The methods, apparatus, and data structures described in conjunction with FIGS. 2-36 may be used to accomplish one or more of these steps.

Figure 21:
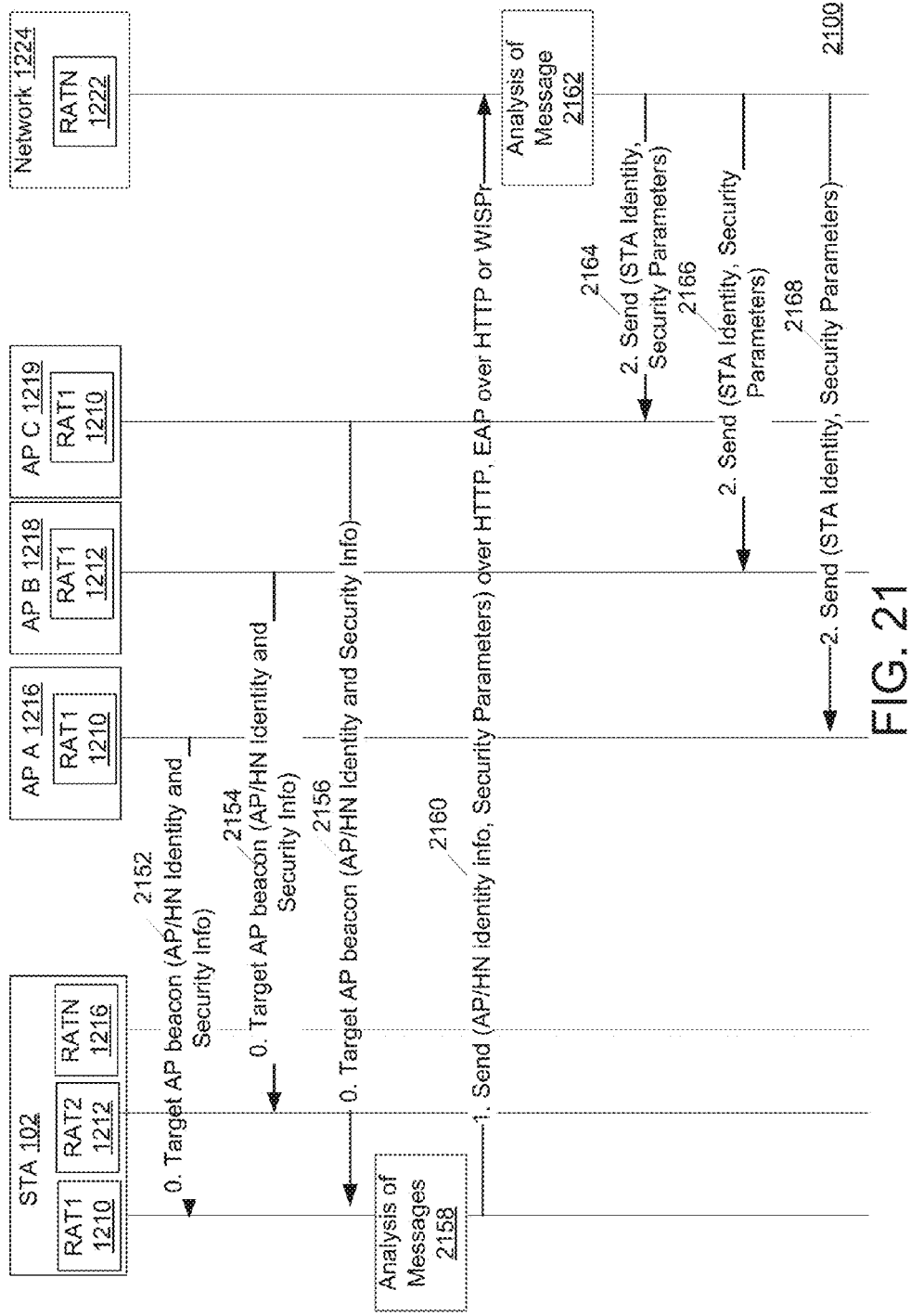
FIG. 21 illustrates a method for transporting identity and security capability information using a protocol according to some disclosed embodiments.

Moreover, in some embodiments of method 600, the network may send one or more of PMK and security parameters in parallel to RATs as described in conjunction with FIG. 21. The network may send master keys or security paramters to the RATs based on the network determining the proximity of the AP with the STA 102.

Figure 7:
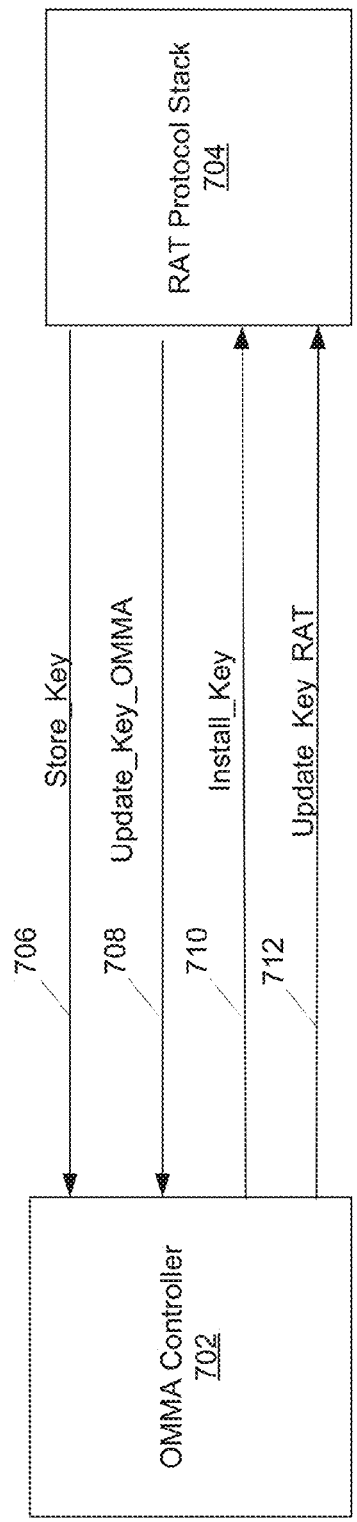
FIG. 7 schematically illustrates an opportunistic multi-MAC aggregation (OMMA) according to some disclosed embodiments.

FIG. 7 illustrates an opportunistic multi-MAC aggregation (OMMA) controller according to some disclosed embodiments. Illustrated in FIG. 7 is OMMA controller 702 and RAT protocol stack 704. The following signals may be used between the OMMA controller 702 and the RAT protocol stack 704: signal store key 706, signal update_key_OMMA 708, signal install_key 710, and signal update_key_RAT 712.

The signals 706, 708, 710, 712 may be part of an interface between the OMMA controller 702 and the RAT protocol stack 704. The signals 706, 708, 710, 712 may be used in conjunction with authentication and key distribution.

The store_key signal 706 may be used by RAT protocol stack 704 to store a security key at the OMMA Controller 702 for a STA 102. The RAT protocol stack 704 may store the security key during a phase of authentication or during a key distribution method. The store_key signal 706 may be used by the RAT protocol stack 704 whenever the RAT protocol stack 704 gets a new key for a STA 102 through the authentication or key distribution procedure, and the new key needs to be stored by the OMMA controller 702. The RAT protocol stack 704 may be a protocol stack for one or more RATs of a STA 102, AP 204, or other device used in conjunction with authentication or key distribution.

The following may be parameters of store_key signal 706. (1) RAT_Id, which may be the Id of the RAT associated with the RAT protocol stack 704. (2) STA_Addr, which may be the address of the STA 102 for which the key (given in Key_Value) will be used to decode/encode the data. If more than one RAT shares a common MAC address, then the Key_Value may be the same for the one or more RATs. If MAC addresses of the RATs are different, STA_Addr will be the address of corresponding RAT with the ID of the RAT stored in RAT_Id. (3) Key_Type, which may contain the type of the key (like GTK/PTK/PMK) that the RAT protocol stack 704 is requesting to be stored. (4) Key_Value, which may contain the key value of the key given in Key_Type. (5) Other_Key_Parameters, which may contain other parameters of the key given in Key_Type that require a security association for that Key to be created. And, (6) NULL, which may be used in case there is no requirement of other parameters to store at the OMMA controller 702.

The update_key_OMMA signal 708 may be used by a RAT protocol stack 704 to update a security key at the OMMA controller 704. The update_key_OMMA signal 708 may be used by a STA 102 during a refreshment phase of a key. The update_key_OMMA signal 708 may be used when a RAT 704 gets a key due to a refreshment phase of a key and the key needs to be updated at the OMMA controller 702.

The update_key_OMMA signal 708 may have the following parameters. (1) RAT_ID, which may be the Id of the RAT 704 which performs this operation. (2) STA_Addr, which may be an address of the STA 704 for which the key (given in Key_Value) will be used to decode/encode the data. If more than one RAT shares a common MAC address, then the Key_Value may be the same for the one or more RATs. If MAC addresses of the RATs are different, STA_Addr will be the address of corresponding RAT with the ID of the RAT stored in RAT_Id. (3) Key_Type, which may contain the type of the key (like GTK/PTK/PMK) that RAT 704 is requesting be stored. (4) Key_Value, which may contains the key value of the key given in Key_Type. (5) Other_Key_Parameters, which may contain other parameters of the key given in Key_Type that may be required to create a security association for that Key. And, (6) NULL, which may be used in case there are no other parameters to update at OMMA Controller 702.

The install_key signal 710 may be used by the OMMA Controller 702 for storing a security key for a STA 102 to a RAT protocol stack 704 during a phase of authentication or key distribution procedure. The install_key signal 710 may be used by the OMMA controller 702 when there is a new key from a RAT protocol stack 704 due to an authentication or key distribution procedure, and the new key needs to be stored on a second RAT (not illustrated).

The install_key signal 710 may have the following parameters. (1) RAT_Id, which may be the Id of the RAT for which this operation is being performed. (2) STA_Addr, which may be the address of the STA 102 for which the key (given in Key_Value) will be used to decode/encode the data. If more than one RAT shares a common MAC address, then the Key_Value may be the same for the one or more RATs. If MAC addresses of the RATs are different, STA_Addr will be the address of corresponding RAT with the ID of the RAT stored in RAT_Id. (3) Key_Type, which may be the type of the key (like GTK/PTK/PMK). (4) Key_Value, which may be the key value of the key given in Key_Type. (5) Other_key_parameters, which may contain other parameters of the key given in key_type that may be needed to create a security association for that Key. And, (6) NULL, which may be used in case there is no requirement of other parameters to store at the RAT protocol stack 704 by OMMA Controller 702.

The update_key_RAT signal 712 may be used by the OMMA controller 702 to update a security key at a RAT 704. The OMMA Controller 702 may be configured to update keys on other RATs for a STA 102, when the OMMA controller 702 receives an updated key from a RAT. For example, if a first RAT and a second RAT are using the same key, then the OMMA controller 702 may update the key for the first RAT if it receives an updated key from the second RAT. The OMMA controller 702 may generate the update_key_RAT signal 712 when it receives an updated or new key from a RAT of a STA 102 where other RATs of the STA use the same key.

The update_key_RAT signal 712 may have the following parameters. (1) RAT_Id, which may be the Id of the RAT for which this operation is being performed on. (2) STA_Addr, which may be the address of the STA for which the key (given in Key_Value) will be used to decode/encode the data. If more than one RAT shares a common MAC address, then the Key_Value may be the same for the one or more RATs. If MAC addresses of the RATs are different, STA_Addr will be the address of corresponding RAT with the ID of the RAT stored in RAT_Id. (3) Key_Type, which may be the type of the key (like GTK/PTK/PMK) that OMMA controller 702 is requesting be stored. (4) Key_Value, which may be the key value of the key given in Key_Type. (5) Other_Key_Parameters, which may be other parameters of the key given in Key_Type that may be needed to create a security association for that key. (6) NULL, which may be used in the case that there are other parameters to update the RAT from OMMA controller 702.

In some embodiments, the OMMA controller 702 may use different signals and may be configured to store and retrieve key and security associations that are stored with identifiers such as PMKID. The OMMA controller 702 may be configured to take an identifier and return a key or security association if one is associated with the identifier. The OMMA controller 702 may be configured to determine whether or not a security association or key is still valid. In some embodiments, the OMMA controller 702 may reside on a different device than the STA 102 and/or AP 204. In some embodiments, the OMMA controller 702 may have different signals.

FIG. 8A illustrates a method 800 for fast security setup. The method 800 described in conjunction with FIG. 8 may reduce the number of signals needed by phase 2 828 and phase 3 830 for establishing secure data communications 834.

Illustrated in FIGS. 8A and 8B are a STA 102, an AP-A 1216, an AP-B 1218, AS 1220, and network 1222. The RATS 1210, 1212, 1214, 1216 may have different MAC addresses. OMMA 801 may be an OMMA as described herein. The network 1224 may be at least one of: a private network, private network with guest access, chargeable public network, free public network, or a service provider network. The network 1224 may be a communication system 100.

A STA 102 may send information 854 to an AP-B 1218, AS 1220, or network 1224. The AP-B 1218, AS 1220, and network 1224 may collectively be referred to as 850. The information 854 may be stored at AP-B 1218, AS 1220, or network 1224. The information 854 may then be sent from the AP-B 1218, AS 1220, or network 1224 to the AP-A 1216.

Additionally, AP-A 1216 may send 823 information 854 to the AP-B 1218, AS 1220, or network 1224. The information 854 may then be stored at the AP-B 1218, AS 1220, or network 1224. The information 854 may then be sent 825 to the STA 102.

In this way, the STA 102 and AP-A 1216 may exchange information 854 between each other prior to one or more of phase 1 826, phase 2 828, phase 3 830, and phase 4 832. Additionally, the STA 102 and AP-A 1216 may send the information 854 directly to one another and then the information may be cached by the STA 102 and/or AP-A 1216.

Additionally, information 854 may be sent 826 from AS 1220, and/or network 1224, AP-B 1218, to one or more of STA 102, AP-A 1216. For example, the STA 102 may have authenticated with the AS 1220. The network 1224 may inform the AS 1220 to pre-authenticate STA 102 with AP-A 1216 and in response the AS 1220 may send information 854 to AP-A 1216 that enables the STA 102 to be pre-authenticated with the AP-A 1216. Information 854 may be sent within 851. For example, the network 1224 may send information 854 to AP-B 1218.

The information exchange may occur in different places other than before phase 1 826 including before, after, and/or during phase 1 826, phase 2 828, phase 3 830, and phase 4 832.

The information 854 may include nonces, MAC addresses, and other information that may be exchanged between the STA 102 and AP-A 1216 during one or more of phase 1 826, phase 2 828, phase 3 830, and phase 4 832, or information that may be exchanged between the STA 102 and AP-A 1216 as described in conjunction with FIG. 3A, 3B, 3C, 3D, FIG. 6.

The AP-A 1216 and STA 102 may perform the 4-way handshake (see FIG. 3C) where fewer signaling steps may be needed. In one embodiment, only a two-way handshake is needed.

The AP-A 1216 and STA 102 may perform IEEE 802.1X authentication (see FIG. 3B) where fewer signaling steps may be need. In one embodiment, only a two-way handshake is needed.

FIG. 8B illustrates the 4-way handshake reduced to a 2-way handshake according to some disclosed embodiments.

By using the information 854, which may be exchanged as described in conjunction with FIG. 8A, or exchanged in another way, the 4-way handshake described in conjunction with FIG. 3C may be reduced to a 2-way handshake. In some embodiments, phase 3 may be reduced by the information in message 1 388 and the information in message 2 394 being exchanged between the AP-A 1216 and STA 102 in information 854 as described in conjunction with FIG. 8A. Phase 3 then may include derive PTK 392, derive PTK 398, generate GTK 399, message 3 400, message 4 404. In this way, the 4-way handshake of FIG. 3C may be reduced to a 2-way handshake.

The 2-way handshake process may ensure that the STA 102 and AP A 1216 generate PTK's that are different for different RATs 1210, 1212, so that the different RATs 1210, 1212 cannot decode or encode messages from the other RAT 1210, 1212. In some embodiments, RATs 1210, 1212 may share a common PTK, in which case the 2-way handshake may be performed once for the two RATs 1210, 1212.

FIG. 9 illustrates a method 900 for fast security setup. In the method 900 there may be a different GTK and PTK for each RAT. Illustrated in FIG. 9 is a STA 102, an AP-A 902, an AP-B 904, AS 906, and network 908. Each of the RATs may have an independent MAC address.

The STA 102 may include PSK A 918, PSK B 920, RAT1 910, RAT2 912, RAT3 914, and RATN 916. The PSK A 918 may be a PSK between the STA 102 and the AP A 902. The PSK B may be a PSK between the STA 102 and the AP B 904. RAT1 910, RAT2 912, RAT3 914 may be RATs. STA 102 may communicate with AP A 902 using RAT1 910 and RAT2 912. STA 102 may communicate with AP B 904 using RAT3 914. STA 102 may communicate with network 908 using RATN 916.

AP-A 902 may be an AP 204 as described in conjunction with FIG. 2. AP-A 902 may include PSK A 918, RAT1 910, and RAT2 912. PSK A 918 may be a PSK of AP-A 902. AP-A 902 may be configured to communicate using RAT1 910 and RAT2 12. AP-A 902 may communicate with STA 102 using RAT1 910 and RAT2 912.

AP-B 904 may be an AP 204 as described in conjunction with FIG. 2. AP-B 904 may include PSK B 920 and RAT3 914. PSK B 920 may be a PSK of AP-B 904. AP-B 904 may be configured to communicate with STA 102 using RAT3 914.

Network 908 may be a communications network 100. Network 908 may communicate with STA 102 using RATN 916. Network 908 may be configured to send and receive the security parameters 383.

The method 900 may begin with phase 1 604. Phase 1 604 may be a phase 1 as disclosed in conjunction with FIG. 3A, FIG. 6, or as disclosed elsewhere herein.

The method 900 may continue with phase 2 606. Phase 2 606 may be a phase 2 606 as disclosed in conjunction with FIG. 3C, FIG. 6, or elsewhere herein, where a PSK is used for the PMK. Each of the APs 902, 904 may have a different PSK 918, 920. STA 102 may use PSK A 918 as the PMK for association with AP A 902. STA 102 may use PSK B 920 as the PMK for association with AP B 904.

The method 900 may continue with phase 3 608. Phase 3 608 may be a phase 3 608 as disclosed in conjunction with FIG. 3C, FIG. 6, or as disclosed elsewhere herein. A separate PTK and GTK may be generated for each RAT 910, 912, 914. STA 102 and AP-A 902 may perform the 4-way handshake as described in FIG. 3C using RAT1 910 to generate PTK 1 948, GTK 1 950. STA 102 and AP A 902 may perform the 4-way handshake as described in FIG. 3C using RAT2 912 to generate PTK 2 952, GTK 2 954. STA 102 and AP-B 904 may perform the 4-way handshake as described in FIG. 3C using RAT3 914 to generate PTK 3 956 and GTK 3 958. Phase 3 608 may use other methods to generate the PTK and GTK. For example, phase 3 608 may use other methods as described herein. After phase 3 608 PTK 1 948, PTK 2 952, PTK 3 958, GTK 1 950, GTK 2 954, and GTK 3 958 may be installed at the STA 102, and the corresponding AP 902, 904.

Each RAT 910, 912, 914 will have a different PMKSA, PTKSA and GTKSA at the STA 102 and the APs 902, 904. Thus, each RAT1 910, RAT2 912, RAT3 914 will encrypt/decrypt their unicast data with different temporal key (PTK 1 948, PTK 2 952, PTK 3 956, respectively) and multicast/broadcast data with different temporal key (GTK 1 950, GTK 2 954, GTK 3 958, respectively).

The method 900 may continue with phase 4 614. When AP-A 902 determines to update GTK 1 950 or GTK 2 954, or when AP-B 904 determines to update GTK 3 958, the AP-A 902 or AP-B 904 performs phase 4 614 with the STA 102 according to one of the embodiments disclosed herein. For example, AP-A 902 or AP-B 904 may perform the Group Key Handshake with the STA 102 as described in association with FIG. 3D or FIG. 6. After phase 4 614 GTK 1 950, GTK 2 954, GTK 3 958, will be installed at the STA 102.

In some embodiments, the APs 902, 904 and/or the STA 102 may determine to perform phase 1 604, phase 2 606, phase 3 608, or phase 4 614, or a portion of one of the phases again to change or refresh parameters associated with the secure data communications 610.

Although, only one STA 102 is illustrated more than one STA 102 may be present. Although, only two APs 902, 904 are illustrated only one AP 902, 904 may be present or more than two APs 902, 904 may be present.

Figure 10A:
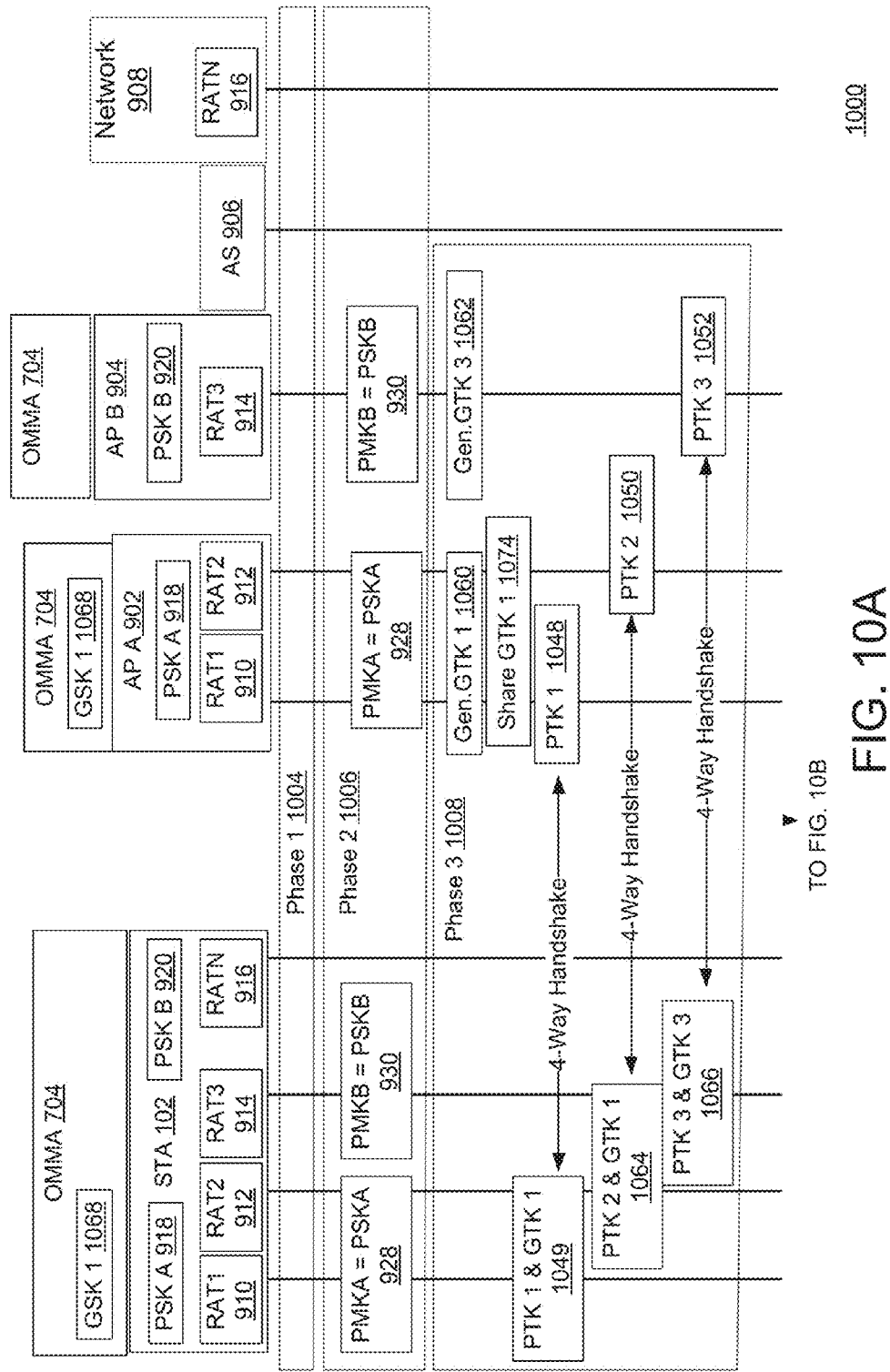
FIGS. 10A and 10B schematically illustrate a method for fast security setup.
Figure 10B:
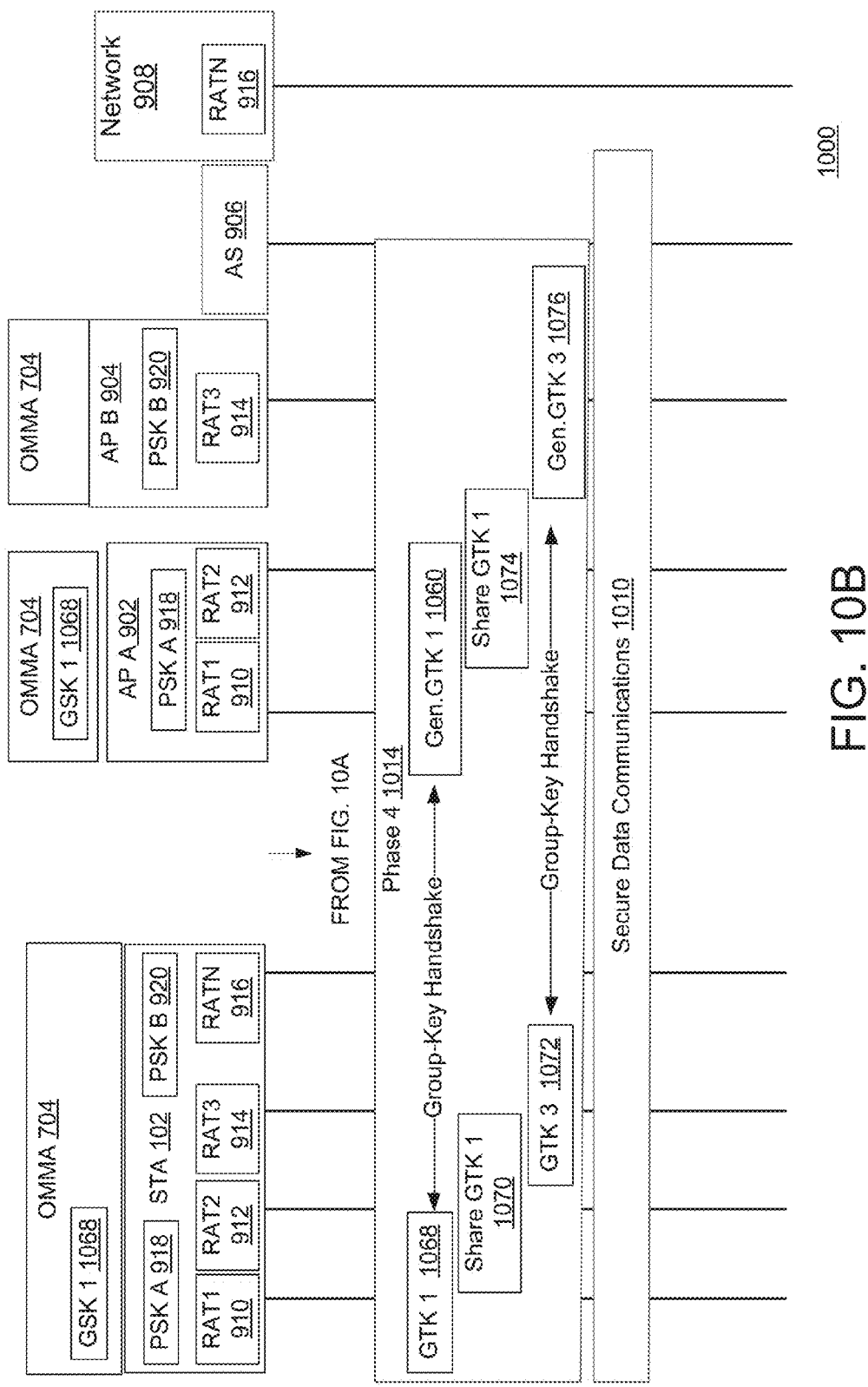

FIGS. 10A and 10B schematically illustrate a method 1000 for fast security setup. In the method 1000, there may be a different PTK for each RAT and a shared GTK for two or more RATs. Illustrated in FIGS. 10A and 10B are a STA 102, an AP-A 902, an AP-B 904, AS 906, and network 908. This embodiment may eliminate GTK generation for one or more RATs in one or more multi-RAT devices.

The method 1000 may begin with phase 1 1004. Phase 1 1004 may be a phase 1 has described in conjunction with FIG. 3A, FIG. 6, or as described elsewhere herein.

The method 1000 may continue with phase 2 1006. Phase 2 1006 may be a phase 2 as described in conjunction with FIG. 3B, FIG. 6, or FIG. 9, or as described elsewhere herein.

The method 1000 may continue with phase 3 1008. Phase 3 may be a phase 3 as disclosed in FIG. 6 or as described elsewhere herein. The method 1000 may continue with generating GTK 1 1060. The AP-A 902 may generate GTK 1 1068. The method 1000 may continue with sharing GTK 1 1068 between RAT1 910 and RAT2 912 of AP-A 902. The OMMA 704 may be used to share GTK 1 1068 between RAT1 910 and RAT2 912 of AP-A 902.

The method 1000 may continue with the AP-A 902 and the STA 102 performing a 4-way handshake which results in the generation of a PTK 1 1048 and GTK 1 1068 being transferred to RAT1 910 of STA 102. The method 1000 may continue with the AP-A 902 and the STA 102 performing a 4-way handshake which results in the generation of a PTK 2 1050 and GTK 1 1068 being transferred to RAT 2 912 of STA 102. The method 1000 may continue with the AP-B 904 and the STA 102 performing a 4-way handshake which result in the generation of a PTK 3 1052 and GTK 3 1062 being transferred to RAT3 914 of the STA 102.

In some embodiments, there may be a unique GTK for all RATs in a single basic service set (BSS). In some embodiments, an alternative method to the 4-way handshake may be used as described in conjunction with FIG. 8B.

At the STA 102 and AP 902, 904, each RAT's SME may create PMKSA on their RATs which are chosen for communication during phase 1 1004.

In some embodiments, during a 4-way handshake, the AP 902, 904 after receiving message 2 394 (FIG. 3C) of the 4-way handshake (EAPOL-Key(0,1,0,0,P,0,0, SNonce,MIC, DataKD_M2)) from STA 102, RAT1 910 and RAT2 912 will use the same GTK 1 1060 installed by OMMA 704 to send GTK 1 1060 to RAT1 910 and RAT2 912 of STA 102 in message 3 400 of 4-way handshake (EAPOL-Key(1,1,1,1, P,0,KeyRSC, ANonce,MIC,DataKD_M3)). PTK derivation will be the same as described in conjunction with FIG. 3C on the STA 102 and AP-A 902. In some embodiments, there may be more than one STA 102, and each of the STAs 102 may receive the same GTK 1 1068 in message 3 400 of 4-way handshake (EAPOL-Key (1,1,1,1,P,0,KeyRSC, ANonce, MIC, DataKD_M3)) for each RAT of the STA 102 that is communicating with the AP-A 902 or in some embodiments each RAT of the STA 102 that is communicating with an AP 902, 904 in an BSS.

The method 1000 may continue with phase 4 1014 as illustrated by FIG. 10B. Phase 4 may be a phase 4 as disclosed in FIG. 6 or as described herein. In some embodiments, phase 4 1014 will result in all RATs having the same PMK and GTK and with different PTKs on both the STA and the AP. The method 1000 may continue with generating GTK 1 1060. The GTK 1 1060 may be a refreshment of the GTK 1 1060 generated in phase 3 1008. The AP-A 902 may generate GTK 1 1068. The method 1000 may continue with sharing 1074 GTK 1 1068 between RAT1 910 and RAT2 912 of AP-A 902. The OMMA 704 may be used to share GTK 1 1068 between RAT1 910 and RAT2 912 of AP-A 902.

The method 1000 may continue with the AP-A 902 and the STA 102 performing a group handshake which results in GTK 1 1068 being transferred to RAT1 910 of STA 102. The method 1000 may continue with sharing 1070 GTK 1 1060 between RAT1 910 and RAT2 912 of STA 102. The OMMA 704 may be used to share GTK 1 1060 between RAT1 910 and RAT2 912 of STA 102.

The method 1000 may continue with the AP-B 904 generating GTK 3 1072, which may be a refreshment of GTK 3 1072 generated in phase 3 1008. The method 1000 may continue with the AP-B 904 and the STA 102 performing a group handshake which results in GTK 3 1072 being transferred to RAT3 914 of STA 102.

After installation of PTK and GTK on each RAT, their SME will create corresponding PTKSA (for unicast data encryption/decryption) and GTKSA (for multicast/broadcast data encryption/decryption).

In some embodiments, AP-A 902 sends message 1 416 (FIG. 3D) of group key handshake (EAPOL-Key(1,1,1,0,G, 0,Key RSC,0, MIC,GTK[N])) with GTK 1 1060 to RAT1 910 of STA 102. In some embodiments, STA 102 send message 2 422 (FIG. 3D) of group key handshake (EAPOL-Key(1,1,0,0,G,0,0,0,MIC,0)) to AP-A 902 on RAT1 910 of STA 102, which may be the RAT that STA 102 received message 1 416.

In some embodiments, RAT1 910, RAT2 912, and RAT3 914 will generate new GTKSA at both the STA 102 and AP-A 902 and AP-B 904.

In some embodiments, a different RAT than RAT1 910 may be used to send the GTK 1 1068. In some embodiments, the GTK 1 1068 may be shared with more than one RAT.

Figure 11A:
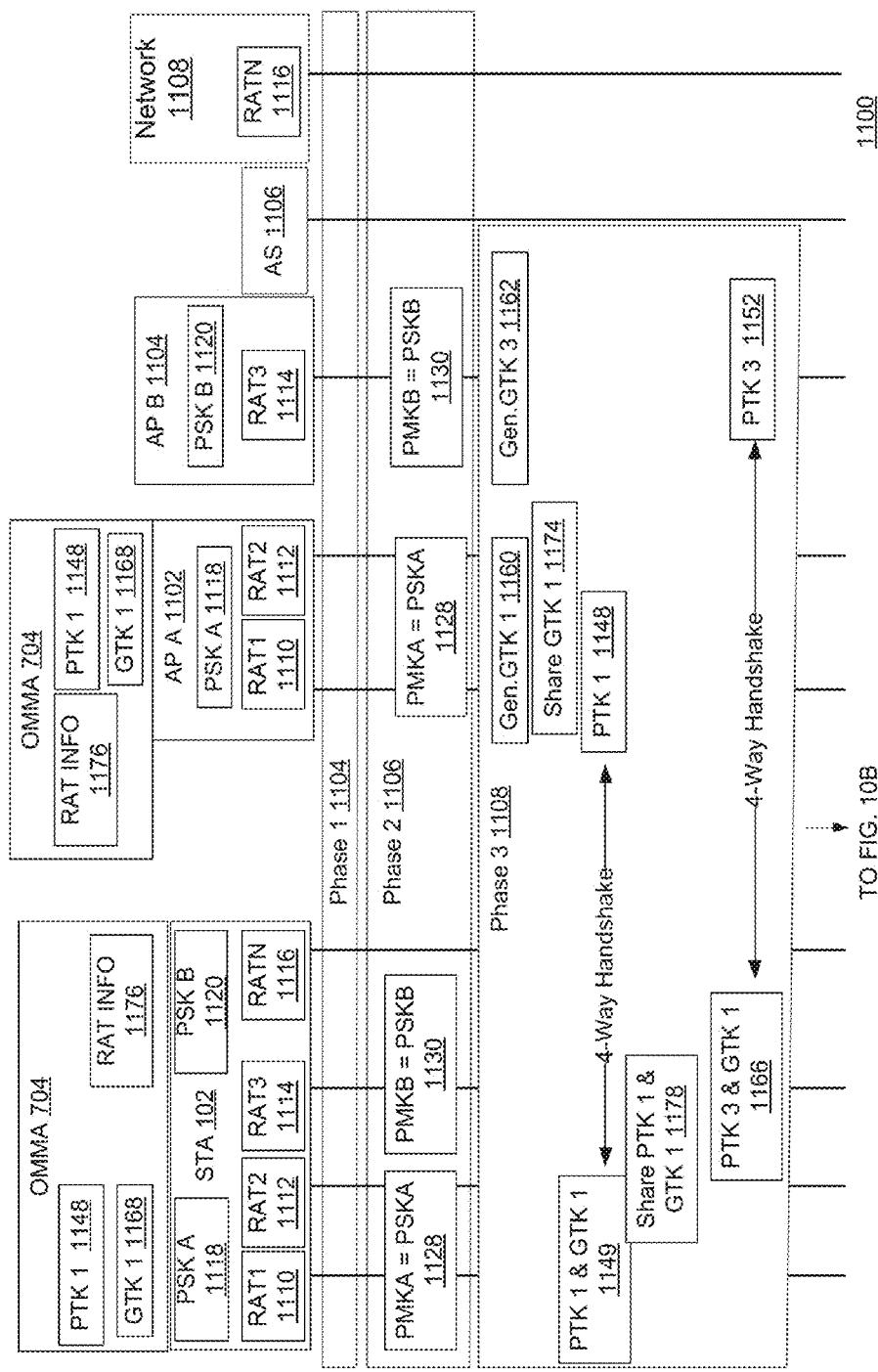
FIGS. 11A and 11B schematically illustrate a method for fast security setup.
Figure 11B:
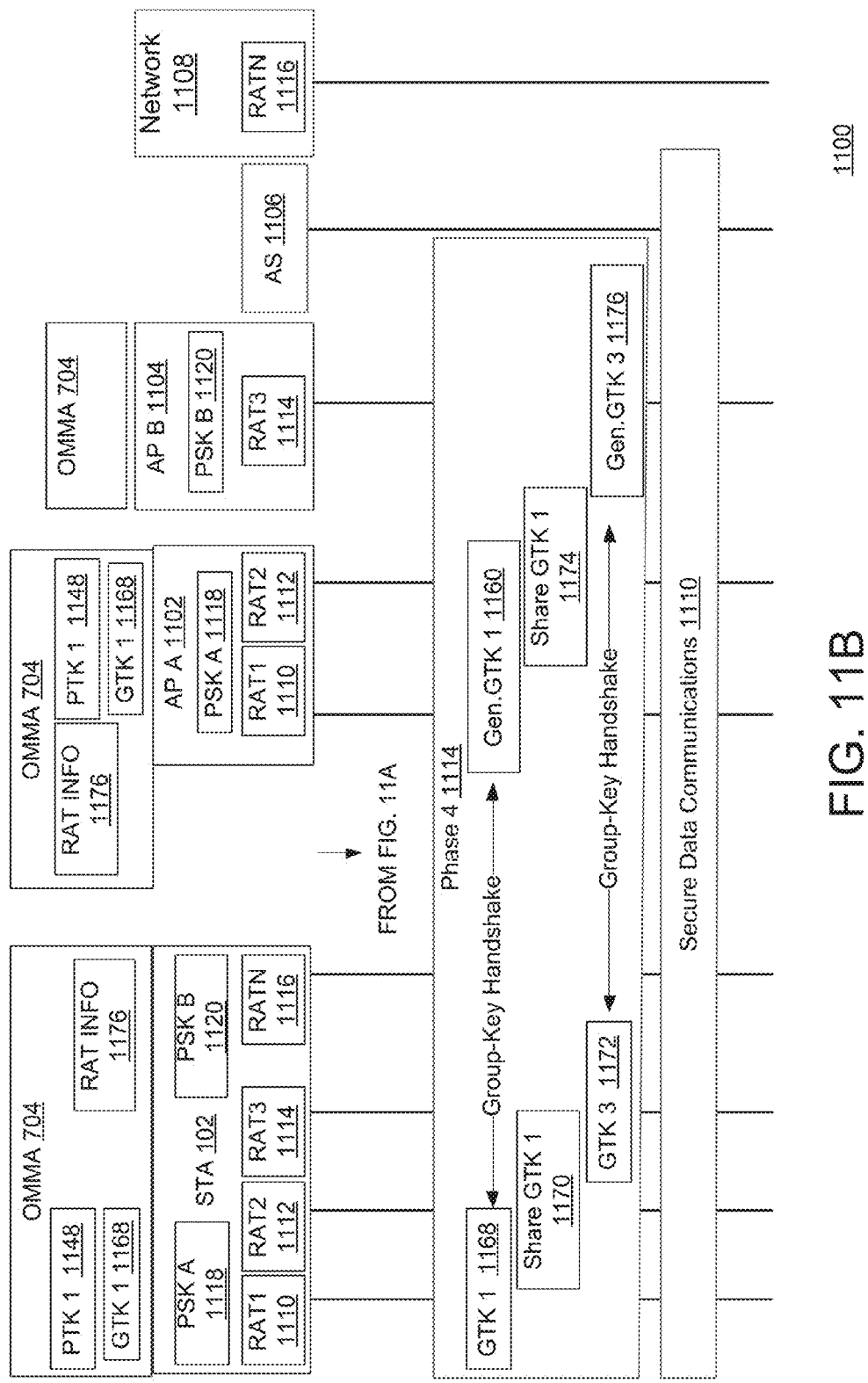

FIGS. 11A and 11B schematically illustrate a method 1100 for fast security setup. In the method 1100, one or more RATs may use a shared PTK and GTK. Illustrated in FIG. 11 is a STA 102, an AP-A 1102, an AP-B 1104, AS 1106, and network 1108. This embodiment may eliminate GTK generation for one or more RATs in one or more multi-RAT devices and may eliminate PTK generation for one or more RATs in one or more mult-RAT devices.

RAT1 1110, RAT2 1112, and RAT3 1114 may each have the same MAC address. RAT1 1110 and RAT2 1112 of AP-A 1102 may have the same MAC address.

In some embodiments, the generation of the PTK and GTK for multi-RAT devices may be based on the same MAC address. In some embodiments, there may be a common PTK and GTK for one or more RATs of a multi-RAT device.

The method 1110 may begin with phase 1 11104. In embodiments, phase 1 1110 may perform an association, re-association, request/Response on only one RAT or on all selected RATs. Information regarding the RATs 1110, 1112, and 1114 may be stored in the OMMA 704 at both the STA 102 and the AP-A 1102. In embodiments, phase 1 1114 is an embodiment of phase 1 as described in conjunction with FIG. 3A or FIG. 6.

The method 1100 may include determining a common MAC address for RAT1 1110 and RAT2 1112 of the STA 102.

The method 1100 may continue with phase 2 1106. In embodiments, phase 2 1106 is an embodiment of phase 2 as described in association with FIG. 6. In embodiments, PMKA for AP-A 1102 is set to PSK A 1118. In embodiments, PMKB for APB 1104 is set to PSK B 1130.

The method 1100 continues with phase 3 1108. AP-A may generate GTK 1 1168 using a common MAC address. GTK 1 1168 may be stored at OMMA 704. The method 1110 may continue with sharing 1174 GTK 1 1168 with RAT2 1112.

The method 1110 may continue with the STA 102 and the AP-A 1102 may perform a 4-way handshake using RAT1 1110. The 4-way handshake may be as described in conjunction with FIG. 3C. The 4-way handshake may generate PTK-1 1148 using the common device MAC address of STA 102 and AP-A 1102, and may send the GTK 1 1168 to the STA 102.

GTK 1 1168 and PTK-1 1148 may be stored at the OMMA 704 of the STA 102. The method 1110 may continue with sharing the GTK 1 1168 and the PTK-1 1148 with other RATs. For example, RAT2 1112 may receive the GTK 1 1168 and PTK-1 1148. In some embodiments, the SME of the RAT 1110, 1112 creates PTKSA and GTKSA on the corresponding RAT 1110, 1112 at the STA 102 and the AP-A 1102. The PTKSA and GTKSA may be stored at the OMMA 704 of the STA 102 and the AP-A 1102.

In some embodiments, the 4-way handshake is performed once for a RAT for a set of RATs that are part of a STA-AP pair and the OMMA installs the PTK and GTK on the other RATs that are part of the STA-AP pair.

The method 1110 may include AP-B 1104 and STA 102 performing the 4-way handshake. RAT3 1114 may have a different MAC than RAT 1110 and RAT 1112.

The method 1110 may continue with phase 4 1114. Phase 4 1114 may be a phase 4 as described in relation with FIG. 6.

The method 1110 may continue with the AP-A 1102 generating GTK 1 1160 using the common MAC address. The method 1110 may continue with sharing the generated GTK. For example, GTK 1 1168 may be stored in the OMMA 704. The method 1110 may continue with sharing the generated GTK with other RATs of the AP. For example, the OMMA 704 may share GTK 1 1168 with RAT 1113.

The method 1110 may continue with for each STA, performing a group key handshake with one RAT for each STA-AP pair. For example, AP-A 1102 may perform the group-key handshake with STA 102. Message 1 of the group key handshake may be (EAPOL-Key(1,1,1,0,G,0,Key RSC, 0, MIC,GTK[N])). Message 2 of the group key handshake may be (EAPOL-Key(1,1,0,0,G,0,0,0,MIC,0)) and sent from the RAT where message 1 was received.

The method 1110 may continue with the SME of the RAT that performed the group-key handshake determining GTKSA on that RAT at the STA and the AP. For example, the SME of RAT 1110 may determine GTKSA for RAT 1110.

The method 1110 may continue with the generated GTKSA being stored at on both STA and AP. For example, the GTKSA may be stored on the OMMA 704 of the STA 102 and the OMMA 704 of the AT-A 1102.

In some embodiments, the group key handshake may not be performed on more than one RAT per STA and AP pair. The GTKSA may be installed on RATs that did not perform the group-key handshake. For example, the OMMA 704 of the STA 1002 may install the GTKSA determined for RAT1 1110 on RAT 1112 of STA 102.

In some embodiments, changes to RAT selection or PTKSA/GTKSA update will notify OMMA 704 on both STA and AP. The OMMA 704 may then take the required actions, for example, installing PTKSA and GTKSA in case of a newly enabled RAT, or, installing the refreshed PTKSA/GTKSA on the other RATs that need to be refreshed. For example, when a STA operating in television (TV) white space (TVWS) comes in to the coverage area of a 2.4 GHz ISM band of the same AP, OMMA may be notified about this new RAT. OMMA may install PTKSA and GTKSA on that RAT so that there would be no need to perform separate key generation/distribution process on this new RAT. For example, if RAT1 1110 of STA 102 and AP-A 1102 were TVWS and RAT2 1112 of STA 102 and AP-A 1102 because within range on 2.4 GHz, then the PTK 1 1148 and GTK 1 1168 may be shared with RAT2 1112 of STA 102 and AP-A 1102 so that RAT2 1112 of STA 102 and AP-A 1102 may communicate using PTK 1 1148 and GTK 1 1168.

Figure 12A:
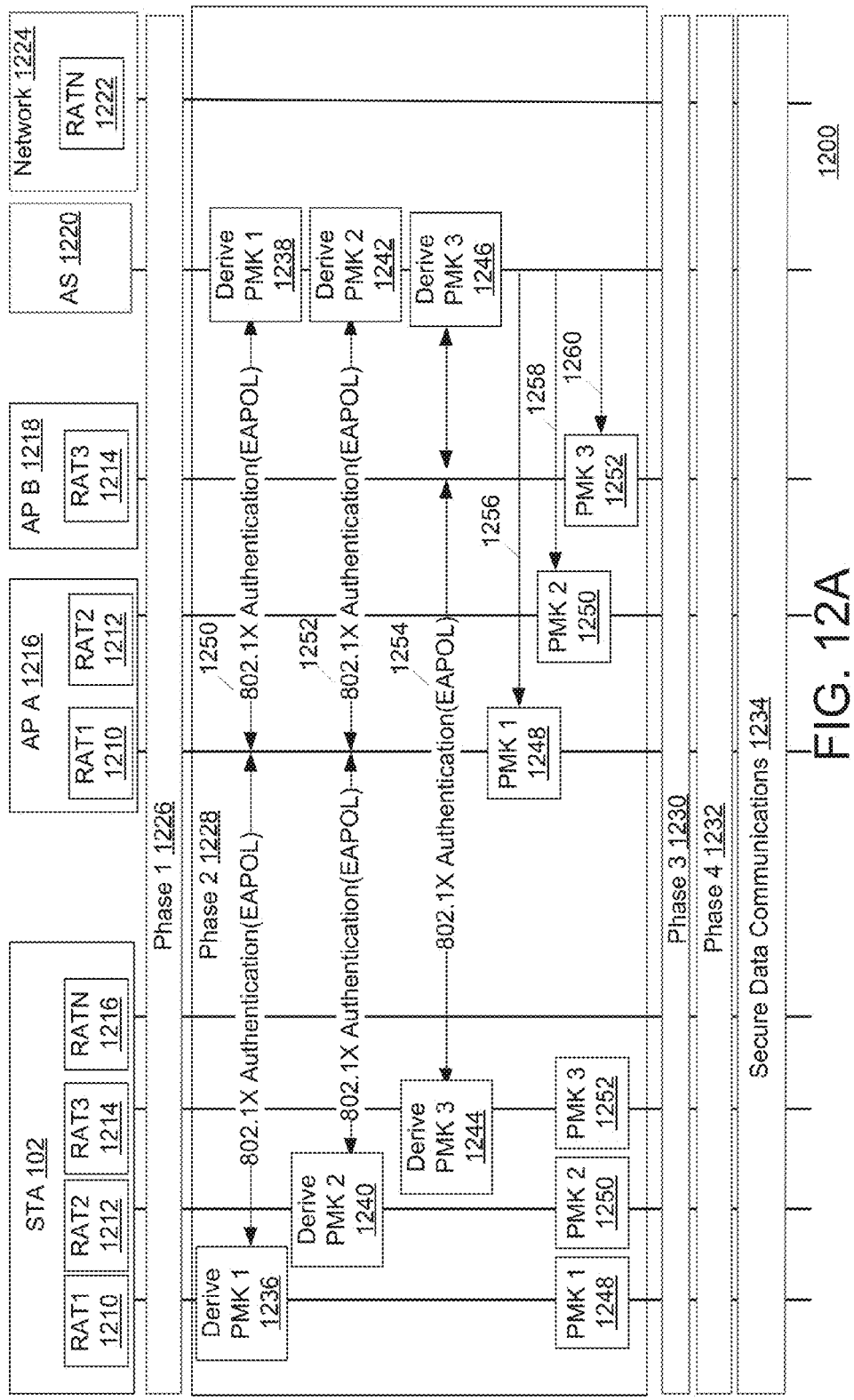
FIGS. 12A, 12B, and 12C schematically illustrate a method for fast security setup.
Figure 12B:
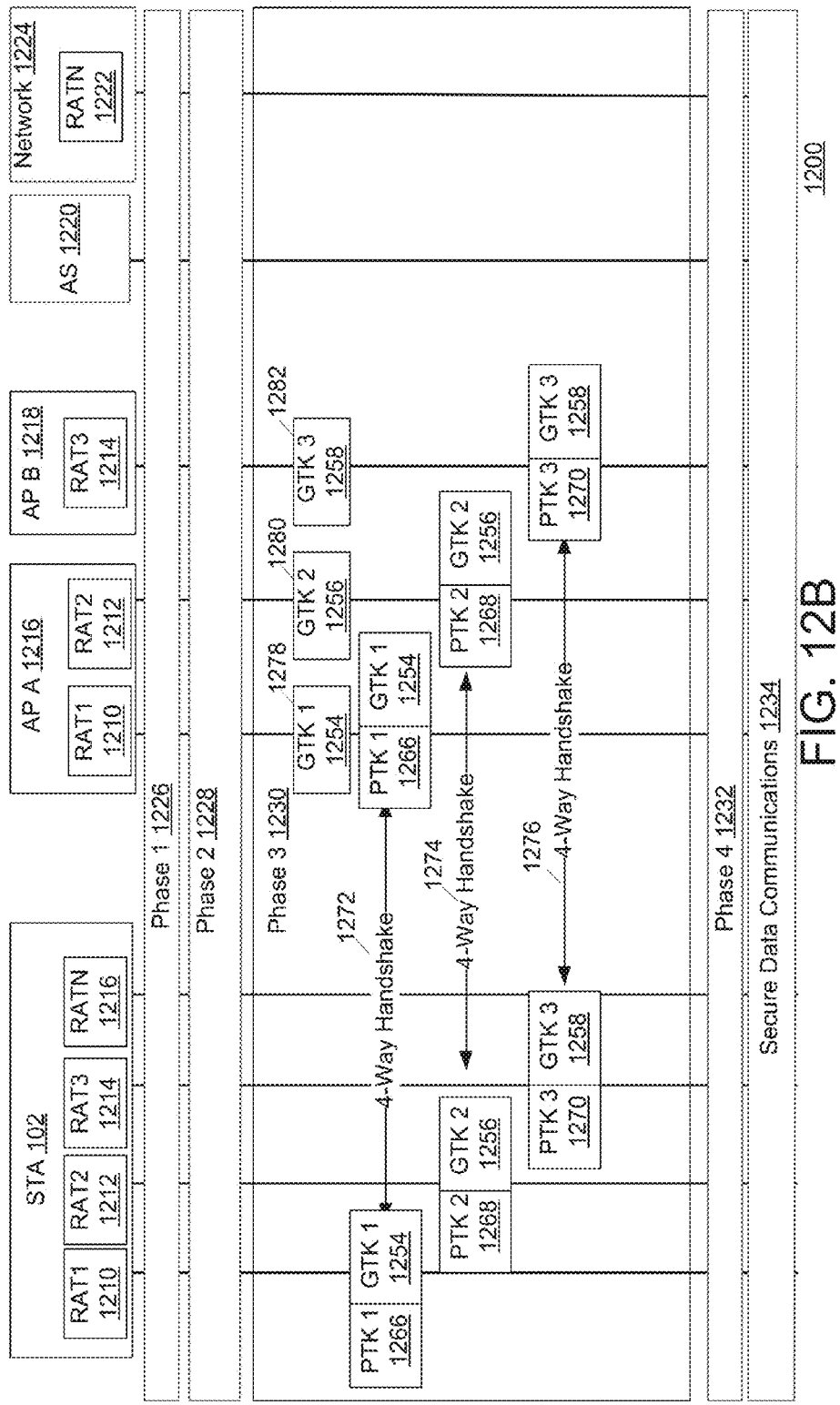
Figure 12C:
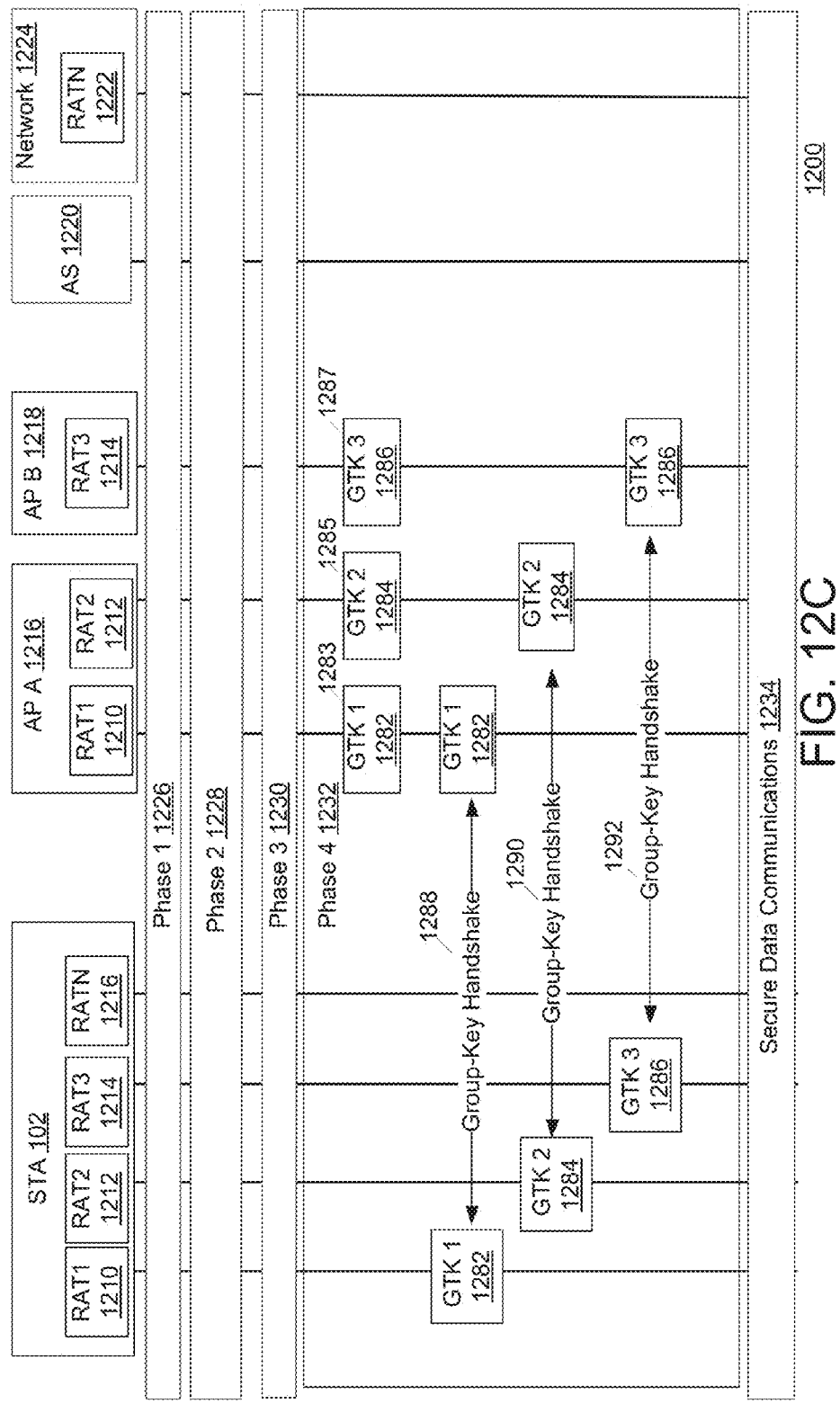

FIGS. 12A, 12B, and 12C schematically illustrate a method 1200 for fast security setup. In the method 1200 there may be a different PMKs, PTKs, and GTKs per RAT.

Illustrated in FIG. 12A is a STA 102, an AP-A 1216, an AP-B 1218, AS 1220, and network 1222. The RATS 1210, 1212, 1214 may have different MAC addresses.

The method 1200 may begin with phase 1 1226. Phase 1 1226 may be a phase 1 has described in conjunction with FIG. 3C and/or a phase 1 as described in conjunction with FIG. 6.

In some embodiments, PMK 1 1248, PMK 2 1250, and/or PMK 3 1252 may be derived based on a pre-existing security association established between STA 102 and AS 1220 or network 1222 may have been performed for access to services in a different domain and possibly using a varied authentication mechanisms and working at a different layers (MAC, Network, and Application layers). The pre-existing security association may be used to create additional security associations between STA 102 and an AP-A 1216 and AB-B 1218. For example, PMK 1248, 1250, 1252 may have been generated as part of those processes and may be re-used or adapted to be used between STA 102 and AP-A 1216 and/or AB-B 1218.

In some embodiments, the method 1200 may continue with RAT1 1210 and AS 1220 performing 802.1X authentication 1250 where RAT1 1210 derives PMK 1 1236 and AS 1220 derives PMK 1 1238 so that they both have PMK 1 1248. The AS 1220 may send the PMK 1 1248 to RAT1 1210 at 1256. Similarly, PMK 1 1250 and PMK 3 1252 are derived. In some embodiments, PMK is derived for each RAT. In some embodiments, PMK may be derived only for some of the RATs of a mult-RAT device 102, 1316, 1318.

The method 1200 may continue with phase 3 1230 as illustrated in FIG. 12B. The method 1200 may continue with generating GTKs at one or more of the RATs. For example, GTK 1 1254 may be generated at 1278, GTK 2 1256 may be generated at 1256, and GTK 3 1258 may be generated at 1280. In some embodiments, a GTK is generated at each RAT.

The method 1200 may continue with deriving the PTK for the RATs. For example, a 4-way handshake as described in conjunction with FIG. 3C may be performed. At 1272 a 4-way handshake is performed between RAT1 1210 of STA 102 and RAT1 1210 of AP-A 1316 to derive PTK 1 1266 and to transfer GTK 1 1254 to RAT1 1210 of STA 102. Similarly, at 1274 a 4-way handshake is performed between RAT2 1212 of STA 102 and RAT2 of AP-A 1316 to derive PTK 2 1268 and to transfer GTK 2 1256 to RAT2 1212 of STA 102. Similarly, at 1276 a 4-way handshake is performed between RAT3 1214 of STA 102 and RAT3 1214 of AP-A 1316 to derive PTK 3 1270 and to transfer GTK 3 1258 to RAT3 1214 of STA 102.

Alternatively, a two-way handshake as described in conjunction with FIG. 8B may be used to transfer GTK and derive PTK.

The method 1200 may continue with phase 4 1232 as illustrated in FIG. 12C. Phase 4 1232 may be performed by an AP 1316, 1318 to update one or more GTKs. Phase 4 1232 may derive different GTKs for different RATs and may use separate group key handshakes to distribute the GTK to STAs on their operating RATs. The method 1200 may continue with generating a new GTK. For example, GTK 1 1282 and GTK 2 1284 may be generated at RAT1 1210 and RAT2 1212, respectfully, of AP-A 1316, and GTK 2 1286 may be generated at RAT3 1214 of AP-B 1316.

The method 1200 may continue with secure data communications 1234. Method 1200 provides a method where different PMKs (phase 2 1228) and PTK (phase 3 1230) may be generated for unicast traffic encryption and different GTK (phase 3 1230) may be generated by APs 1216, 1218 for multicast and broadcast traffic for different RATs. Thus, different PMKSA, PTKSA and GTKSA may be created for each RAT. Different IEEE 802.1X authentication may be performed for each RAT. Different PTKSA enable different encryption and decryption of unicast data on each RAT and different GTKSA enable different encryption and decryption of multicast/broadcast data on each RAT.

In some embodiments, PMKSA caching may be maintained separately for each RAT. To refresh the PTK or in case of roaming each RAT may independently use its PMKSA cache for (re)association to an AP to avoid IEEE 802.1X authentication as described in herein.

Figure 13:
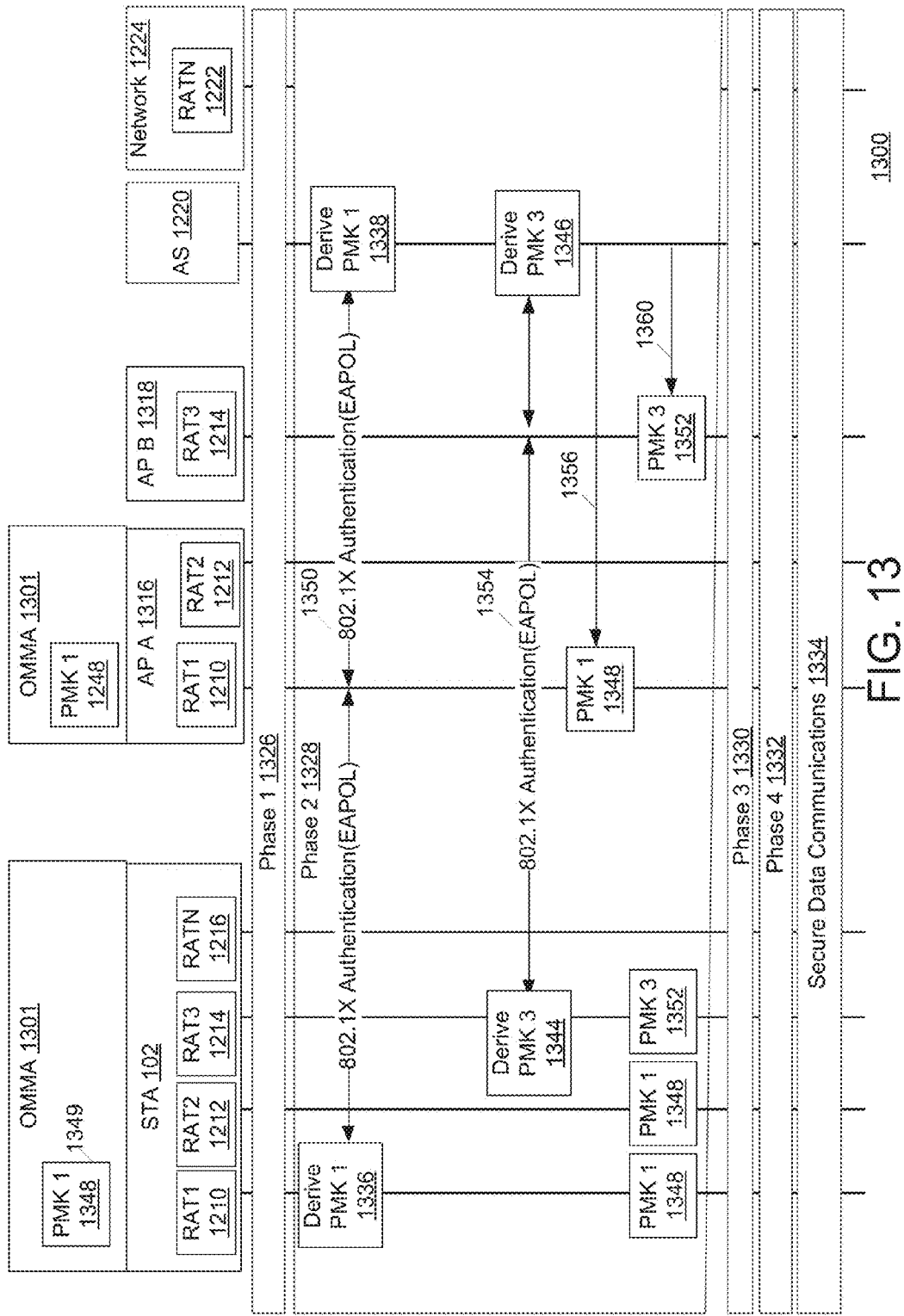
FIG. 13 illustrates a method for fast security setup.

FIG. 13 schematically illustrates a method 1300 for fast security setup. In the method 1300 there may be a common PMK shared by two or more RATs, and different PTKs and GTKs per RAT.

Illustrated in FIG. 13 is a STA 102, an AP-A 1216, an AP-B 1218, AS 1220, and network 1222. The RATS 1210, 1212, 1214 may have different MAC addresses.

The method 1300 may begin with phase 1 1326. Phase 1 1326 may be a phase 1 has described in conjunction with FIG. 3C and/or a phase 1 as described in conjunction with FIG. 6. In some embodiments, the method 1300 includes each RAT of a multi-RAT device performing phase 1 1326 independently.

The method 1300 may continue with authenticating a RAT and sharing the authentication with one or more different RATs. For example, RAT1 1210 of STA 102, RAT1 1210 of AP-A 1316, and AS 1220 may perform a 802.1X authentication process at 1350. PMK 1 1336 may be derived. The AS 1220 may send PMK 1 1348 to RAT1 1210. The OMMA 1301 of STA 102 may share PMK 1 1348 at 1349 with RAT2 1212 of STA 102. So that both RAT1 1210 and RAT2 1212 share PMK 1 1348. The OMMA 1301 of AP-A 1316 may share PMK 1 1248 with RAT2 1212 of AP-A 1316 so that RAT1 1210 and RAT2 1212 of AP-A 1316 may share PMK 1 1348.

In some embodiments, the method 1300 may include performing a common IEEE 802.1X authentication process on one RAT of a multi-RAT device which will be re-used for all RATs of the multi-RAT device using a form of 802.11.

In some embodiments, the method 1300 may include sharing the PMK and the associated security association based on a previous security association, which may be shared with other RATs using OMMA. In some embodiments, the method 1300 may include associating the PMK/PMKSA with a temporary identity that is identifiable at a protocol in a different layer (EAP, HTTP, etc.) as described in conjunction with FIGS. 17 and 18.

In some embodiments, the method 1300 may include each RAT's SME creating the PMKSA on both STA and AP.

In some embodiments, the method 1300 may include a phase 3 1330. For example, phase 3 1330 may be a phase 3 1230 as described in conjunction with FIG. 12B. For example, the 4-way handshake or a 2-way handshake may be performed on each RAT separately to generate their PTKs (at both STA 102 and AP-A 1216) by using PMK 1 1348 and the MAC address of RAT1 1210 and RAT2 1212, and distributing GTKs to STAs operating on that RAT. Each RAT may then install their PTK and GTK on STA and PTK on AP.

In some embodiments, at the completion of phase 3, the SME of the AP may signal to open controlled port on all RATs which have PTK and GTK and did not perform IEEE 802.1X authentication process. In the example of FIG. 13, AP-A 1316 would signal to open controlled port of RAT2 1212.

In some embodiments, the SME of each RAT will create PTKSA and GTKSA at both the STA and the AP so that there may be different PTKSAs and GTKSAs for each RAT on both STA and AP.

The method 1300 may include a phase 4. For example, method 1300 may include a phase 4 as described in conjunction with FIG. 12C. For example, the method 1300 may include the AP updating/refreshing its GTK by generating different GTK for each RAT and distributing the GTK to the associated STAs on their operating RAT by using a separate group key handshake for each RAT.

In some embodiments, the PMKSA cached will be different for each RAT. In some embodiments, the method 1300 may include re-associating or associating by using a cached PMKSA. The STA 102 may associate with an AP and then disassociate with the AP, and then re-associate with the AP. The STA 102 may be configured to store one or more PMKSA in a cache of one or more RATs, which are selected for communication for with an AP. The STA may include one or more PMKIDs that identify the corresponding PMKSA in the RSNIE of its re-association request frame or association request frame. The AP may receive a re-association request or association request with one or more PMKIDs, or another indication that the PMKSA is cached or already authenticated. The AP may then check whether it has a valid PMK for the PMKIDs on each RAT. If the AP does have a valid PMK, then the AP may assert possession of that PMK by beginning phase 3 1330. If the AP does not have a valid PMK, then the AP may begin a phase 2 1328 such as a full IEEE 802.1X authentication only on one RAT (one from the set of selected RATs for this AP-STA pair) after association has completed.

In some embodiments, for pre-authentication, only one RAT (one from the set of selected RATs for an AP-STA pair) will be used to perform pre-authentication. In some embodiments, after successful pre-authentication, the PMK will be installed on all required RATs with the help of OMMA 704.

The method 1300 may continue with secure data communications 1334. Secure data communications between the AP and the STA may be performed with a shared PMK among two or more RATs and a different PTK and GTK.

Figure 14B:
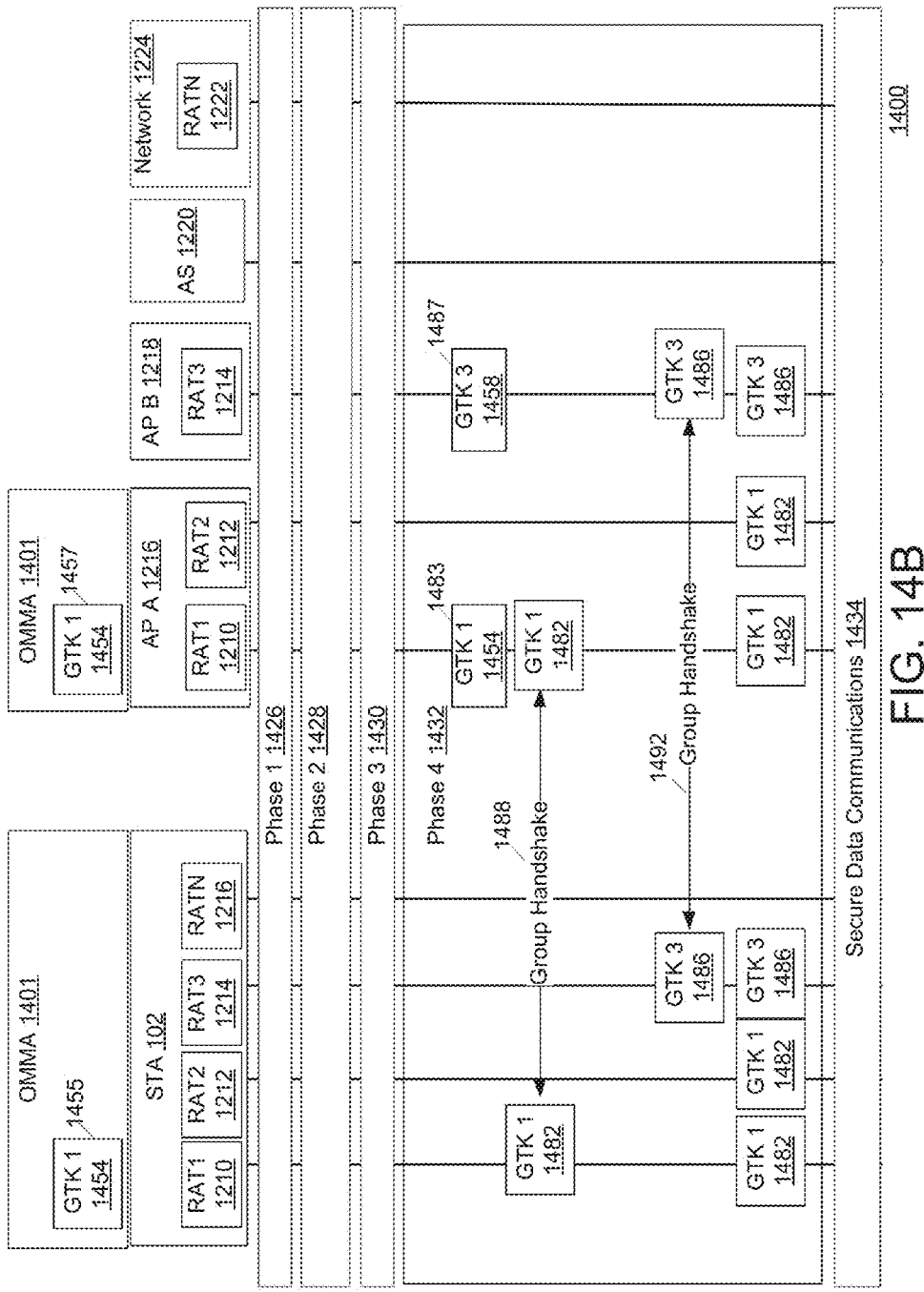

FIGS. 14A and 14B schematically illustrate a method 1400 for fast security setup. In the method 1400 there may be a common GTK shared by two or more RATs, and different PMK and PTK per RAT.

Illustrated in FIGS. 14A and 14B are a STA 102, an AP-A 1216, an AP-B 1218, AS 1220, and network 1222.

The method 1400 may begin with phase 1 1426. Phase 1 1426 may be a phase 1 has described in conjunction with FIG. 3C and/or a phase 1 as described in conjunction with FIG. 6. In some embodiments, the method 1400 includes each RAT of a multi-RAT device performing phase 1 1426 independently.

The method 1400 may continue with phase 2 1428. Phase 2 1428 may be a phase 2 has described in conjunction with FIG. 3B and/or a phase 2 as described in conjunction with FIG. 6, or a phase 2 1228 has described in conjunction with FIG. 12A.

Each of the RATS in method 1400 may perform phase 2 1428 separately. After phase 2 1428, each RAT may have different PMKs on both STA and AP. At both the STA and the AP, the SME of the RAT may create PMKSA for caching as described in conjunction with FIG. 17.

In some embodiments, method 1400 eliminates the different GTK generation for each RAT of a multi-RAT devices for broadcast and multicast data for IEEE 802.1x based authentication process. In some embodiments of method 1400, each RAT will generate separate PTKs but a unique GTK will be generated by the AP for all RATs. The authentication process for each RAT may still be different.

In some embodiments, the AP will generate a GTK by using a RAT, and then the GTK may be shared with one or more other RATs of the AP using, for example, OMMA. The other RATs of the AP may use the same GTK to distribute the GTK to all STAs operating on their corresponding RATs. This common GTK may be installed on other RATs at the STAs too. Thus, there may be a unique GTK for all RATs in a single BSS.

For example, the following is an example of method 1400 as illustrated in FIG. 14A. AP-A 1216 may generate a common GTK 1 1454 by using only RAT1 1210. GTK 1 1454 may be stored at OMMA 1401 of the AP-A 1216.

The OMMA 1401 may install common GTK 1 1454 to all other RATs of the mult-RAT device, for example, AP-A 1216, that are to share GTK 1 1454. For example, OMMA 1401 may install GTK 1 1454 at RAT2 1212.

In some embodiments, after receiving message 2 396 (see FIG. 3C) of the 4-Way handshake (EAPOL-Key(0,1,0,0,P, 0,0, SNonce,MIC,DataKD_M2)) from STA, each RAT of the AP may send the same GTK installed by OMMA 704 to the corresponding RAT of the STA in message 3 402 (see FIG. 3C) of 4-way handshake (EAPOL-Key(1,1,1,1,P,0, KeyRSC, ANonce,MIC,DataKD_M3)). For example, after RAT2 1212 of AP-A 1216 receives message 2 from RAT2 1212 of STA 102, RAT2 1212 may use GTK 1 1454, which is the same GTK 1 1454 that is used by RAT1 1210 of AP-A 1216. In some embodiments, a different PTK may be derived for each RAT.

PTK derivation may be the same as described in conjunction with FIG. 3C on both STA and AP. Alternatively, PTK derivation may be derived as described in conjunction with FIG. 8.

All STAs may receive the same GTK in message 3 (see FIG. 3C) (EAPOL-Key (1,1,1,1,P,0,KeyRSC, ANonce, MIC, DataKD_M3)) of a 4-way handshake on corresponding RATs. For example, RAT1 1210 of STA 102 and RAT2 1212 of STA 102 may receive the same GTK 1 1454.

In some embodiments, after 4-way handshake, all RATs may install different PTKs and same GTK for each RAT on both STA and AP. For example, RAT1 1210 and RAT2 1212 of STA 102 may both install GTK 1 1454, but RAT1 1210 of STA 102 may install PTK 1 1466, and RAT2 1212 of STA 102 may install PTK 2 1468.

After phase 3 1430, two or more RAT s may have the same GTK but the two or more RATs may have different PMKs and PTKs on both the STAs and the AP.

In some embodiments, after installation of PTK and GTK on each RAT, the corresponding SME will create PTKSA and GTKSA.

The method 1400 may continue with phase 4 1432. Phase 4 1432 may enable the AP to update/refresh its GTK.

The following is an example of phase 4 1432. AP-A 1216 may generate GTK 1 1454 using only RAT1 1210. GTK 1 1454 may be stored in OMMA 1401 of AP-A 1216. OMMA 1401 may install GTK 1 1454 in RAT2 1212 of AP-A 1216.

In some embodiments, the AP will transfer the GTK to the STAs. In some embodiments, for each STA, only one RAT of the AP (on which both STA and AP are operating) may perform group key handshake. The AP will send message 1 (see FIG. 3D) of group key handshake (EAPOL-Key(1,1,1, 0,G,0,Key RSC,0, MIC,GTK[N])) with GTK to STAs operating on the corresponding RAT. For example, AP-A 1216 may send GTK 1 1482 in group handshake 1488 to RAT1 1210 of STA 102.

STAs may send message 2 (see FIG. 3D) of group key handshake (EAPOL-Key(1,1,0,0,G,0,0,0,MIC,0)) to AP on the RAT on which it received message 1. For example, STA 102 may send message 2 of group handshake 1488 over RAT1 1210. The GTK received at the STA may be shared with OMMA. For example, OMMA 1401 of STA 102 may share GTK 1 1454 with RAT2 1212 of STA 102. OMMA may install GTK to other RATs at STAs that are sharing the GTK.

All RATs with new GTK may create GTKSA at both STA and AP. For example, RAT1 1210 and RAT2 1212 of STA 102 and of AP-A 1216 may create new GTKSA. The STA 102 may associate with another AP-B 1218 and perform a group handshake 1492 as described in conjunction with FIG. 3D.

In some embodiments, PMKSA caching may be maintained separately for each RAT. To refresh the PTK or in case of roaming each RAT may use its PMKSA cache for (re)association to an AP to avoid IEEE 802.1X authentication as described in conjunction with FIG. 17. Similarly in case of preauthentication as described in conjunction with FIG. 17, a complete procedure may be performed separately for each RAT.

Figure 15:
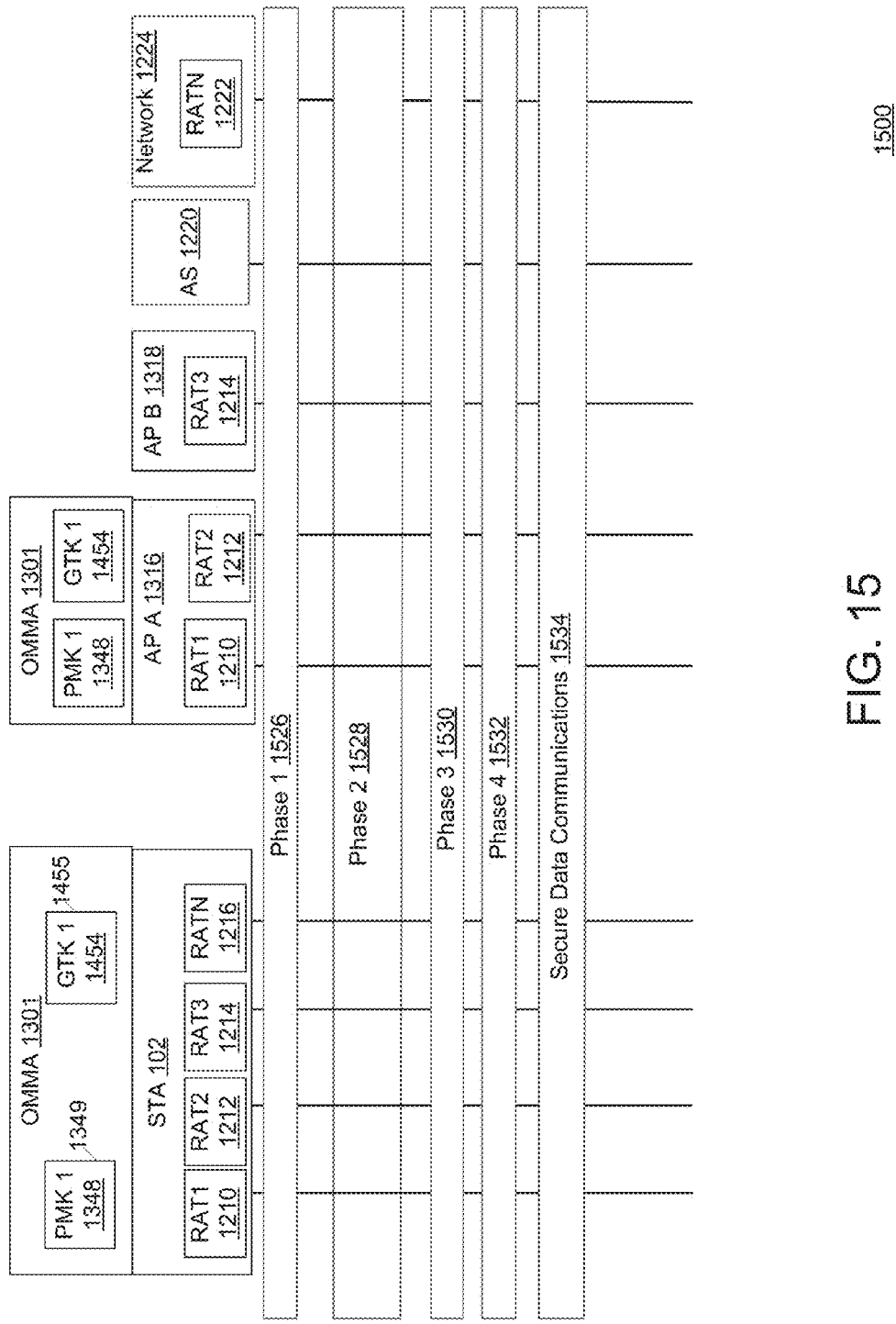
FIG. 15 illustrates a method for fast security setup.

FIG. 15 schematically illustrates a method 1500 for fast security setup. In the method 1500 there may be a common PMK and GTK shared by two or more RATs, and different PTK per RAT.

Illustrated in FIG. 15 are a STA 102, an AP-A 1216, an AP-B 1218, AS 1220, and network 1222.

The method 1500 may begin with phase 1 1526. Phase 1 1526 may be a phase 1 has described in conjunction with FIG. 3C and/or a phase 1 as described in conjunction with FIG. 6. In some embodiments, the method 1500 includes each RAT of a multi-RAT device performing phase 1 1526 independently.

The method 1500 may continue with phase 2 1528. Phase 2 1528 may be a phase 2 as described in conjunction with FIG. 13. In phase 2 1528, the IEEE 802.1X authentication may be performed on only one RAT as discussed in conjunction with FIG. 13. The method 1500 may perform IEEE 802.1X authentication process on only one RAT of a group of RATs that will share a PMK. For example, as discussed in conjunction with FIG. 13, PMK 1 1348 may be shared between RAT1 1210 and RAT2 1212 of STA 102 and AP 1316.

The method 1500 may continue with phase 3 1530. Phase 3 1530 may be a phase 3 as described in conjunction with FIG. 14A where GTK 1 1454 is shared between RAT1 1210 and RAT2 1212 of STA 102 and AP-A 1316. As described in conjunction with FIG. 14A, AP-A 1316 generates a common GTK by using only one RAT, and the common GTK may be stored at OMMA, which may install the common GTK to all other RATs that are sharing the GTK. In some embodiments, during a 4-Way handshake at AP, after receiving message 2 of 4-way handshake (EAPOL-Key(0,1,0,0,P,0,0, SNonce,MIC,DataKD_M2)) from STA, each RAT will use the same GTK installed by OMMA to send it to corresponding STA RAT in message 3 of 4-way handshake (EAPOL-Key(1,1,1,1,P,0,KeyRSC, ANonce, MIC,DataKD_M3)). PTK derivation may be the same as described in conjunction with FIG. 14A. All STAs may receive same GTK in message 3 (EAPOL-Key (1,1,1,1,P,0, KeyRSC, ANonce, MIC, DataKD_M3)) of 4-way handshake on corresponding RATs. In some embodiments, there will be different PTK derivation on each RAT at both STA and AP during 4-way handshake.

In some embodiments, by the end of phase 3 1530, all RATs that are sharing a GTK, will install different PTKs and the same GTK for each RAT on both STA and AP. In some embodiments, by the end of phase 3 1530, the SME of the AP signals to open controlled port on all RATs that are sharing GTK and have a derived PTK and did not perform the IEEE 802.1X authentication process.

In some embodiments, by the end of phase 3 1530, all RATs that are sharing the same GTK may have the same PMK and GTK but different PTKs on both the STA and AP.

After installation of PTK and GTK on each RAT, the SME of the RAT may create a corresponding PTKSA (for unicast data encryption/decryption) and GTKSA (for multicast/broadcast data encryption/decryption).

The method 1500 may continue with phase 4 1532. Phase 4 1532 may be as described in conjunction with phase 4 1432 of FIG. 14B. In some embodiments, the AP will update/refresh its GTK by performing the following steps. The AP may generate GTK by using only one RAT. The AP may store the derived GTK in OMMA. OMMA may install the GTK at all other RATs at the AP that are sharing the same GTK. In some embodiments, for each STA, only one RAT of the RATs that are sharing the same GTK will perform with the AP the group key handshake. The AP may send message 1 of group key handshake (EAPOL-Key(1,1,1,0, G,0,Key RSC,0, MIC,GTK[N])) with GTK to on that corresponding RAT. STAs may send message 2 of Group Key Handshake (EAPOL-Key(1,1,0,0,G,0,0,0,MIC,0)) to AP on the RAT on which it received Message 1. The received GTK may be shared with OMMA at the STA. OMMA may install GTK to all other RATs that are sharing the GTK, and which may have been chosen during phase 1, at the STA.

RATs that have new GTKs from phase 4 1532 may create GTKSAs at both the STA and the AP. PMKSA caching may be different for each MAC address.

Figure 17:
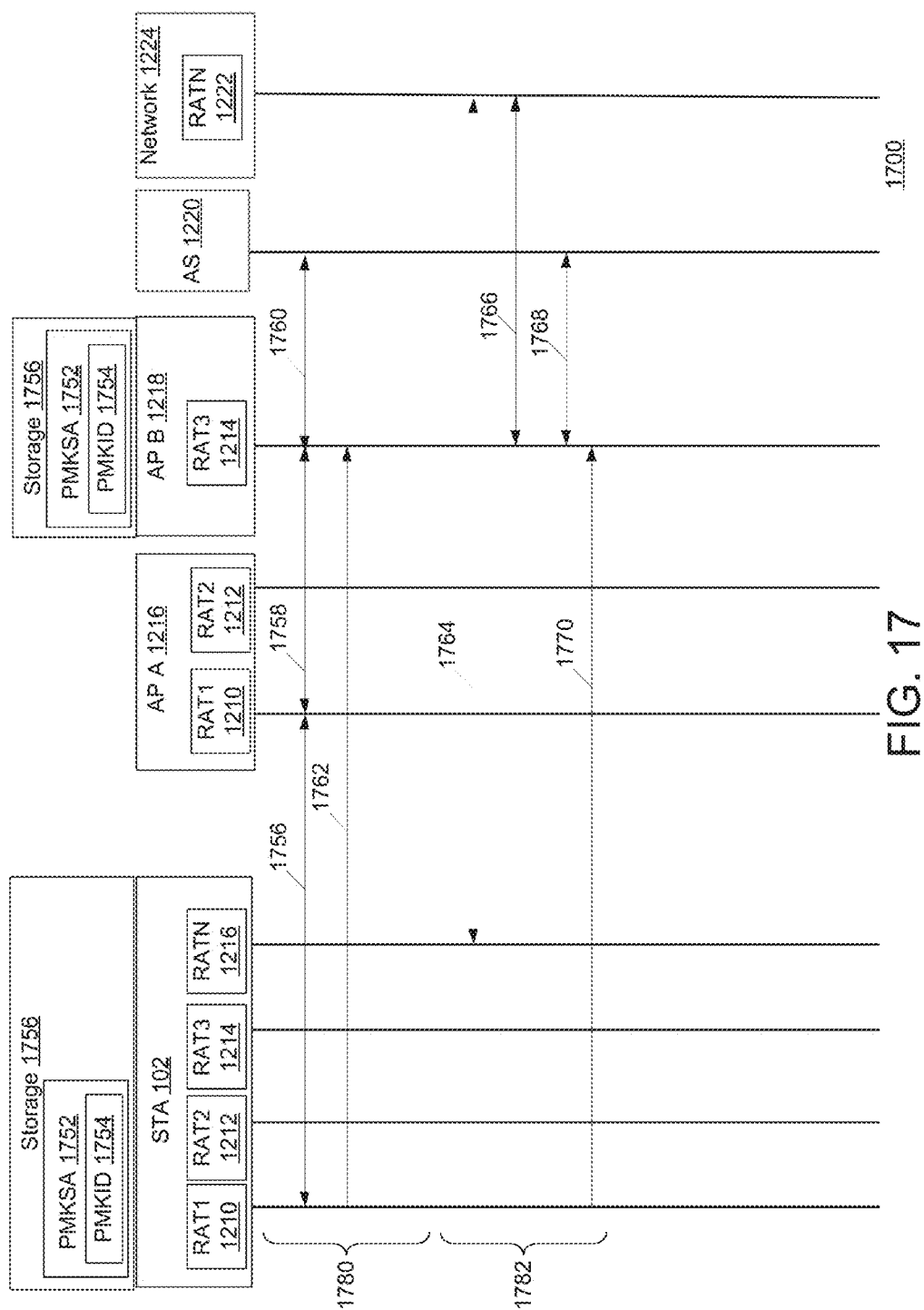
FIG. 17 illustrates a method for fast security setup.

In some embodiments, as described in association with FIG. 17, when a STA 102 may cache the PMKSA with a PMKID and send the PMKID to an AP on a condition that the STA 102 wants to refresh a key, or establish a association with an AP that may have the same PMKSA cached as the STA 102.

In case of pre-authentication, only one RAT (one from the set of chosen RATs in phase 1 for this AP-STA pair) may be used to perform pre-authentication. After successful pre-authentication, PMK key may be installed on all required RATs with the help of OMMA.

Figure 16B:
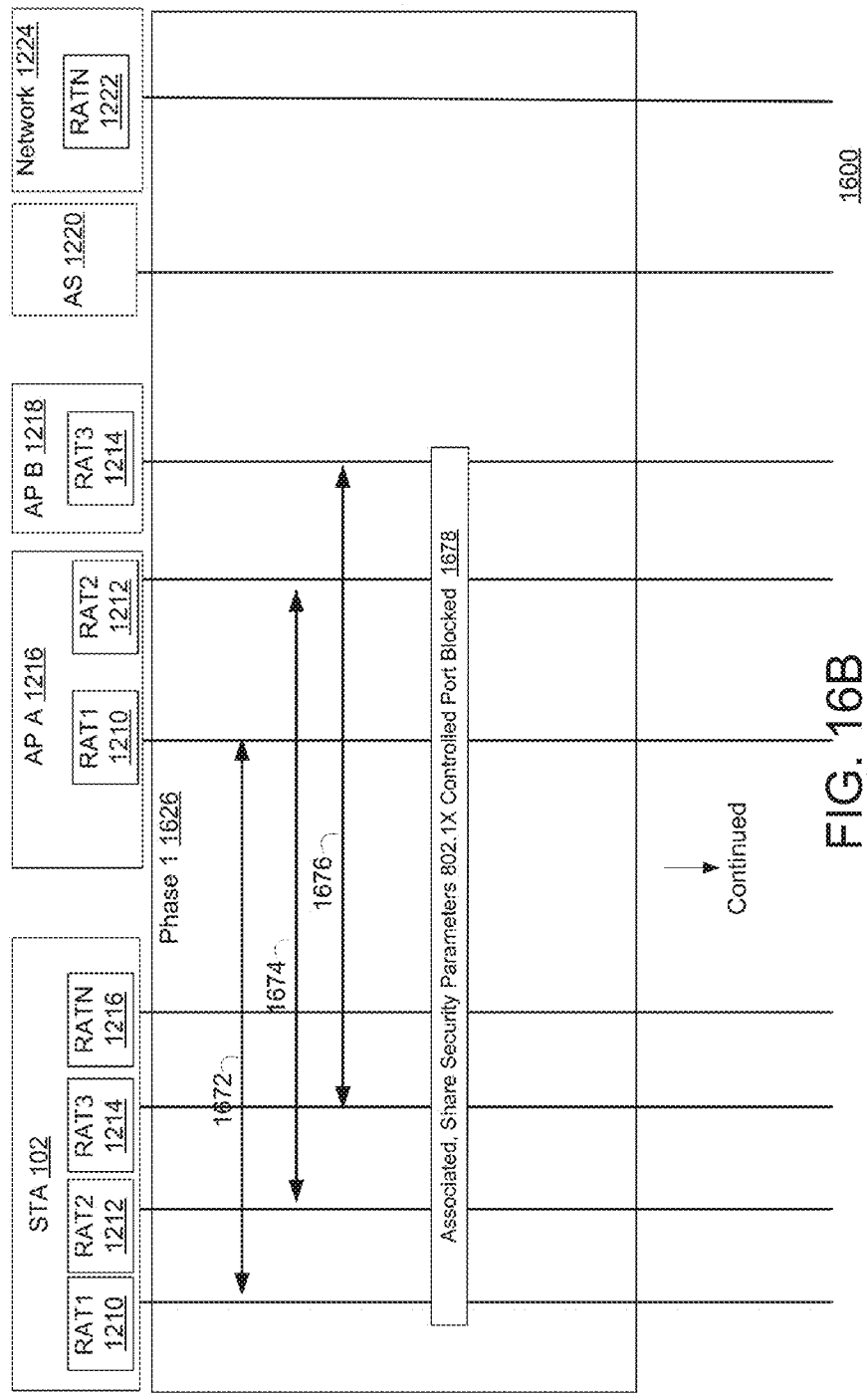
Figure 16C:
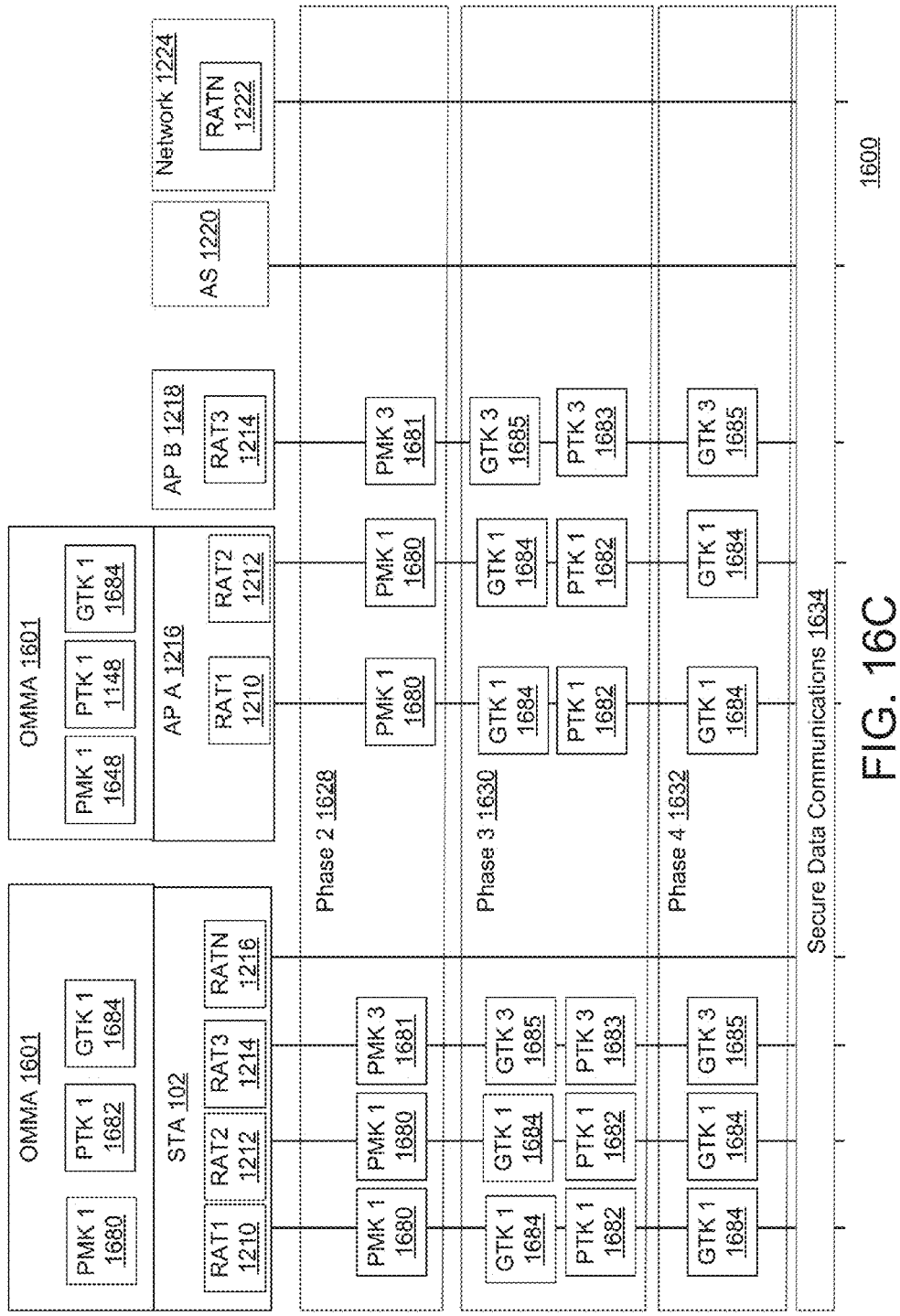

FIGS. 16A, 16B, and 16C schematically illustrate a method 1600 for fast security setup. In the method 1600 there may be a common PMK, GTK, and PTK that is shared with two or more RATs. The RATs that use a common PMK, GTK, and PTK may have a common MAC address.

Illustrated in FIG. 16 are a STA 102, an AP-A 1216, an AP-B 1218, AS 1220, and network 1222.

In some embodiments, the method 1600 may begin with a common MAC address for two or more RATs of a multi-RAT device being generated. For example, the same MAC address (not illustrated) may be generated for RAT1 1210 and RAT2 1212.

The method 1600 may continue with phase 1 1626. Phase 1 1626 may be a phase 1 as described in conjunction with FIG. 3C and/or a phase 1 as described in conjunction with FIG. 6. In some embodiments, the method 1600 includes each RAT of a multi-RAT device performing phase 1 1626 independently.

In some embodiments, phase 1 1426 may be performed on a RAT and then the security parameters 1683 and association shared with one or more RATs of a mult-RAT device.

In phase one 1626, the STA 102, AP-A 1216, AP-B 1218, and, in some embodiments the AS 1220 and/or network 1224, may determine security parameters 1683 to use.

The method 1600 may begin with RAT1 1210 of AP-A 1216 sending a beacon request 1651 at 1650. The beacon request 1651 may include security capabilities supported by RAT1 1210 of AP-A 1216. The beacon request 1651 may include information of the security capabilities of RAT1 1210 of AP-A 1216. The security capabilities may be included in a robust security network (RSN) information element (RSNIE), which may be include in the beacon request 1651. In some embodiments, the beacon request 1651 that includes the RSNIE may be in response to a request (not illustrated) from RAT1 1210 of STA 102.

In some embodiments, the method 300 may include RAT1 1210 of STA 102 sending a probe request 1652. The probe request 1652 may include a request for RAT1 1210 of AP-A 1216 to send security capability information. RAT1 1210 of AP-A 1216 may respond to the probe request 1652 with a probe response 1654 that includes capability information. The capability information may include a RSNIE.

In addition, or alternatively, in some embodiments, the STA 102 may send an 802.11x open authentication request (see FIG. 3A elements 324 at 322). In some embodiments, the AP-A 1216 may respond with an 802.11x open authentication response (see FIG. 3A elements 328 at 326). In some embodiments, the STA 102 and AP-A 1216 may establish an open association that is compatible with protocols prior to the use of IEEE 802.11x RSNA.

The method 1600 may continue at 1656 with the STA 102 determining a set of security capabilities that are supported by both the STA 102 for RAT1 1210 and RAT2 1212 and the AP-A 1216 for RAT1 1210 and RAT2 1212 based on the received security capabilities of the AP-A 1216.

The method 1600 may continue with RAT1 1210 of STA 102 sending the selected security capabilities to the RAT1 1210 of AP-A 1216. For example, the method 1600 may continue with RAT1 1210 of STA 102 sending 1658 an association request 1658. The association request 1658 may include an RSNIE that includes the determined security capabilities.

The method 1600 may continue with the AP-A 1216 sending 1660 an association response 1661. The association response 1661 may include an indication of whether or not the association was successful. As illustrated at 1666 the association between RAT1 1210 of STA 102 and RAT1 1210 of AP-A 1216 was successful. As discussed in conjunction with FIG. 3A other outcomes are possible other than an association 1666. At 1666, RAT1 1210 of STA 102 and RAT1 1210 of AP-A 1216 may be associated with shared security parameters. In some embodiments, a controlled port of 802.1X may be blocked.

The method 1600 may continue at 1662 with the OMMA 1601 of STA 102 sharing the security parameters of RAT1 1210 with RAT2 1212, and at 1664 with the OMMA 1601 of AP-A 1216 sharing the security parameters 1683 of RAT1 1210 with RAT2 1212. An association may then be created at 1668 between RAT2 1212 of STA 102 and RAT2 1212 of AP 1216.

The method 1600 may continue at 1670 with RAT3 1214 of STA 102 and RAT3 of AP-B 1218 performing phase 1 as described in conjunction with FIG. 3A.

Thus, RAT1 1210 and RAT2 1212 of STA 102 may perform an association with RAT1 1210 and RAT2 1212 of AP-A 1216 with one association that is shared with the other RAT. Alternatively, or additionally, each RAT may perform a separate association for phase 1 1626 as illustrated in FIG. 16B. The method 1600 may continue to FIG. 16C.

FIG. 16B schematically illustrates an alternative method of FIG. 16A.

In some embodiments, the method 1600 of FIG. 16B may begin with a common MAC address for two or more RATs of a multi-RAT device being generated. For example, the same MAC address (not illustrated) may be generated for RAT1 1210 and RAT2 1212.

The method 1600 may continue at 1672 with RAT1 1210 of STA 102 and RAT1 1210 of AP-B 1218 performing phase 1 as described in conjunction with FIG. 3A or FIG. 6.

The method 1600 may continue at 1674 with RAT2 1212 of STA 102 and RAT2 1212 of AP-B 1218 performing phase 1 as described in conjunction with FIG. 3A or FIG. 6.

The method 1600 may continue at 1676 with RAT3 1214 of STA 102 and RAT3 1214 of AP-B 1218 performing phase 1 as described in conjunction with FIG. 3A or FIG. 6.

Thus, RAT1 1210, RAT2 1212, RAT3 1216 of STA 102 may perform phase 1 1626 association separately. The method 1601 may continue to FIG. 3C or FIG. 6.

The method 1600 may continue with phase 2 1628 as illustrated in FIG. 16C. Phase 2 1628 may be a phase 2 as described in conjunction with FIG. 3B and/or a phase 2 as described in conjunction with FIG. 6.

In some embodiments, authentication and key generation may be based on the common MAC address that may be shared with two or more RATs. Thus, a common PTK and GTK will be generated for all RATs that share the same MAC address. For example, in FIG. 16C, RAT1 1210 and RAT2 1212 may share the same MAC address. RAT1 1210 and RAT2 1212 on both the STA 102 and the AP-A 1216 may share the same PMK 1 1680, PTK 1 1682, and GTK 1 1684. Additionally, RAT1 1210 and RAT2 1212 may share the same security parameters 1683 and association as described in conjunction with FIG. 16A.

Phase 2 1628 may be a phase 2 as illustrated in FIG. 13 where PMK 1 1680 may be generated on RAT1 1210 or RAT2 1212 and then shared with the other RAT using OMMA 1661 at both the STA 102 and the AP-A 1216. RAT3 1214 may generate PMK 3 1681 separately. In some embodiments, the STA 102 using RAT1 1210, AP-A 1216 using RAT1 1210 and AS 1220 may perform an IEEE 802.1X authentication. The SME of STA 102 and AP-A 1216 may create the PMKSA, which may be installed by the OMMA 1601 on RAT2 1212.

Thus, at the end of phase 2 1628, a PMK may be shared by more than one RAT on a mult-RAT device and an authentication process may have been performed for only one RAT and shared with one or more RATs.

The method 1600 may continue with phase 3 1630. Phase 3 1630 may be a phase 3 as described in conjunction with FIG. 3C and/or a phase 3 as described in conjunction with FIG. 6.

In some embodiments, phase 3 1630 may be a phase 3 as described in conjunction with FIG. 11 where a 4-way handshake may be performed on a RAT of a mult-RAT device and then the PTK generated may be shared with one or more other RATs of the multi-RAT device. Additionally, as disclosed in FIG. 11, the AP may generate a GTK, which in the case of FIG. 16 may be using a common MAC address. The generated GTK may be stored at an OMMA and then shared with other RATs.

For example, in FIG. 16C, AP-A 1216 may generate GTK 1 1684 which may be shared at the OMMA 1601 with RAT2 1212 of AP-A 1216.

RAT1 1210 of STA 102 and AP-A 1216 may perform the 4-way handshake, or alternatively the 2-way handshake as described herein, to generate the PTK 1 1682 and to transfer GTK 1 1684 to RAT1 1210 of STA 102. OMMA 1601 of STA 102 may then share the GTK 1 1684 and PTK 1 1682 with RAT2 1212 of STA 102. PTK 1 1682 may be generated with the common MAC address of RAT1 1210 and RAT2 1212 on both the STA 102 and AP-A 1216. SME of RAT1 1210 may create PTKSA and GTKSA on that RAT1 1210 at STA 102 and AP-A 1216. The OMMA 1601 may share the PTKSA and GTKSA with RAT2 1212 on both the STA 102 and AP-A 1216.

AP-A 1216 may generate GTK 3 1685 and perform the 4-way handshake (as described in conjunction with FIG. 3C) with RAT3 1214 of STA 102.

SME of AP-A 1216 may signal to open controlled port on RAT2 1212, which did not perform IEEE 802.1X authentication process.

The method 1600 may include secure data communications 1634 when PTKSA is used for unicast messages, and GTKSA is used for multicast/broadcast on all RATs, which are required for communication for current BSS for data encryption.

The method 1600 may continue with phase 4 1632. The method 1600 may continue with phase 4 1632. Phase 4 1632 may be a phase 4 as described in conjunction with FIG. 3D and/or a phase 4 as described in conjunction with FIG. 6.

In some embodiments, phase 4 1632 may be a phase 4 as described in conjunction with FIG. 11.

The AP will update/refresh its GTK in phase 4 1632. AP-A 1216 may generate GTK 1 1684 and GTK 3 1685. GTK 1 1684 may be generated using the common MAC address of RAT1 1210 and RAT2 1212. GTK 1 1684 may be stored at the OMMA 1601 of AP-A 1216 and then shared with RAT2 1212 of AP-A 1216.

For each STA that will share GTK, only one RAT of the RATS that will share GTK will perform the group key handshake with the AP. The RAT of the AP will send message 1 of group key handshake (EAPOL-Key(1,1,1,0, G,0,Key RSC,0, MIC,GTK[N])) (see FIG. 3D) with GTK to STAs operating on that corresponding RAT. STA will send message 2 of group key handshake (EAPOL-Key(1,1,0,0, G,0,0,0,MIC,0)) to AP on the RAT on which it received message 1.

For example, AP-A 1216 will generate a new GTK 1 1684 for RAT1 1210. GTK 1 1684 will be shared with RAT2 1212 by, for example, OMMA 1601. AP-A 1216 will send GTK 1 1684 to STA 102 using RAT1 1210. The STA 102 will respond over RAT1 1210 with message 2 of the group key handshake. The OMMA 1601 of STA 102 will share GTK 1 1684 of RAT1 1210 with RAT2 1212.

The SME of the RAT creates GTKSA on that RAT at STA and AP. The GTKSA may be stored at OMMA 1601 on both STA and AP. For example, in FIG. 16C the SME of RAT1 1210 of STA 102 and AP-A 1216 creates the GTKSA. The GTKSA is then stored in the OMMA 1601 of the STA 102 and AP-A 1216.

On other RATs that share GTK the group key handshake is not performed. Instead, OMMA 1601 installs the GTKSA on all other RATs that share the GTK. For example, RAT2 1212 of STA 102 and AP-A 1216 do not perform the group key handshake according to the embodiment disclosed in FIG. 16C.

PMKSA caching will be enabled only on each RAT. Whenever a STA wants to refresh a PTK or in case of roaming, the STA may only refresh the PTK on one of the shared RATs and then the OMMA 1601 may share the refreshed PTK.

Upon receipt of a re-association or association request with one or more PMKIDs, an AP may check whether it has a valid PMK for the PMKIDs. If the AP does have a valid PMK, the AP may assert possession of the valid PMK by beginning the 4-Way Handshake on the RAT (or two-way handshake) where it received the re-association or association request. If there is no valid PMK, then the AP may begin a full IEEE 802.1X authentication only on one RAT of a group of RATs that will share the PMK. Any new generated information (e.g. PMKSA/PTKSA/GTKSA) may be shared with other RATs that share this information. The OMMA 1601 may be used to share the information.

In case of pre-authentication, only one RAT, which may be the same RAT selected in phase 1, will be used to perform pre-authentication. A change regarding RAT selection or sharing, may prompt the OMMA 1601 to send updates of one or more of PTKSA/GTKSA/PMKSA to one or more RAT protocol stacks on both the STA and the AP. OMMA 1601 may install PMKSA, PTKSA and GTKSA on RATs that share or on a newly enabled RAT. For example, when a STA operating in TVWS comes in to the coverage area of 2.4 GHz industrial, scientific and medical (ISM) band of the same AP, OMMA 1601 may be notified about this new RAT on the 2.4 GHz. OMMA 1601 may install PMKSA, PTKSA and GTKSA on the 2.4 GHz RAT, so that there is no need to perform separate authentication and key generation/distribution processes on the new 2.4 GHz RAT. The method 1600 may end.

FIG. 17 schematically illustrates a method 1700 for fast security setup. In the method 1700, a PMKID 1754 may be used to identify a PMKSA 1752. Illustrated in FIG. 17 are a STA 102, an AP-A 1216, an AP-B 1218, AS 1220, and network 1222.

A STA 102 may be associated with AP-A 1216. The STA 102 may preauthenticate with AP-B 1218. In some embodiments, AP-A 1216 and AP-B 1218 are in the same extended service set (ESS). For example, STA 102 may preauthenticate with AP-B 1218 and create a PMKSA 1752.

In some embodiments, preauthentication may improve performance by performing an IEEE 802.1X authentication for a STA 102 to an AP 1218 through which it can be associated in the future.

The STA 102 may have completed the 4-Way Handshake and has configured the required temporal keys with AP-A 1216 and request its IEEE 802.1X authentication with a new AP in the ESS.

As illustrated in example 1780, STA 102 may start this process by sending the EAPOL-Start message of IEEE 802.1X authentication 1756. This EAPOL-Start message has the destination address as AP-B 1218 and the basic service set identification (SSID) (BSSID) of a targeted AP-B 1218, and the RA being the BSSID of AP-A 1216 with which STA 102 is associated. AP-A 1216 passes the message 1756 to AP-B 1218 so that STA 102 can authenticate with AP-B 1218, which may include messages 1760 with the AS 1220.

When AP-B 1218 receives the EAPOL-Start message, AP-B 1218 may initiate the process of authentication with, for example, IEEE 802.1X authentication with the STA 102. The messages 1756 may be forwarded through the distribution system (not illustrated). The result of this preauthentication may be a PMKSA 1752 on the STA 102 and AP-B 1218. When the STA 102 determines to connect to AP-B 1218, and both the STA 102 and AP-B 1218 have a valid PMKSA 1752 cached, then the STA 102 can directly send a re-associate or associate request 1762 with the corresponding PMKID 1754.

Thus, the IEEE 802.1X authentication process may be avoided during the association process. In some embodiments, a STA 102 can also start its pre-authentication with AP-B 1218, if that AP-B 1218 advertises the pre-authentication capability in the RSNIE.

In some embodiments, in an ESS, the STA 102 deletes the PTKSA and GTKSA when it disassociates/deauthenticates from a BSSID. Similarly, the AP-B 1218 deletes the PTKSA for the deauthenticated/disassociated STA 102. But the STA 102 and/or AP-B 1218 may have the PMKSA 1752 cached for those deauthenticated/disassociated AP-B 1218 and/or STA 102 until the expiration of the lifetime of the PMKSA 1752. The STA 102 and AP-B 1218 may retain PMKs to which they have previously performed an authentication, for example a full IEEE 802.1X authentication. In some embodiments, the PMKSA 1752 cannot be changed while cached. The STA 102 and/or AP-B 1218 may associate an PMKID 1754 with the PMKSA 1752 so that the PMKSA 1752 may be identified.

For example, if a STA 102 determines to re-associate and/or associate to AP-B 1218 for which AP-B 1218 has a PMKSA in its cache, it includes one or more PMKIDs 1754 for PMKSAs 1756 in the RSNIE of its re-association and/or association request frame.

Upon receipt of a re-association and/or association request with one or more PMKIDs 1754, AP-B 1218 may be configured to check whether it has a valid PMKSA 1752 corresponding to the PMKIDs 1754. If AP-B 1218 does have a valid PMKSA 1752 corresponding to one of the PMKIDs 1754, then AP-B 1218 may assert possession of that PMKSA 1752 by beginning phase 3 of the security association. IN some embodiments, if AP-B 1218 does not have a valid PMKSa 1752 corresponding to one of the PMKIDs 1754, then AP-B 1218 may begin a full authentication process such as a IEEE 802.1X authentication.

Thus, caching the PMKSA 1752 may save a complete authentication such as an IEEE 802.1X authentication. The following are examples when association and/or re-association may occur where the PMKID 1754 may be used to identify a PMKSA 1752 to avoid a full authentication. (1) a STA 102 may be roaming within an ESS and come to a new BSS where it determines to associate to AP-B 1218 with which it has already performed IEEE 802.1X authentication process, the STA 102 may then send a re-association message with the PMKID 1754; (2) a STA 102 in a fixed location loses its connection to AP-B 1218 due to some interference or other reasons, and then the STA 102 send a re-association message with the PMKID 1754; or (3) a STA 102 wants to refresh its PTK with its current AP-B 1218 and uses the PMKID 1754 to reference the PMKSA 1752 to avoid a full authentication.

Example 1782 illustrates STA 102 pre-authenticating with AP-B 1218 using the network 1224, which may be a long-term evolution (LTE) network or other 3rd Generation Partnership Project (GPP) (3GPP), 4th GPP (4GPP), 802.16, or another suitable network, to pass back and forth messages to AP-B 1218. Message 1764 is STA 102 sending the EAPOL-Start message of IEEE 802.1X authentication. This EAPOL-Start message has the destination address as AP-B 1218 and the BSSID of a targeted AP-B 1218. The EAPOL-start message may be encapsulated in a higher layer protocol and then sent to the AP-B 1218. Network 1224 passes the message 1764 to AP-B 1218 using messages 1766 so that STA 102 can authenticate with AP-B 1218, which may include messages 1768 with the AS 1220. Message 1770 may be an association message with the AP-B 1218 that includes PMKID 1754 identifying a PMKSA 1752 generated during authentication via network 1224.

Figure 18:
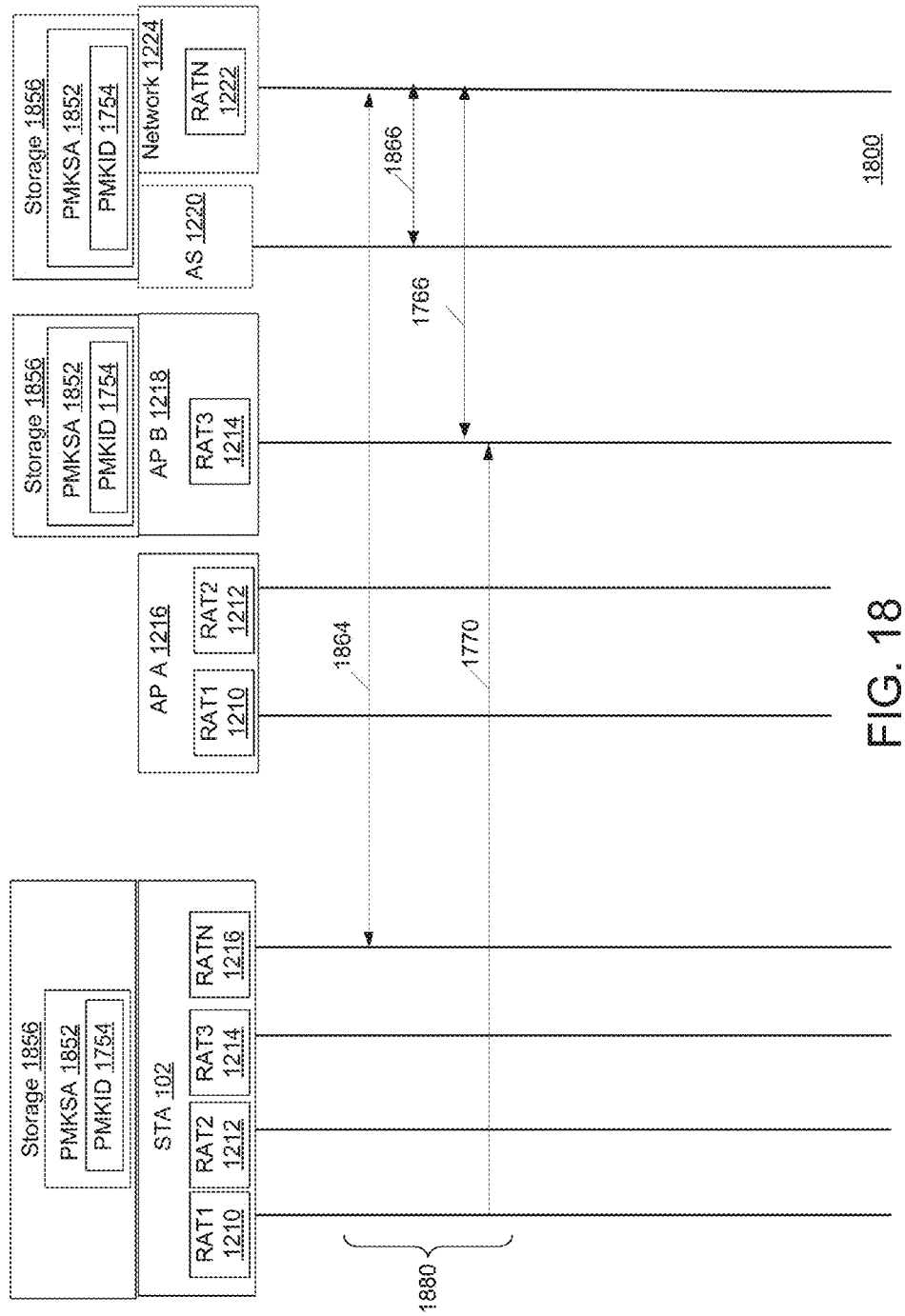
FIG. 18 illustrates a method for fast security setup.

FIG. 18 schematically illustrates a method 1800 for fast security setup. In the method 1800, one or more security parameters may be sent from the network 1224 to the STA 102 and/or an AP 1216, 1218.

Illustrated in FIG. 18 are a STA 102, an AP-A 1216, an AP-B 1218, AS 1220, and network 1224.

A pre-existing security association established between a STA 102 and AS 1220 that may have been performed for access to services in a different domain and possibly using a varied authentication mechanisms and working at a different layers (MAC, Network, and Application layers) may be used to create additional security associations between STA 102 and an AP 1216, 1218. Therefore, a MSK/PMK 1852 that has been generated as part of the previous process may be re-used or adapted to be used between a STA 102 and AP 1216, 1218 in a multi-RAT scenario.

In order to leverage an existing security association, an identity is generated that associates the PMKSA and the associated MSK/PMK which can then be used for identification and authentication and/or authorization purposes across multi-RAT systems, across multi-layers and multi-domains.

For example, example 1880 illustrates a STA 102 establishing a security association with network 1224 at 1864. The network 1224 may access an AS 1220 at 1866. Alternatively or additionally, the network 1224 may include an AS 1220. Alternatively or additionally, the network 1224, which may be an LTE network 1224, may pass the messages 1864 between the STA 102 and the AS 1220. The authentication may result in a PMKSA 1852, which may be stored at the STA 102, AS 1220, and/or the network 1224. The PMKSA 1852 may be generated separately at the STA 102 and the AS 1220 and/or network 1224. A PMKID 1754 may optionally be associated with the PMKSA 1852 to identify the PMKSA 1852.

At message 1766, the network 1224 may send the PMKSA 1852 with the associated PMKID 1754 to the AP-B 1218.

At message 1770 the STA 102 may send an association request to the AP-B 1218 which includes the PMKID 1754. The AP-B 1218 may respond with determining there is a valid PMKSA 1852 and then beginning the 4-way handshake to generate the temporal keys, which may be based on keys MSK/PMK, or a derivative of MSK/PMK.

Figure 19:
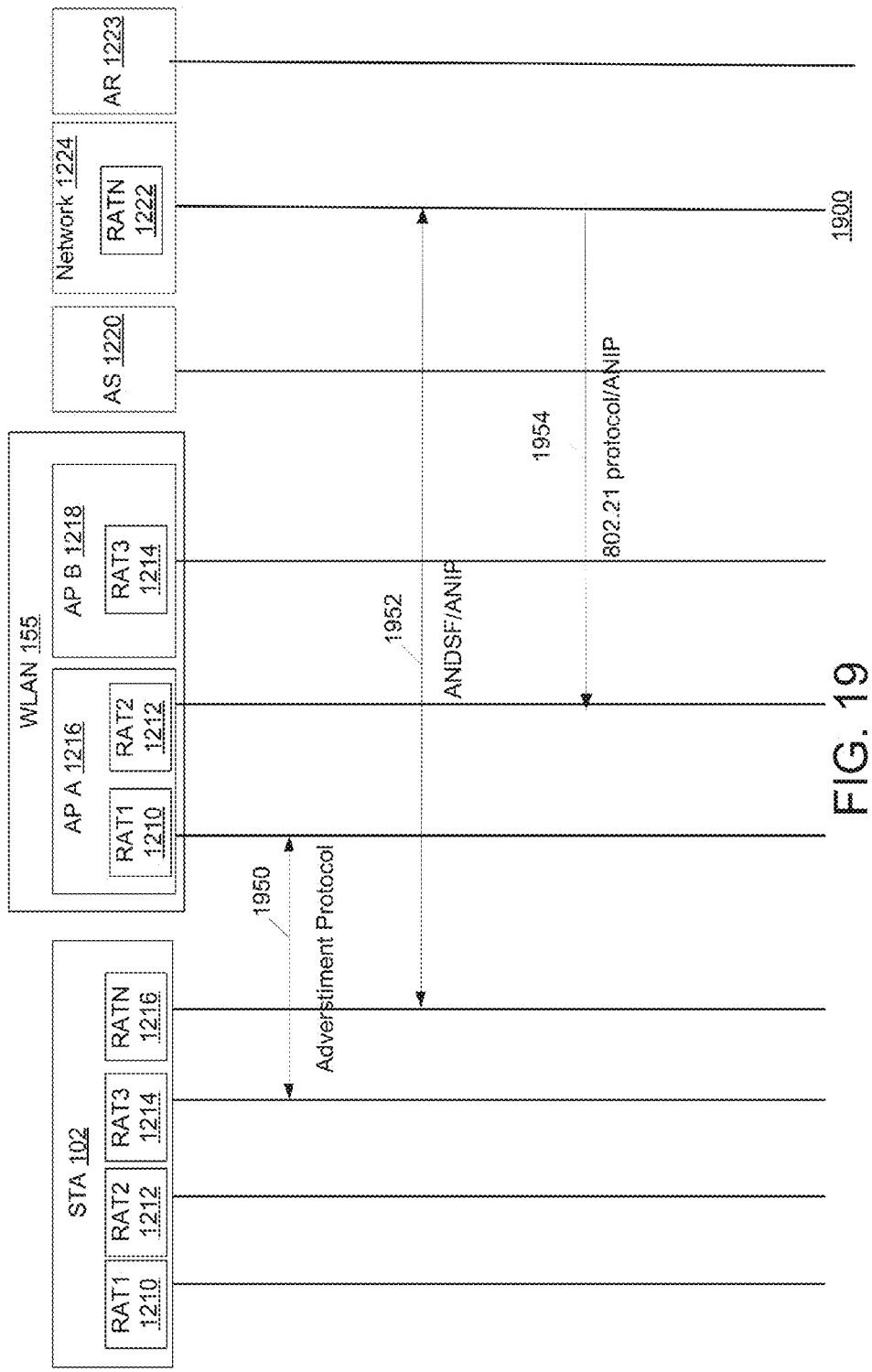
FIG. 19 illustrates protocols for carrying identity and security parameters.

FIG. 19 schematically illustrates protocols for carrying identity and security parameters. Illustrated in FIG. 19 is a STA 102, an AP-A 1216, an AP-B 1218, AS 1220, WLAN 155, network 1222, and address resolution 1223.

The Access Network Information Protocol (ANIP) may be used to carry information such as identity information, security capability information and security parameters of, for example, APs 1216, 1218, STAs 102, and networks 1224.

Message 1950 may be an advertisement beacon received by the STA 102 from the AP-A 1216, which may include information regarding the AP-A 1216. ANIP may be used to carry the information between the STA 102 and the network 1224 at messages 1952. ANIP may be used to carry the information from the network to the AP 1216, 1218 at messages 1954.

In some embodiments, ANIP may be an application layer protocol such as HTTP, or based on applications using TCP or UDP or using Ethernet/MAC-layer protocols such as Extensible Authentication Protocol (EAP) carried over Radius/Diameter/HTTP etc. ANIP may be used in a push mode or pull mode and can also use other protocols depending upon the mode being used.

In some embodiments, ANIP may carry WLAN 155 identity information from the STA 102 to the network 1224 (messages 1952). The WLAN 155 identify information may include one or more of the following. BSSID of AP 1216, 1218. MAC address of the AP 1216, 1218. SSID: identity of the AP 1216, 1218, which in some embodiments may be displayed for as a readable string. HESSID, which may be the MAC address of an AP 1216, 1218 that represents the WLAN 155 or AP 1216, 1218. Higher-layer identity of WLAN 155, AP 1216, 1218, which may be one or more of the following: IP address of AP 1216, 1218 or WLAN 155, URI/uniform resource locator (URL) associated with the WLAN 155/AP 1216, 1218. Identity Based Encryption (IBE) of AP 1216, 1218. IBE of STA 102.

In some embodiments, ANIP may carry security information and parameters from the STA 102 to the network 1224. The security information and parameters may include one or more of the following. Security protocols supported by AP 1216, 1218, which may include one or more of the following. Re-authentication protocol, which may include one or more of EAP-RP, ORTA, EAP-FAST. Capability to perform perfect forward secrecy (PFS): IBE, public/private key. Crypto suite, which may be the type of cryptography suites that are supported.

Security parameters may include one or more of the following. STA 102 nonce, which may be used for key generation. AP 1216, 1218 nonces if transported per STA 102 in a probe response message. Security Posture, which may provide a qualitative or quantitative information about the level of security assurance of the AP 1216, 1218 or WLAN 155. Public key of AP 1216, 1218, which may be used in case of PFS and sent in a robe response message. Public key of STA 102, which may be used in case of PFS. URI to an AP's 1216, 1218 certificate. URI to a WLAN 155 detailed assurance information.

In some embodiments, ANIP may include miscellaneous requests from the STA 102 to the network 1222. The miscellaneous request may include an IP address request by the STA 102.

In some embodiments, ANIP may include identity and security parameters sent from the network 1222 to the AP 1216, 1218/WLAN 155. The identity and security parameters may include one or more of the following. The identity of the STA 102, which may include one or more of the following. Temporary identity of STA 102, which may include ORTA-ID, EMSKName, TMPI, or other suitable temporary identification. Identity based encryption (IBE) of STA 102. Permanent identity of STA 102, for example xyz@realm.com. Miscellaneous requests, which may include an Internet Protocol (IP) address request on behalf of the STA 102, requesting Dynamic Host Configuration Protocol (DHCP) service on behalf of STA 102. Security protocols supported by STA 102, which may include one or more of the following. Re-authentication protocol, where the protocols may include one or more of EAP-RP, EAP-ORTA, EAP-FAST. Capability to perform perfect forward secrecy (PFS): IBE, public/private. Crypto suite supported at STA 102, which may be the cryptographic suites supported at the STA 102. Security parameters, which may include one or more of the following. Re-authentication master key (rMSK), which may be derived from MSK/PMK, and associated lifetime. Nonces, which may be used for key generation. Security posture, which may provide qualitative or quantitative information about the level of security assurance of the STA 102. Public key of STA 102, which may be used in case of PFS.

Figure 20:
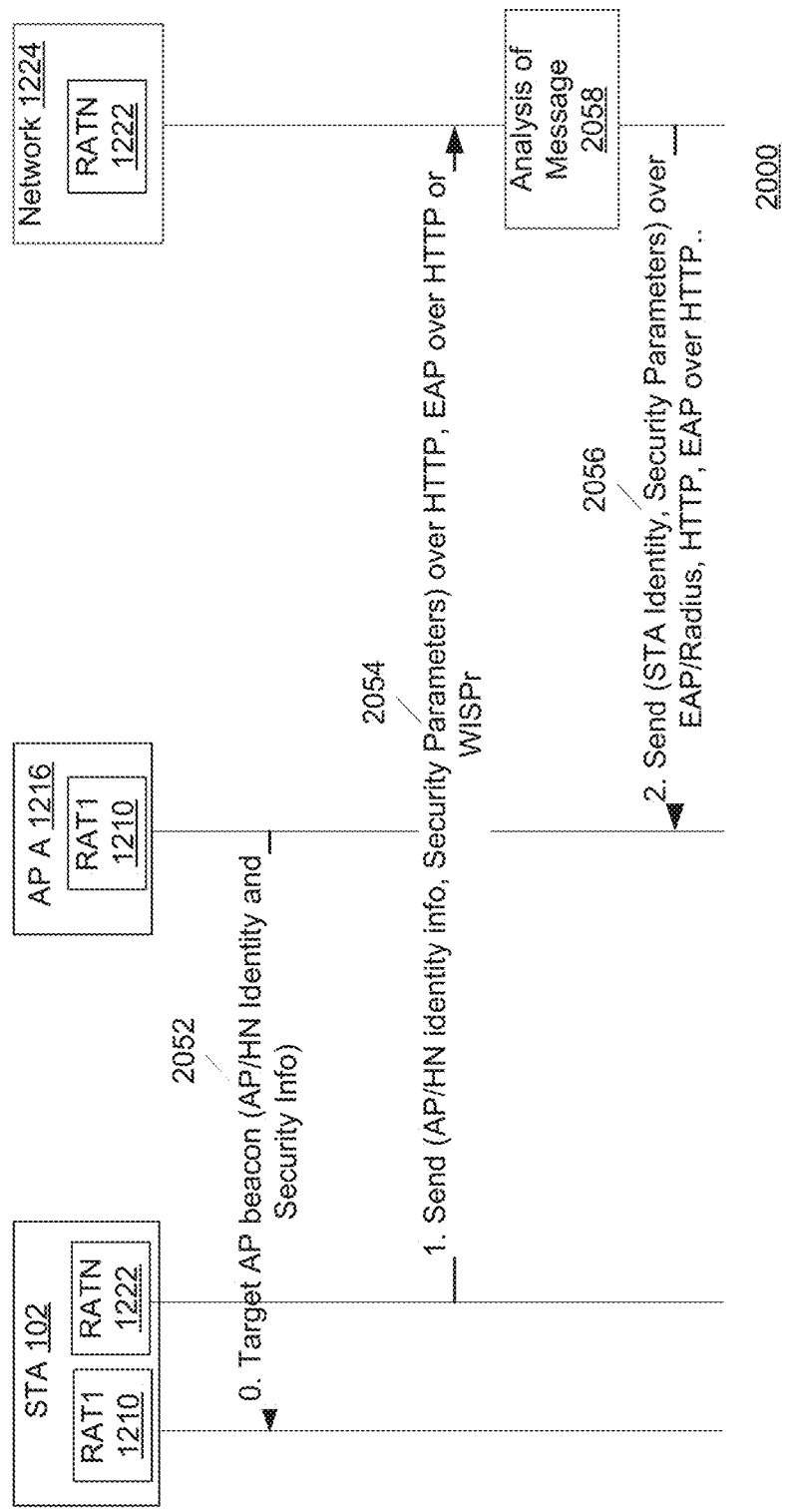
FIG. 20 illustrates a method for transporting identity and security capability information using a protocol according to some disclosed embodiments.

FIG. 20 schematically illustrates a method for transporting identity and security capability information using a protocol according to some disclosed embodiments. Illustrated in FIG. 20 is a STA 102, an AP-A 1216, and network 1224. RATN 1222 may be 3GPP/4GPP and there may be an existing 3GPP/4GPP connection between the STA 102 and the network 1224. In some embodiments, RATN 1222 may be a WLAN interface through an existing connection from a currently attached AP.

The STA 102 may receive information regarding the AP-A 1216 at 2052, which may be a beacon message, probe response message, or ANQP message. The STA 102 may send information, which may include information from message 2052, to the network 1224 at 2054. Message 2054 may be sent using HTTP, EAP over HTTP or WISPr, or another protocol. The network 1224 may analyze the received message 2054, and perform address resolution processes 2058. The network 1224 may then send message 2056 to AP-A 1216 which may include security parameters relating to the STA 102 using EAP/Radius, EAP over Hypertext Transfer Protocol (HTTP), Wireless Internet Service Provider Router (WISPr), or another suitable protocol.

FIG. 21 schematically illustrates a method for transporting identity and security capability information using a protocol according to some disclosed embodiments. Illustrated in FIG. 21 is a STA 102, an AP-A 1216, AP-B 1218, AP-C 1219, and network 1224. The method 2100 may perform parallel key generation and delivery. RATN 1216 may be 3GPP/4GPP and there may be an existing 3GPP/4GPP connection between the STA 102 and the network 1224. In some embodiments, RATN 1222 may be a WLAN interface through an existing connection from a currently attached AP.

The STA 102 may receive information from one or more APs. For example, STA 102 may receive messages 2152, 2154, and 2156, which may be receieve using different RATs and which may be beacons or response messages.

The STA 102 may perform an analysis of the message 2158. The STA 102 may then send information regarding one or more of the APs 1216, 1218, and 1219 to the network 1224 at 2160.

The network 1224 may receive the message 2160. The network 1224 may perform an analysis of the message 2160 at 2162, where the network 1224 may determine security parameters and associated lifetimes for one or more of the APs 1216, 1218, 1219. The network 1224 may send messages 2164, 2166, 2168 to one or more of the APs 1216, 1218, 1219, which may include information regarding the STA 102. The security parameters determined by the network 1224 may be uniquely bound to the STA 102 and AP 1216, 1218, 1219, in order to prevent rogue APs (not illustrated) from being able to decode communications between the STA 102 and one or more genuine APs 1216, 1218, 1219. The messages 2164, 2166, 2168 may be sent using a protocol such as EAP/Radius, HTTP, EAP over HTPP, or another protocol that may be available. The security parameters may be tied to previously established security parameters between the STA 102 and the network 1224. Some of the security parameters may be derivatives of previously derived security association such as PMKSA with associated keys MSK/PMK.

Figure 22:
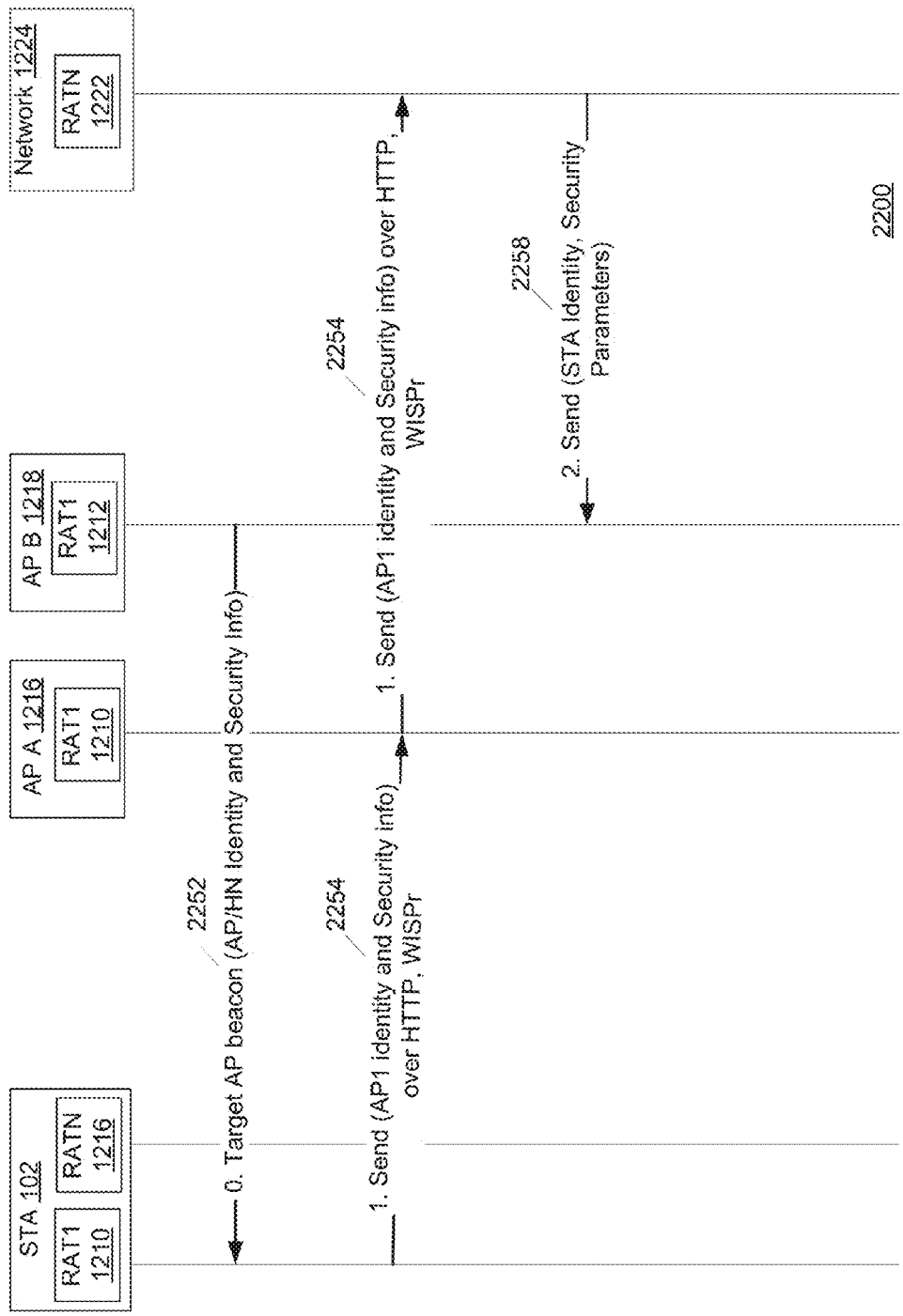
FIG. 22 illustrates a method for transporting identity and security capability information using a protocol according to some disclosed embodiments.

FIG. 22 schematically illustrates a method for transporting identity and security capability information using a protocol according to some disclosed embodiments. Illustrated in FIG. 22 is a STA 102, an AP-A 1216, AP-B 1218, and network 1224. The method 2200 may use an 802.x data connection. STA 102 may be associated with AP-A 1216.

In some embodiments, STA 102 may not have an existing 3GPP/4GPP association with the network 1224. The STA 102 may have a data connection with the network 1224 using an existing association with AP-A 1216. AP-A 1216 may used as a relay to transport message 2254 to the network 1224 using protocols such as HTTP, WISPr, EAP, or another suitable protocol. The network 1224 may send message 2258, which may include STA 102 related security parameters and identity to the AP-B 1218. The Security parameters are then used by the AP-B 1218 and STA 102 to establish PTK.

Figure 23:
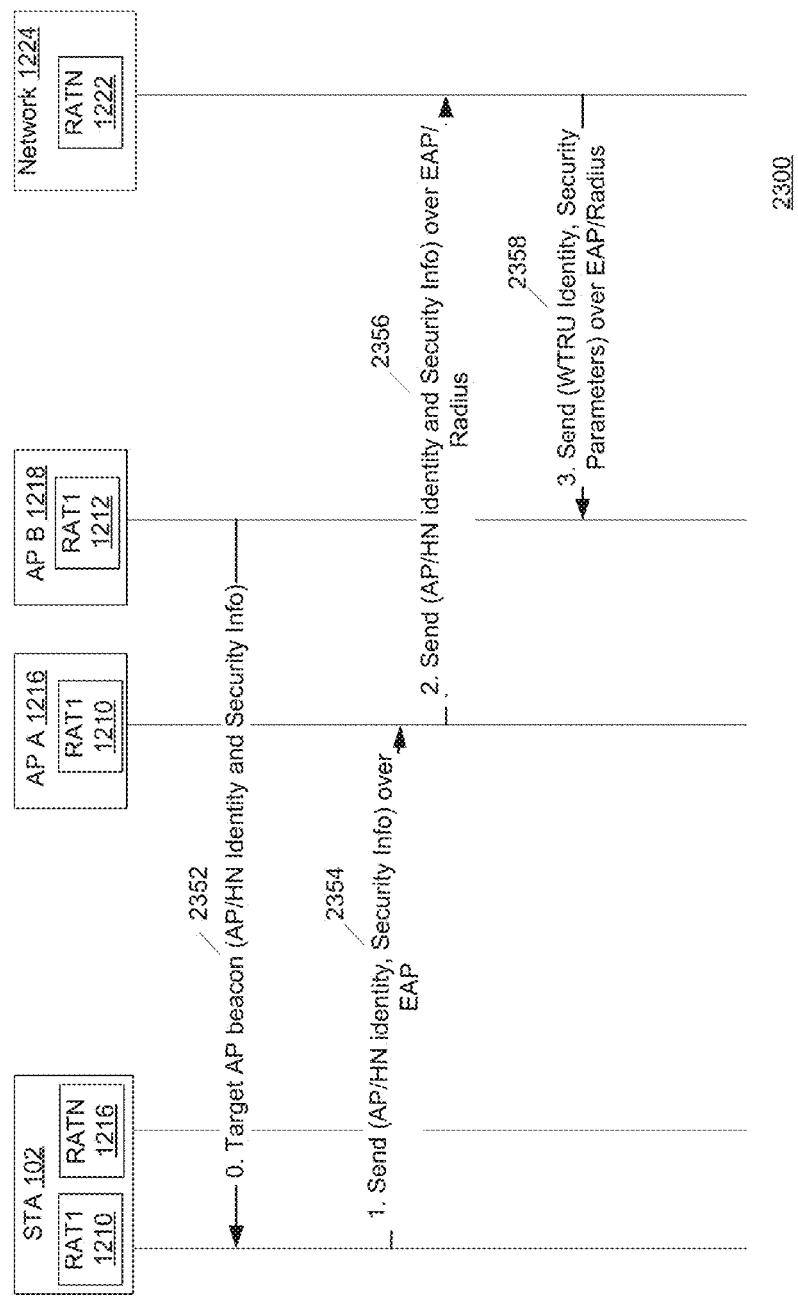
FIG. 23 illustrates a method for transporting identity and security capability information using a protocol according to some disclosed embodiments.

FIG. 23 schematically illustrates a method for transporting identity and security capability information using a protocol according to some disclosed embodiments. Illustrated in FIG. 23 is a STA 102, an AP-A 1216, AP-B 1218, and network 1224. The method 2300 may use an 802.x data connection using EAP. STA 102 may be associated with AP-A 1216.

The STA 102 receives information regarding AP-B 1218 at 2352. The STA 102 may use 802.x management connection using EAP, which may be transported over Radius to send AP-B 1218 information (meesages 2354, 2356) to the network 1224 through AP-A 1216. The STA 102 may use an existing association with AP-A 1216. The network 1224 may send a message 2358 including security parameters to AP-B 1218 using EAP.

Figure 24:
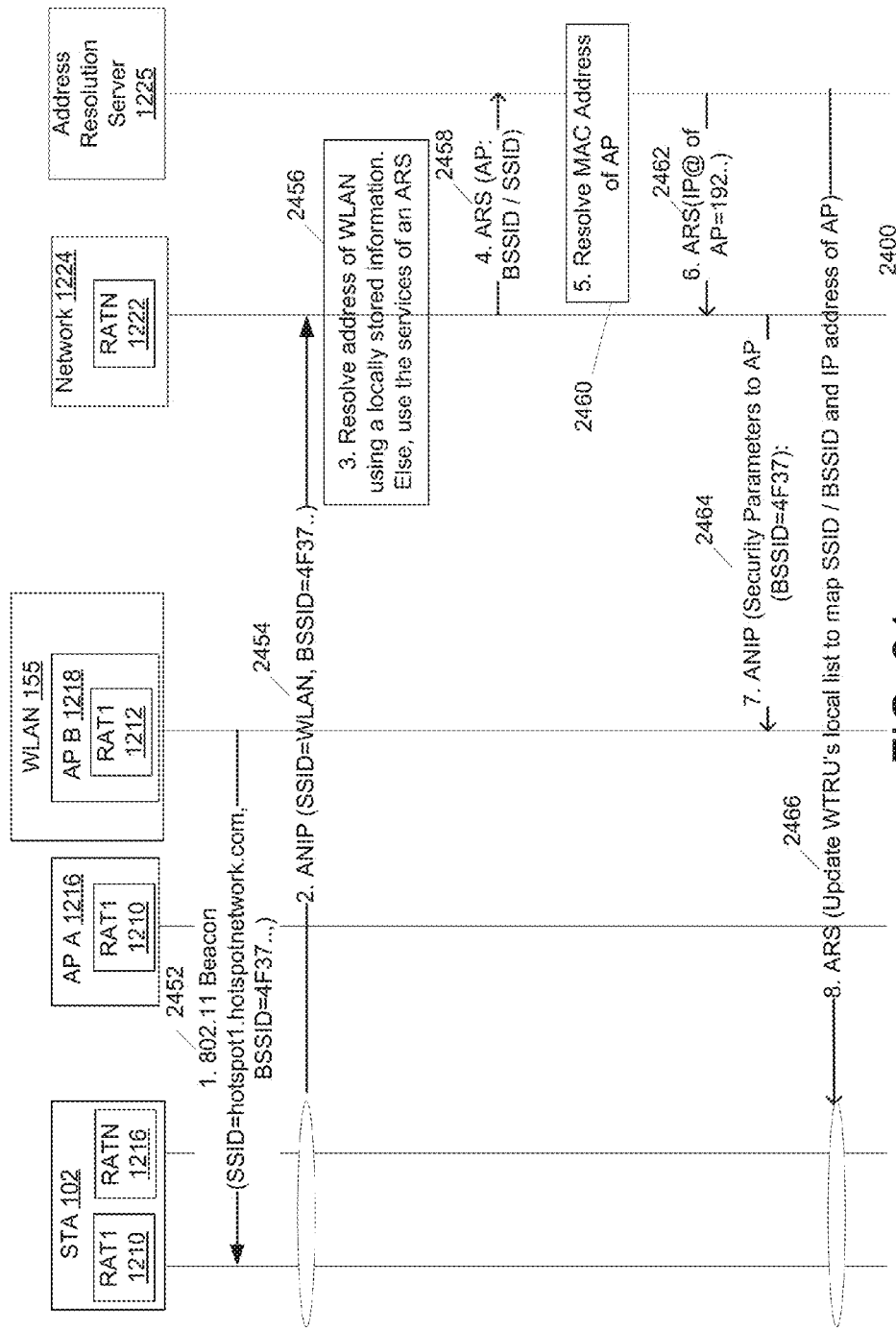
FIG. 24 illustrates a method for transporting identity and security capability information according to some disclosed embodiments.

FIG. 24 schematically illustrates a method 2400 for transporting identity and security capability information according to some disclosed embodiments. Illustrated in FIG. 24 is a STA 102, an AP-A 1216, AP-B 1218, an address resolution server 1225, and a network 1224. The address resolution server (ARS) 1225 may be part of network 1224. The ARS 1225 may be configured to provide functionality similar to an address resolution protocol (ARP) table. ARP may be used for converting a MAC-layer address to a higher-layer identity such as IPv4/IPv6 address, URL/URI etc. The ARS 1225 may have access to more resolution tables than an ARP table. The ARP 1225 may use a protocol that is TCP/UDP based to talk to other ARSs (not illustrated) that may be in the same domain or another domain to resolve MAC addresses to a network routable address and vice-versa. In some embodiments, the AP-B 1218 may provide a MAC-layer address that can be resolved on a global basis to a routable network address or a higher-layer domain information. For example http://www.xyz.com/authentication may be higher-layer domain information. Application-level discovery may then be carried out by the network 1224 using the Yadis® protocol or Simple Web Discovery® protocol, in order to communicate security information and security parameters over higher-layer protocols such as HTTP/HTTPS. In some embodiments, the ARS 1225 is a domain name server (DNS).

In some embodiments, AP-A 1216 may be part of the WLAN 155 as well as AP-B 1218 being part of the WLAN 155.

The method 2400 may begin with the STA 102 receiving a message 2452 from AP-B 1218. The message 2452 may include the BSSID of the AP-B 1218, and the SSID of the WLAN 155 or AP-B 1218. In some embodiments, the message 2452 includes an IP address of the WLAN 155 and/or AP-B 1218.

The method 2400 may continue with the STA 102 sending message 2454 to the network 1224 using one of the methods described herein. The message 2454 may be sent using the ANIP protocol described herein. The message 2454 may include the BSSID of AP-B 1218 and SSID of the WLAN 155 or AP-B 1218. The BSSID of the AP-B 1218 may be the MAC address of AP-B 1218. The method 2400 may continue with the network 1224 attempting to resolve the address of the WLAN 155 based on locally stored information 2456. If the network 1224 could not resolve the address then the network 1224 may send a message 2458 to the address resolution server 1225 to attempt to resolve the address using BSSID and SSID. The address resolution server 1225 may attempt to resolve the BSSID and SSID to an Internet routable IP address. The address resolution server 1225 may use another address resolution server (not illustrated) to attempt to resolve the address.

The address resolution server 1225 may then send a message 2462 to the network 1224 that includes the IP address of the WLAN 155 and/or AP-B 1218. The network 1224 then uses the IP address to send a message to the AP-B 1218 that include security parameters of the STA 102. In this way the network 1224 is able to send messages to the AP-B 1218 by resolving the BSSID and/or the SSID to an address that can be used to reach the AP-B 1218.

The address resolution server 1225 may send a message to the STA 102 that includes the IP address of the AP-B 1218 and/or WLAN 155 so that the STA 102 will be able to resolve the IP address of AP-B 1218 for future use. The STA 102 may cache the IP address of AP-B 1218 and at a later point in time when the STA 102 visits the same AP-B 1218, the ARS protocol may be avoided. The STA 102 may send the IP address of the AP-B 1218 directly to the Network 1224 after which the Network 1224 may send the security parameters of STA 102 to AP-B 1218 using the IP address provided by the STA 102.

The method 2400 may end. In some embodiments, the IP address may be to a WLG/AAA proxy 232 that the network 1222 may use to access the AP-B 1218.

In some embodiments, the method 2400 may include the network 1224 updating an Access Network Discovery and Selection Function (ANDSF) server (not illustrated) with the information received from the STA 102 and with the resolved address. In some embodiments, the method 2400 may update an ANDSF server and information on an STA 102. The ANDSF protocol may be used to provide discovery information to the STA 102. The STA 102 and network 1224 have knowledge of the APs location and SSID and possibly homogeneous SSID (HESSID) information. The network 1224 is able to use an address resolution server 1225 to locate the IP address of the APs 1216, 1218 in order to facilitate the sending of pre-established security association information to reduce the handover latencies. However, the STA 102 may encounter an AP-B 1218 that is currently not part of the of its policy profile. There may be no direct mechanism to notify the ANDSF server (not illustrated) that the new AP-B 1218 has come into range and should be considered as a handover candidate. In some embodiments, a solution to this problem is to send a new OMA DM generic alarm message to the network 1224 that alerts the ANDSF server that an ANDSF update is being requested due to an unidentified AP-B 1218 in range. The network 1224 would initiate the OMAD DM message query procedure to gather information about the AP-B 1218 that has been gathered by the STA 102. A new management object would be sent from the network 1224 to the STA 102 and the STA 102 would populate the access network information in the management object based on the information received in either the beacon or the probe response messages from the AP-B 1218. Thus, information regarding a new AP-B 1218 may be sent to the ANDSF server and the STA's 102 access network information may be updated. The new AP-B 1218 may be regarded as a candidate AP.

Figure 25A:
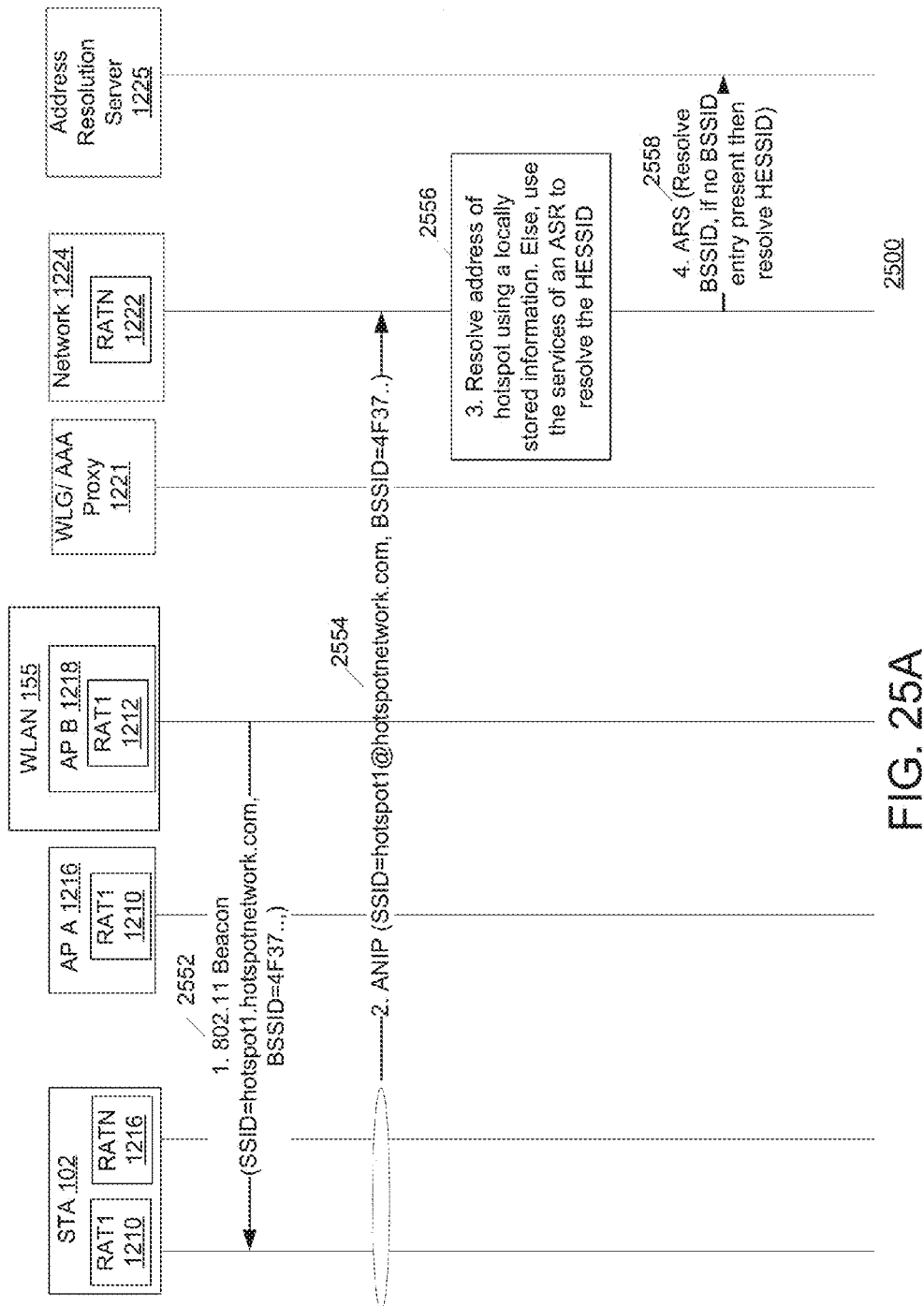
FIGS. 25A and 25B illustrate a method for transporting identity and security capability information according to some disclosed embodiments.
Figure 25B:
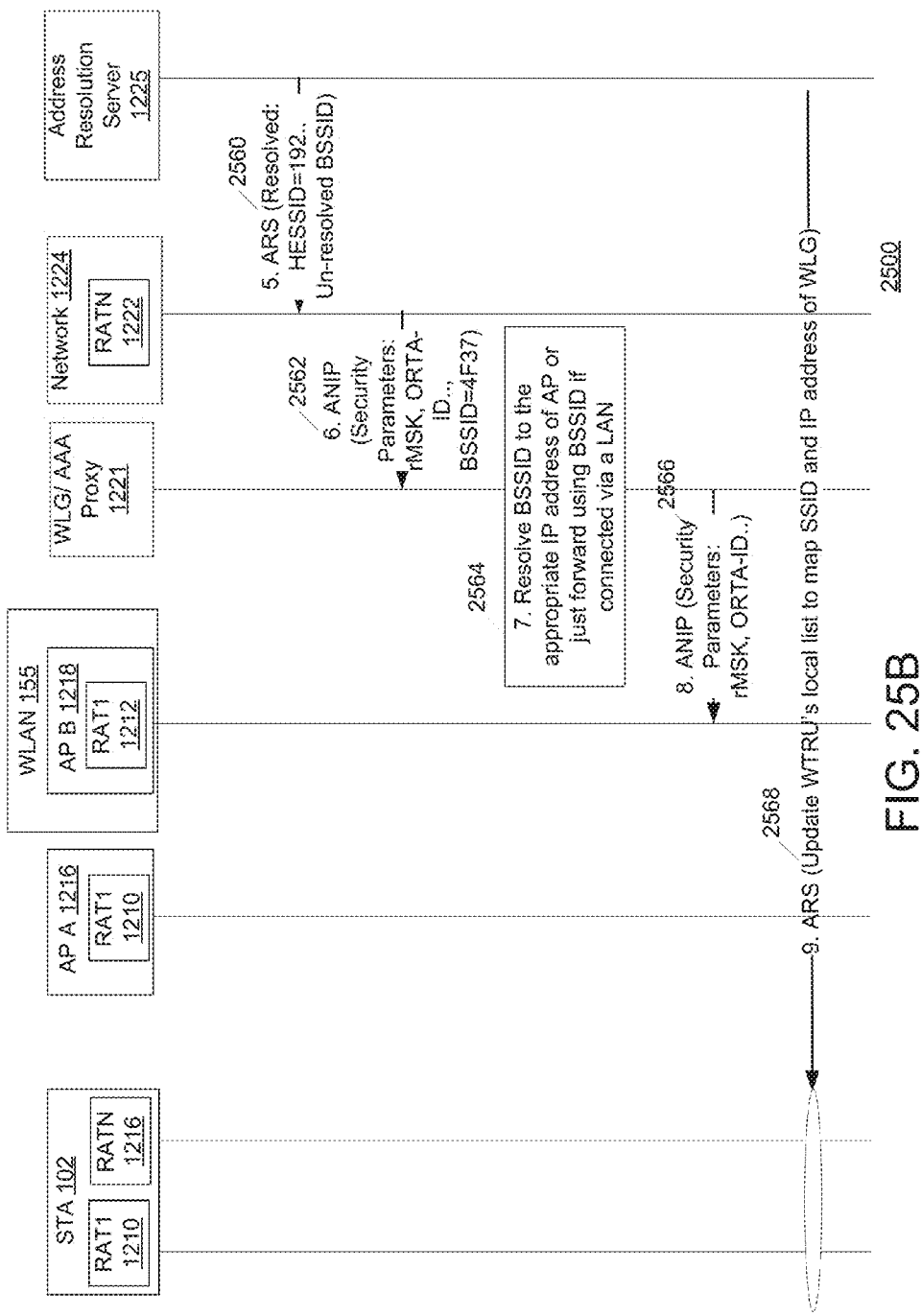

FIGS. 25A and 25B illustrate a method 2500 for transporting identity and security capability information according to some disclosed embodiments. Illustrated in FIGS. 25A and 25B are a STA 102, an AP-A 1216, AP-B 1218, WLAN 155, an address resolution server (ARS) 1225, WLG/AAA proxy 1221, and a network 1224. The network 1224 may include one or more of an authentication server (AS), offload server, and mobility server.

In some embodiments, the SSID of the APs 1216, 1218 may include one or more of the following fully qualified domain name (FQDN) information of the AP 1216, 1218 and/or WLAN 155, and HESSID type of information. The SSID of the APs 1216, 1218 may be in the form of a tracking area identify (TAT). The SSID may carry domain information, such as a FQDN of the WLAN 155. Inclusion of the HESSID to the beacon frame may be an addition to an 802.11u beacon frame.

The SSID is formulated in such a way that the FQDN associated with the hotspot network is properly represented. Then in conjunction with the BSSID, it is possible to discover the routable network address of the Hotspot network. The SSID may be of the form: hotspot1.hotspotnetwork.com (maximum of 32 bytes).

The method 2500 may begin with the STA 102 receives a beacon 2552 from an AP-B 1218. The beacon 2552 may have an SSID of the form: hotspot1@hotspotnetwork.com, where, hotspot1 is the identity of the WLAN 155 within a WLAN 155 network domain or realm "hotspotnetwork". This is similar to a FQDN and may be tailored to just provide domain information of the WLAN 155. The beacon may also include the MAC address (BSSID) of the AP-B 1218.

The method 2500 may continue at 2554 with the STA 102 provides the SSID and the MAC address (BSSID) of the AP-B 1218 to the network 1224. The STA 102 may be registered to the network 1224 and have an existing security association. The destination of the message 2554 may be an authentication/mobility/offload server or a combination thereof, all of which may be part of the network 1224.

The method 2500 may continue at 2556 with the network 1224 resolves the HESSID to obtain a routable IP address of the WLAN network. If the network 1224 cannot resolve the HESSID, then the network 1224 sends message 2558 to an ARS 1225.

The method 2500 may continue at 2558, if the network 1224 is not able to resolve the HESSID, then the network 1224 may send message 2558 to the ARS 1225, which may resolve the HESSID to either a domain address and/or a network routable address (IP address) of the WLAN network to which the AP-B 1218 belongs to.

The method 2500 may continue with the ARS 1225, which may be a DNS server in some embodiments, resolving the domain information to a network routable address, which may be an IPv4 or IPv6 address. If the ARS 1225 was not able to resolve the address, then the address resolution process may be delegated to secondary or external DNS servers. The resolved address may be cached at the network 1224 for future use.

The method 2500 may continue with the resolved address being sent back to the network at 2560.

The method 2500 may continue with the network 1224 sending the associated security parameters such as a re-authentication master session key (rMSK) (which may be derived from a previously established MSK/PMK), ORTA-ID (which may be a temporary ID of STA 102) for the STA 102 and the MAC address of the AP-B 1218 to which an association between the STA 102 and the AP-B 1218 may be performed. The message 2562 may be sent to a WLG/AAA-proxy 1221, which may be part of the WLAN 155 to with which the resolved HESSID address is associated.

The method 2500 may continue at 2564 with the WLG/AAA-proxy 1221 may perform a MAC table lookup to determine whether the AP-B 1218 is reachable via a WLAN 155, if not, then the BSSID is resolved to a network routable address such as an IPv4 or IPv6 address using the services of a local address resolution server (not illustrated).

The method 2500 may continue with The WLG/AAA-proxy 1221 delivering the security parameters such as the rMSK, ORTA-ID etc to AP-B 1218.

The method 2500 may optionally include the resolved address being sent to the STA 102 so that a mapping between the SSID of AP-B 1218 and the resolved address of the WLG/AAA-proxy may be stored. Storing the resolved address may be useful, if the STA 102 were to come within the range of AP-B 1218, or any AP that belonged to the same domain "realm", then it may just be enough to send the IP address of the domain controller (WLG/AAA-proxy) to the network. However, in some cases, an IP address may have a limited life time so that the network 1224 may need to perform an address translation to verify the IP address. It may be possible to associate a lifetime for the validity of the IP address mapping stored at the STA 102.

If the STA 102 has previously stored information regarding the mapping of SSID/BSSID to a unique WLAN 155 name or the IP of the AP-B 1218, then this may be sent to the network 1224 using the ANIP protocol, so that the whole address resolution process may not be needed.

Figure 26B:
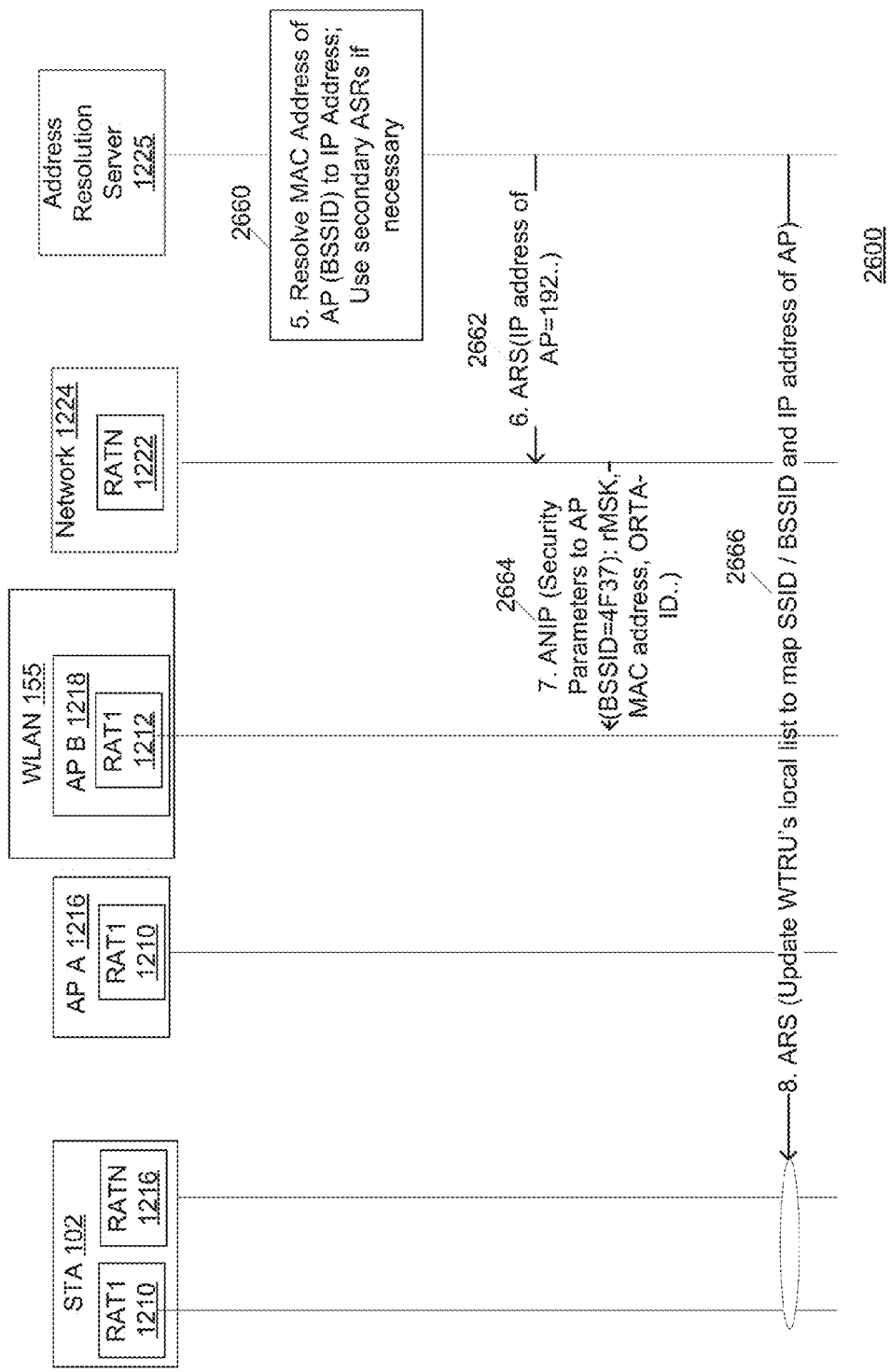

FIGS. 26A and 26B illustrate a method 2600 for transporting identity and security capability information according to some disclosed embodiments. Illustrated in FIGS. 26A and 26B are a STA 102, an AP-A 1216, AP-B 1218, WLAN 155, an address resolution server (ARS) 1225, and a network 1224. The network 1224 may include one or more of an authentication server (AS), offload server, and mobility server.

The method 2600 may be similar to method 2500, but the method 2600 may not include a WLG/AAA proxy 1221.

The method 2600 may begin with the STA 102 receiving a beacon 2652 from an AP-B 1218. The beacon 2652 may be similar to the beacon 2552.

The method 2600 may continue at 2654 with the STA 102 providing the SSID and the MAC address (BSSID) of the AP-B 1218 to the network 1224. The STA 102 may be registered to the network 1224 and have an existing security association. The destination of the message 2654 may be an authentication/mobility/offload server or a combination thereof, all of which may be part of the network 1224.

The method 2600 may continue at 2656 with the network 1224 resolving the HESSID to obtain a routable IP address. If the network 1224 cannot resolve the HESSID, then the network 1224 sends message 2658 to ARS 1225.

The method 2600 may continue at 2658, if the network 1224 is not able to resolve the HESSID, then the network 1224 may send message 2658 to the ARS 1225, which may resolve the HESSID to either a domain address and/or a network routable address (IP address).

The method 2600 may continue with the ARS 1225, which may be a DNS server in some embodiments, resolving the domain information to a network routable address, which may be an IPv4 or IPv6 address. If the ARS 1225 was not able to resolve the address, then the address resolution process may be delegated to secondary or external DNS servers. The resolved address may be cached at the network 1224 for future use.

The method 2600 may continue with the resolved address being sent back to the network at 2662.

The method 2600 may continue at 2664 with the network 1224 sending the associated security parameters such as a re-authentication master session key (rMSK), ORTA-ID (temporary ID of STA 102) for the STA 102 to AP-B 1218.

The method 2600 may at 2666 optionally include the resolved address being sent to the STA 102 so that a mapping between the SSID of AP-B 1218 and the resolved address of the WLG/AAA-proxy may be stored. Storing the resolved address may be useful, if the STA 102 were to come within the range of AP-B 1218, or any AP that belonged to the same domain "realm", then it may just be enough to send the IP address of the domain controller (WLG/AAA-proxy) to the network 1224.

In some embodiments, the SSID may include HESSID information. The SSID information may be configured such that a homogeneous SSID (HESSID) can be derived from the SSID. The backend network can then use the HESSID to perform address translation. An embodiment of an SSID comprising the HESSID information, could take the form: a modified SSID of 32 bytes may include a regular SSID that is condensed to, for example, 26 bytes, and 6 bytes for a HESSID.

The condensed SSID may be hash of the regular SSID, but ensures that within the domain/realm of the WLAN 155, the hashed SSID is unique.

In some disclosed embodiments, the SSID may be in the form of a tracking area identity. The SSID may be divided into a manner so that it can be used similar to a tracking area identity (TAI) similar to the approach used in mobile networks. The TAI is made up of mobile country code (MCC), mobile network code (MNC) and tracking area code (TAC). When the SSID is in the form of a TAI, then SSID may be unique. In some embodiments, the SSID may be of the following form. (1) MCC (1 byte), which may uniquely identifies a country. (2) MNC (2 Bytes), which may uniquely identify an operator and would permit approximately 65K operators. (3) TAC (1 byte). Hotspot ID (28 bytes, which would permit approximately 268 Million hotspot networks or WLANs 155. The hotspot ID may be a hash of the FQDN or a general SSID.

Optionally, the information in the SSID may be decoded into textual form by the STA 102, so that order that a user 222 (FIG. 2) or application is able to determine the appropriate SSID.

The SSID may be compressed. For example, IEEE 802.11ah, includes compressing the SSID. Beacon frames in IEEE 802.11ah may be a much shorter length than a regular frame in order to reduce the frame processing times at the STA 102. The SSID field may be as short as 4-bytes long in contrast to the standard 32-byte SSID specified in IEEE 802.11-2207. The SSID may be compressed using compression algorithms such as cryptographic hashing or a CRC check. However, the compression may cause collisions in SSID naming so that hotspot names may not be unique if the compression is used.

Appropriate compression algorithms (such exclusive (X)-OR folding, cyclic redundancy check (CRC), lightweight message digest algorithm (MD5), a secure hash algorithm (SHA), or other suitable compression algorithms) may reduce collisions. Alternatively, or additionally, SSIDs may be selected according to a format described herein to reduce collisions.

In some embodiments, collisions may be reduced by using a format for the SSID with mobile network vode (MNC) (2 bytes) as described above not being compressed, but compressing the Hotspot ID can be compressed so that a Unique Hotspot ID may be derived by the Hotspot Operator. In some embodiments, the SSID may be formatted as follows: (1) a MNC (2 Bytes), which uniquely identifies approximately 65,000 operators. (2) Hotspot ID (2 bytes), which would permit approximately 65,000 hotspot networks per operator.

In some embodiments, extended capabilities for network discovery are disclosed. In some embodiments, a new capability element called "Simple Network Discovery" (SND) in the extended capabilities may be used. The SND may be included in both broadcast and unicast message frames. The SND may provide specific fields for routing purposes.

FIG. 27 illustrates an embodiment of a capabilities information element 2700. In some embodiments, the beacon message may be modified. The beacon message may indicate support for various versions of 802.11 by configuration of an extended capabilities information element.

The capabilities information element may be a bit field indicating the capabilities being advertised. The Element ID field 2702 may be set to the value for extended capabilities, which in some embodiments is specified by 802.11. The value of the Length field 2704 may be equal to the number of octets in the capabilities field 2706. For example, if the AP 1216 is capable of interworking, the corresponding bit in the extended capabilities element 2700 may be set.

Table 1 illustrates indications of extended capabilities in a protocol messages. The simple network discovery (SND) 49 may be an additional indication that indicates that an AP 1216 station is capable of broadcasting a SND.

TABLE 1

Extended Capabilities Indications

| Bit | Information | Notes |
|---|---|---|
| 0 | 20/40 BSS | Coexistence Management |
| 1 | Reserved | |
| ... | | |
| 47 | Reserved | |
| 48 | UTF-8 SSID | The SSID in this BSS is interpreted using UTF-8 encoding |
| 49 | SND | If dot11SND (new configuration) enabled AP station is capable of broadcasting Simple Network Discovery (SND) elements |

FIG. 28 illustrates a SND information element 2800 according to some disclosed embodiments. The SND information element 2800 may contain one or more of the following AP Domain 2802, network access identifier (NAI) realm information 2804, and the HESSID 2806. The HESSID 2806 may be used to identify the MAC address of the Wireless LAN Gateway/AAA-proxy in hotspot network.

The elements that may be necessary for providing a routable address may include BSSID, HESSID 2806, AP Domain Name 2802, and NAI Realm 2804. The AP domain 2802 may provide a list of one or more domain names of the entity operating the IEEE 802.11 access network. The AP domain 2802 may be of variable length and contain a domain name compliant with the "Preferred Name Syntax" as defined in IETF RFC 1035. The SND information element 2800 may have a size limit of 255 octets. This limit implies the domain name must have a size limit of less than 253 octets and may be limited by the number of NAI Realm elements 2804 supported by the AP. The HESSID 2806 may be option. The HESSID 2806 may be broadcast in an Interworking element.

FIG. 29 illustrates an example of an NAI realm element 2900. The NAI realm element 2900 provides a list of network access identifier (NAI) realms corresponding to SSPs or other entities whose networks or services may be accessible via the AP. A list of one or more EAP Method subfields 2902, which that NAI realm 2904 uses for authentication, may be include with each NAI realm 2904.

Figure 30:
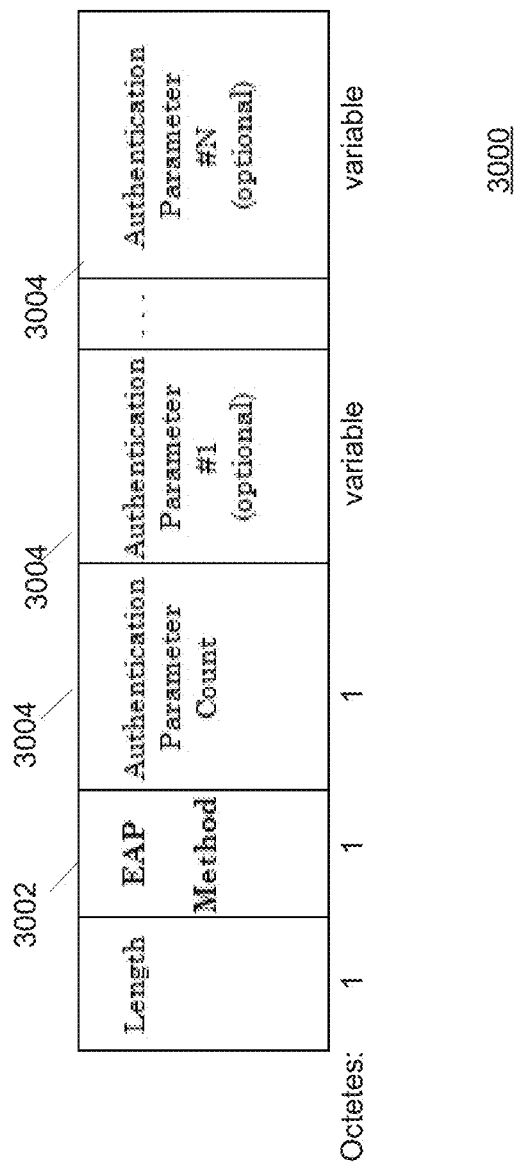
FIG. 30 is a diagram of the EAP Method subfield format.

FIG. 30 illustrates an example of an EAP Method element 3000. Each EAP Method subfield 3002 contains a set of authentication parameters 3004 associated with the EAP-Method 3002. The EAP method subfield 3002 is a 1-octet subfield that is set to the EAP type value as given in Internet Assigned Numbers Association (LANA) EAP method type numbers. A new re-authentication method could be included as a new EAP method 3002 and an associated standardized IANA number may be added. The SND information element 2800 in conjunction with the BSSID and/or HESSID 2806 may enable the discovery of a routable network address of the hotspot network.

In some embodiments, in addition to the traditional DNS-based protocols to discover the AP 1218 or WLG 1221 controller in the hotspot, a discovery process at the network 1224 may be carried out using the domain information using a protocol such as Simple Web Discovery (SWD), Appfinger, Trust Router or a higher-layer protocol such as HTTP.

Figure 31A:
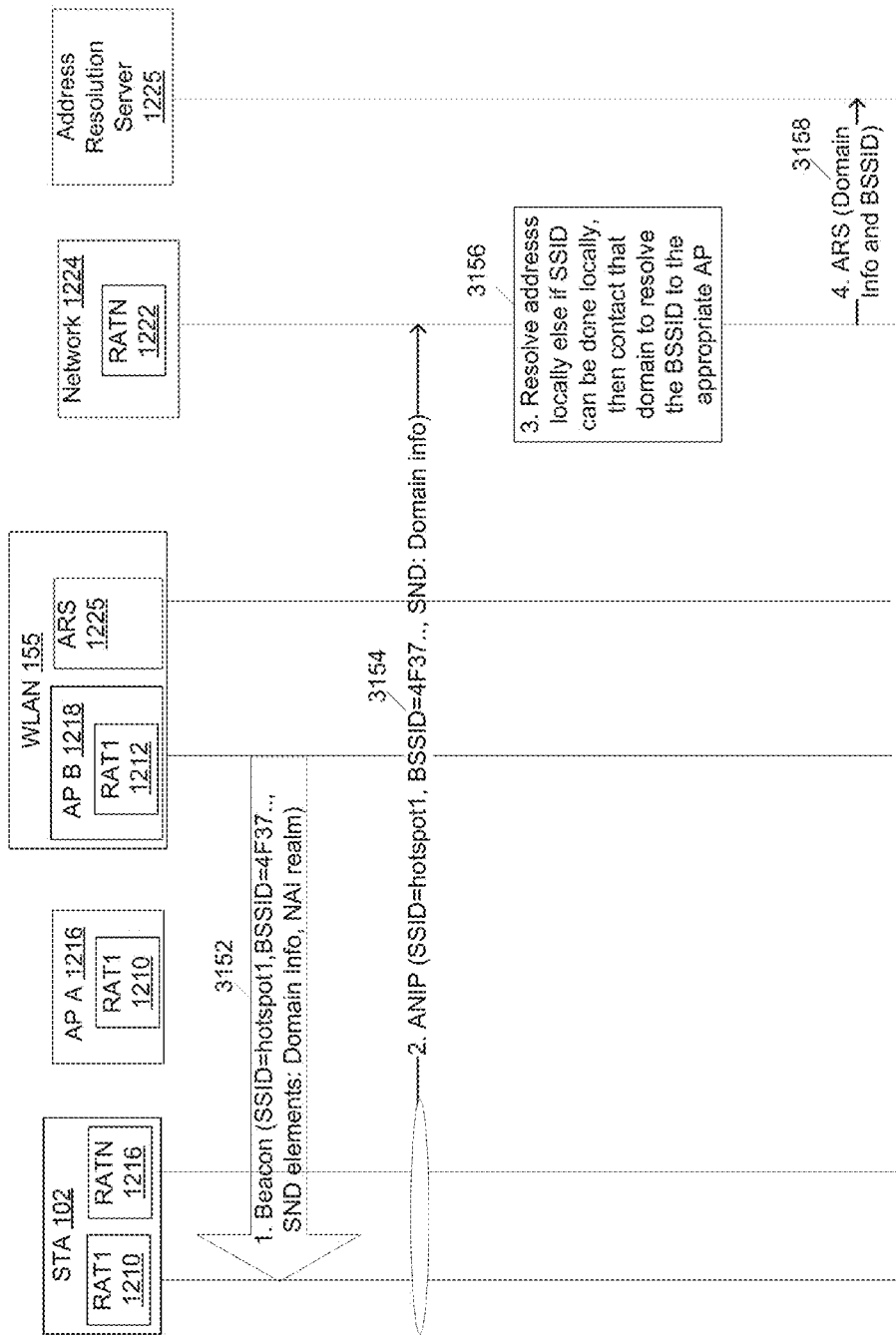
FIGS. 31A and 31B illustrate a method for transporting identity and security capability information where an enhanced beacon message may be used.
Figure 31B:
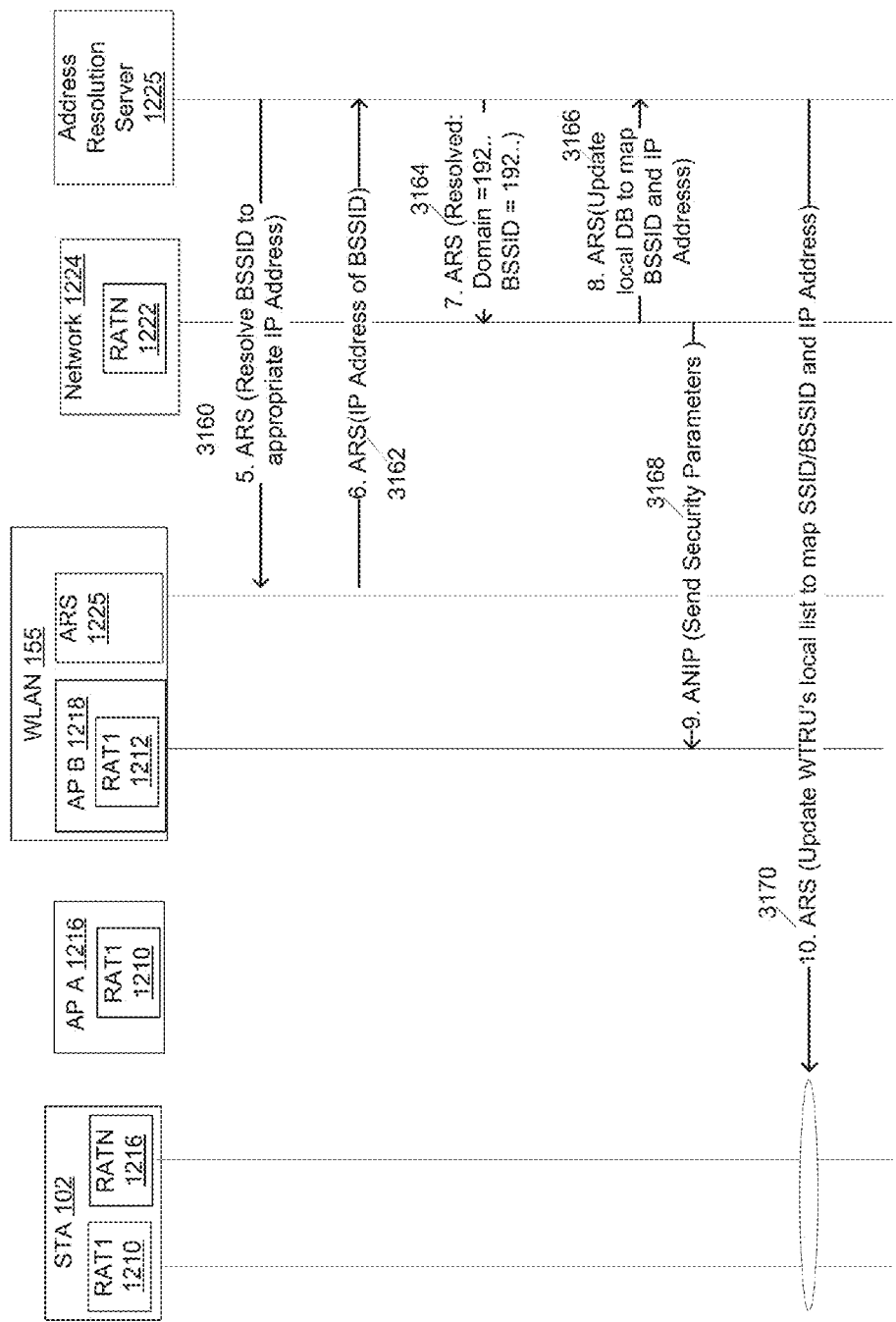

FIGS. 31A and 31B illustrate a method 3100 for transporting identity and security capability information where an enhanced beacon message may be used. Illustrated in FIGS. 31A and 31B are STA 102, AP-A 1216, AP-B 1218, WLAN 155, an address resolution server (ARS) 1225, and a network 1224. The network 1224 may include one or more of an authentication server (AS), offload server, and mobility server. The WLAN 155 may include an ARS 1225.

The method 3100 may begin with AP-B 1218 sending a beacon message to the STA 102. An enhanced beacon message 3152 may be used. The beacon message 3152 may include SND elements: domain info and NAI realm (see FIG. 28).

The method 3100 may continue with the STA 102 sending message 3154 to the network 1224. The message 3154 may be sent using ANIP to include the SND elements.

The method 3100 may continue at 3156 with the network 1224 using the domain information to resolve the address of AP-B 1218.

The method 3100 may continue at 3158 with the network 1224 sending a request to the ARS 1225. The request 3156 may include domain information from message 3154 and the BSSID of the AP 1218.

The ARS 1225 may be able to resolve the domain information using a DNS. If the ARS 1225 is not able to resolve the address of AP-B 1218, the method 3100 may continue at 3160 with the ARS 1225 contacting an ARS 1225 of the WLAN 155 with which the AP-B 1218 is associated to resolve the BSSID of AP-B 1218. Therefore the domain address is resolved by the ARS 1225 at the network 1225, while the BSSID of the AP-B 1218 is resolved by the ARS 1225 located or associated with the WLAN 155.

The ARS 1225 of WLAN 155 may return an appropriate reachable address such as an IP address of the BSSID.

In cases, where there are no business relationships between the Hotspot network and the Network (e.g. MNO/Cable), either a temporary relationship may be created using some form of Discovery and Association mechanism between the Network and Hotspot directly or via a broker, after which, the security parameters such as keys PMK/MSK/rMSK are transferred to the AP-B 1218.

The method 3100 may continue at 3164 with the ARS 1225 sending a domain of the BSSID. The method 3100 may continue at 3166 with the network 1224 instructing the ARS 1225 to update tables.

The method 3100 may continue at 3168 with the network 1224 sending the security parameters to the AP-B 1218. The network 1224 may use the ANIP protocol.

In some embodiments, the NAI information does not need to be transferred due to established 3GPP handover protocol if that the Hotspot is currently only supported by cellular operators. Since the STA 102 will have the ANSDF information available for the Hotspots currently supported by the operator of network 1224, the NAI information may be redundant. Not including the NAI information may reduce the amount of information to be broadcast.

Figure 32:
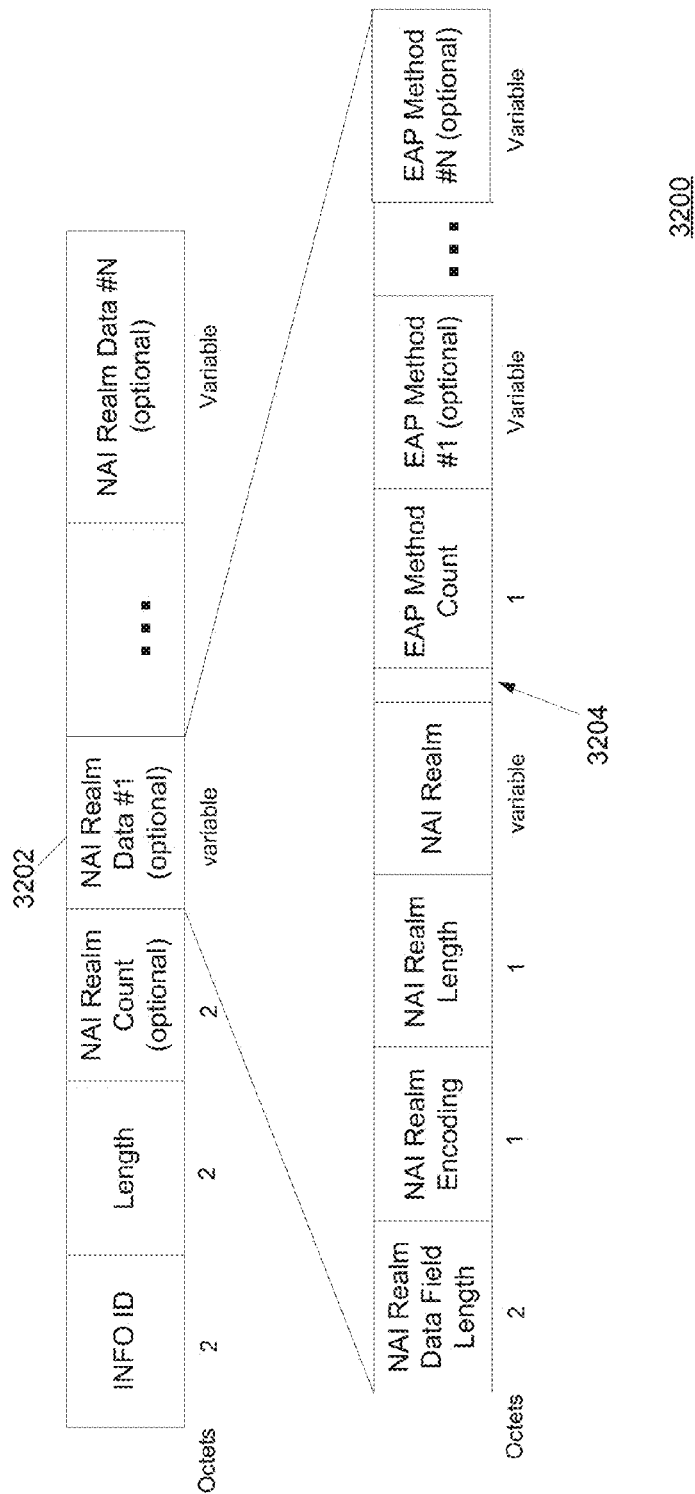
FIG. 32 is a diagram of an example of using a single bit of the EAP method count as an indicator of whether the AP or AAA server supports EAP-RP.

FIG. 32 illustrates an NAI Realm Data field enhancement by using single or multiple bits of the EAP method count octet as security capability indicators bits. Security capabilities of an AP and/or AAA server, the NAI Realm Data field 3202 may be enhanced by using a single or multiple bits of the EAP method count octet as a security capability indicators bits. A single bit of the EAP method count 3202 may be used as an indicator whether the AP and the AAA server support EAP-RP (bit set to 1) or it does not (bit set to 0).

Figure 33A:
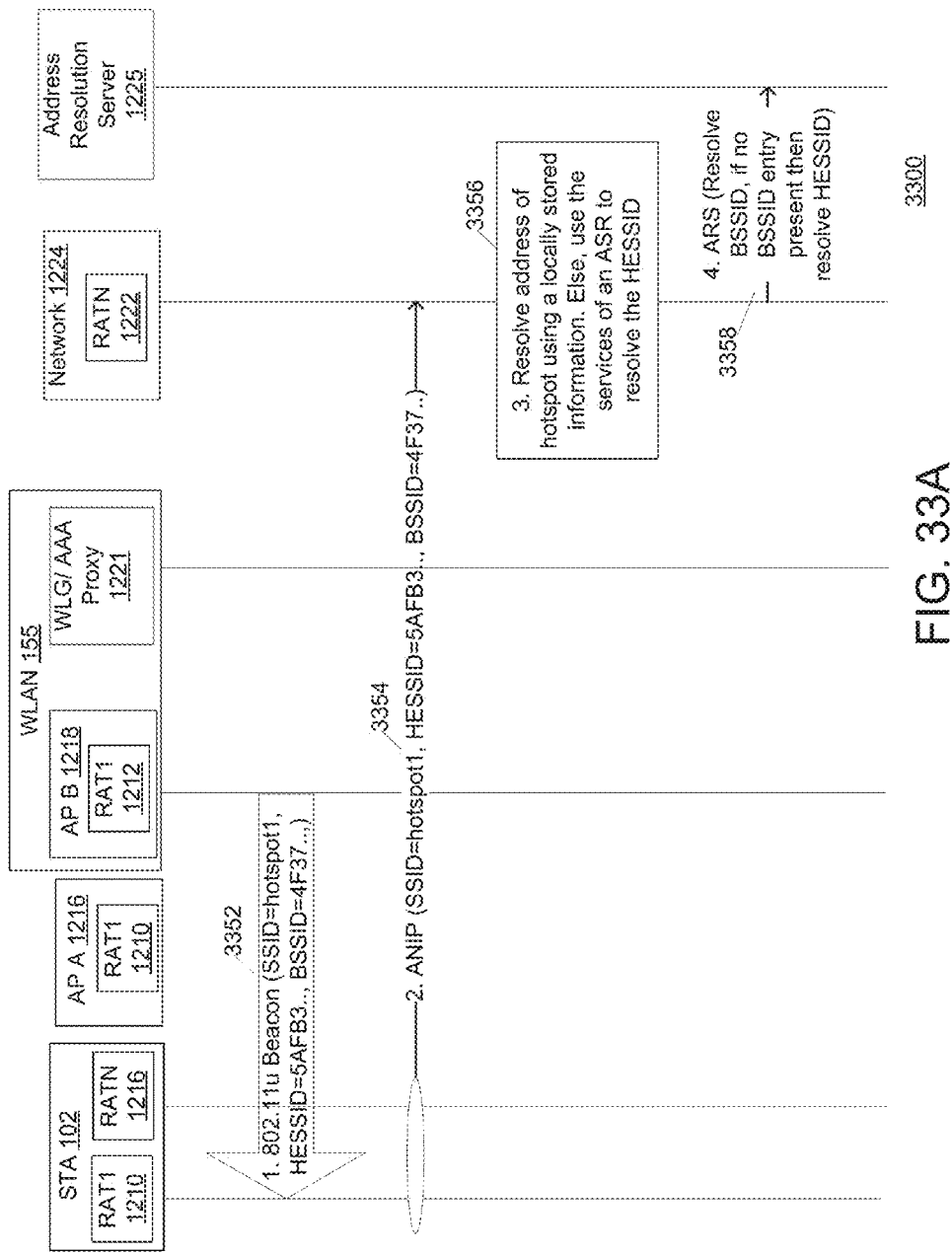
FIGS. 33A and 33B illustrate a method for transporting identity and security capability information according to some disclosed embodiments where an ARS may use an HESSID contained in a beacon to identify the WLAN.
Figure 33B:
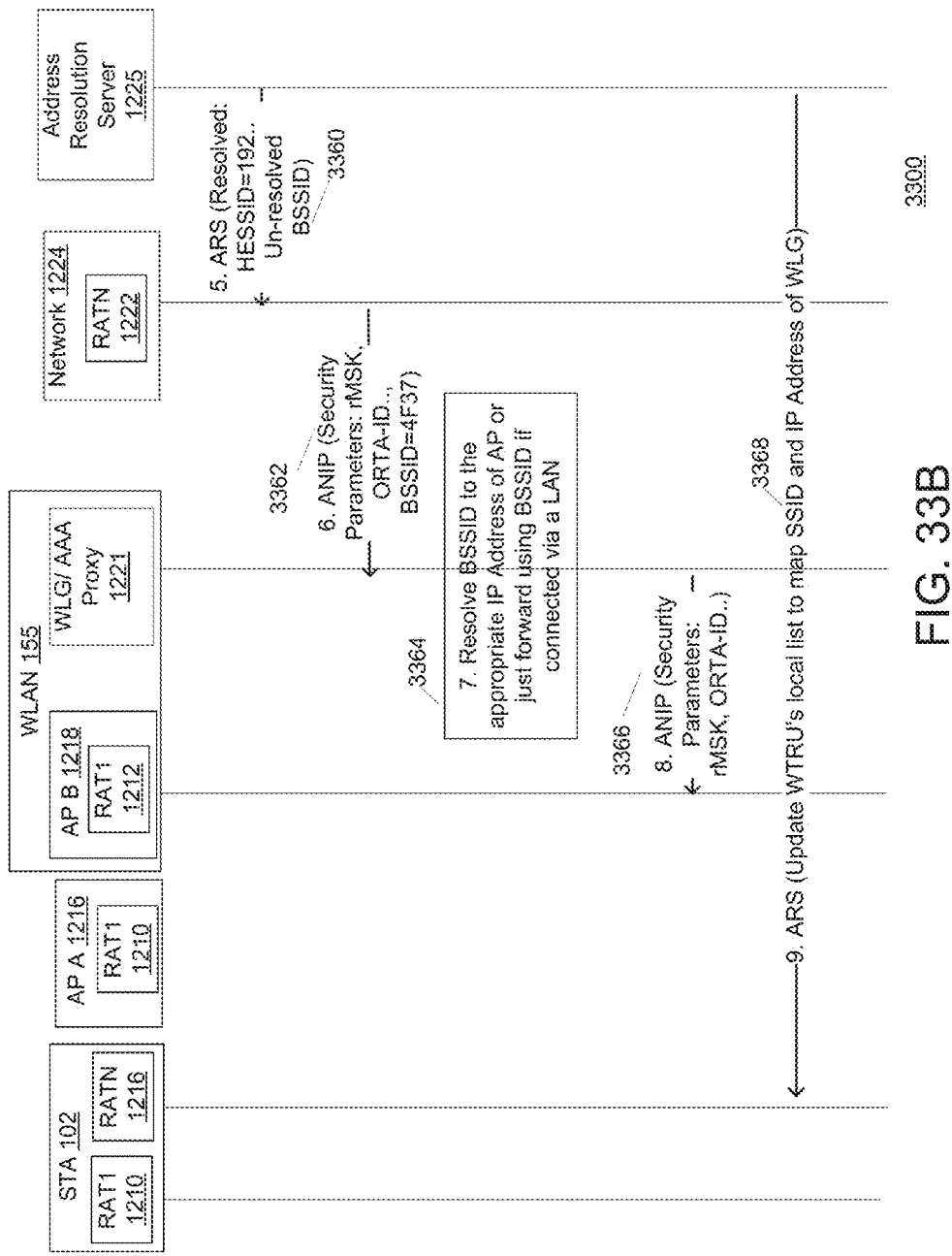

FIGS. 33A and 33B illustrate a method 330 0 for transporting identity and security capability information according to some disclosed embodiments where an ARS may use an HESSID contained in a beacon to identify the WLAN 155.

Illustrated in FIGS. 33A and 33B are a STA 102, an AP-A 1216, AP-B 1218, WLAN 155, an address resolution server (ARS) 1225, Wireless LAN Gateway (WLG)/domain controller 1221, and a network 1224. The network 1224 may include one or more of an authentication server (AS), offload server, and mobility server. The WGL/AAA proxy 1221 may be part of the network domain of the WLAN 155.

HESSID information may be carried within a beacon frame. The beacon frame may be an 802.11u beacon frame. In an enhancement to the 802.11u frame, the Homogeneous SSID (HESSID) may be included within the 802.11u beacon frame. The HESSID may be a 48 bit identity that may be a MAC address of one of the APs within the WLAN 155. The HESSID may be used by the ARS 1225 to identify the right WLAN 155.

The method 3300 may begin at 3352 with the STA 102 receiving a beacon from an AP-B 1218. The beacon may be an 802.11u beacon. The beacon may include a regular SSID that may not have information on the reachability of the WLAN 155 network from an external network 1224. The modified beacon may contain the HESSID of AP-B 1218, which may indicate the unique MAC-level identity of the WLAN 155 and the MAC address of the AP-B 1218.

The method 3300 may continue at 3354 with the STA 102 sending the SSID, HESSID and the MAC address (BSSID) of AP-B 1218 to the network 1224 using ANIP message. The network 1224 may be a cable and/or network operator to which the STA 102 is registered and has an existing security association using ANIP. The destination of the message 3354 may be one or more of an authentication server, mobility server, or offload server.

The method 3300 may continue with the network 1224 resolving the HESSID to a domain name or to a network routable address of the domain. If the server is not able to resolve the HESSID, then the method 3300 may continue at 3358 with the network 1224 contacting an ARS 1225 or a modified DNS server, which may have the capability to resolve HESSID to a domain address and/or a network routable address such as an IP address.

The method 3300 may continue with the ARS 1225 or DNS server resolving the domain information to a network routable address, which may be an IPv4 or IPv6 address.

The method 3300 may continue at 3360 with the resolved address being sent back to the network 1224. If a primary DNS or ARS server was not able to resolve the address, then the address resolution process may be delegated to secondary or external DNS servers. The resolved address may also be cached at the network 1224 for future use.

The method 3300 may continue at 3362 with the network 1224 sending the associated security parameters such as a re-authentication master session key (rMSK), which may be based on a previously established MSK/PMK, ORTA-ID (temporary ID of STA 102) for the STA 102 and the MAC address of the AP-B 1218 to which an association between the STA 102 and the AP-B 1218 is expected. The target of the message 3362 may be the WLG/AAA proxy 1221 within the WLAN 155 to which the resolved HESSID address is associated with.

The method 3330 may continue at 3364 with the WLG/AAA proxy 1221 may perform a MAC table lookup to determine whether the AP-B 1218 is reachable via a local area network, if not, then the BSSID is resolved to a network routable address such as an IPv4 or IPv6 address using the services of an address resolution server.

The method 3300 may continue at 3366 with the WLG/AAA-proxy 1221 delivering the security parameters such as the rMSK, ORTA-ID etc to the AP-B 1218.

The method 3300 may continue at 3368 with the resolved address may be sent to the STA 102, so that a mapping between the SSID of AP-B 1218 and the resolved address of the WLG/AAA-proxy 1221 may be stored for later use. The stored mapping may be useful to the STA 102, if the STA 102 comes within range of the same AP-B 1218, or another AP that belonged to the same domain realm as AP-B 1218. Then the STA 102 may send the stored IP address of the domain controller WLG/AAA-proxy 1221 to the network 1224. The may avoid the need to perform address resolution. However, the mapped IP address may be stale. A lifetime for the validity of the IP address mapping within the STA 102 and within the network 1224 may be determined.

Alternatively or additionally, if the STA 102 has previously stored information regarding the mapping of SSID/BSSID of AP-B 1218 to a unique WLAN 155 network name or IP address of the AP-B 1218, then this information may be sent to the network 1224 using 3354.

In some embodiments, a STA 102 may use information obtained using Access Network Query Protocol (ANQP) from an AP 1218 to obtain a routable address for the AP 1218. The STA 102 may obtain the domain name and authentication information from an ANQP query process and send the received information to the network 1224. The network 1224 may use the information to reach the AP 1218.

In some embodiments, enhancements for security capability discovery are disclosed. In some embodiments, enhancements are disclosed to information that is advertised by a WLAN.

FIG. 34 illustrates a robust security network (RSN) information element (RSNE) 3400. The RSNE 3400 may be broadcast in the beacon and probe response messages by an AP 1218 if the AP 1218 is configured to support robust security network associations (RSNA). The RSNE 3400 indicates the security configuration for a particular AP 1218. The RSNE 3400 may include one or more of authentication and pairwise cipher suite selectors, a single group data cipher suite selector, an RSN Capabilities field, the PMK identifier (PMKID) count, a PMKID list, and a single group management cipher suite selector. The size of the RSNE 3400 may be limited by the size an element may, which in some embodiments is 255 octets. The version field may indicate the version number of the RSNA protocol.

In the IEEE 802.11i RSN specification, to be an RSN security network, the security network must use the 4-way handshake to create a robust security network association (RSNA). The RSN specification provides two RSNA data confidentiality and integrity protocols, TKIP and CCMP, with implementation of CCMP being mandatory.

FIG. 35 illustrates a suite selector 3500 which may have the format as illustrated in Table 2.

TABLE 2

Cipher Suite Selectors

| OUI | Suite type | Meaning |
| --- | --- | --- |
| 00-0F-AC | 0 | Use group cipher suite |
| 00-0F-AC | 1 | WEP-40 |
| 00-0F-AC | 2 | TKIP |
| 00-0F-AC | 3 | Reserved |
| 00-0F-AC | 4 | CCMP - default pairwise cipher suite and default group cipher suite for data frames in an RSNA |
| 00-0F-AC | 5 | WEP-104 |
| 00-0F-AC | 6 | BIP-default group management cipher suite in an RSNA with management frame protection enabled |
| 00-0F-AC | 7 | Group addressed traffic not allowed |
| 00-0F-AC | 8-255 | Reserved |
| Vendor OUI | Other | Vendor-specific |
| Other | Any | Reserved |

The cipher suite selector 00-0F-AC:4 (CCMP) may be the default cipher suite value.

Table 3 illustrates a new authentication type. The new authentication type may be used to indicate whether the AP is re-authentication protocol capable and may indicate the type of protocol for re-authentication. For example, one of EAP-RP, EAP-FAST, EAP-ORTA may be indicated as the re-authentication protocol. As illustrated in Table 3, an entry for authentication type may be defined as "RP negotiated over 802.1x" with "suite type" 10. The selector value 00-0F-AC:1 may specify only that IEEE Std 802.1X-2004 may be used as the authentication transport. IEEE Std 802.1X-2004 may select the authentication mechanism.

TABLE 3

AKM Suite Selectors

| | | Meaning | | |
| --- | --- | --- | --- | --- |
| OUI | Suite type | Authentication type | Key management type | Key derivation type |
| 00-0F-AC | 0 | Reserved | Reserved | Reserved |
| 00-0F-AC | 1 | Authentication negotiated over IEEE 802.1X or using PMKSA caching as defined in 11.5.9.3 - RSNA default | RSNA key management as defined in 11.6 or using PMKSA caching as defined in 11.5.9.3 - RSNA default | Defined in 11.6.1.2 |
| 00-0F-AC | 2 | PSK | RSNA key management as defined in 11.6, using PSK | Defined in 11.6.1.2 |
| 00-0F-AC | 3 | FT authentication negotiated over IEEE 802.1X | FT key management as defined in 11.6.1.7 | Defined in 11.6.1.7.2 |

TABLE 3-continued

AKM Suite Selectors

| | | Meaning | | |
|---|---|---|---|---|
| OUI | Suite type | Authentication type | Key management type | Key derivation type |
| 00-0F-AC | 4 | FT authentication using PSK | FT key management as defined in 11.6.1.7 | Defined in 11.6.1.7.2 |
| 00-0F-AC | 5 | Authentication negotiated over IEEE 802.1X or using PMKSA caching as defined in 11.5.9.3 with SHA256 Key Derivation | RSNA Key Management as defined in 8.5 or using PMKSA caching as defined in 11.5.9.3, with SHA256 Key Derivation | Defined in 11.6.1.7.2 |
| 00-0F-AC | 6 | PSK with SHA256 Key Derivation | RSNA Key Management as defined in 11.6 using PSK with SHA256 Key Derivation | Defined in 11.6.1.7.2 |
| 00-0F-AC | 7 | TDLS | TPK Handshake | Defined in 11.6.1.7.2 |
| 00-0F-AC | 8 | SecurID Authentication Engine (SAE) Authentication with SHA-256 or using PMKSA caching as defined in 11.5.9.3 with SHA-256 key derivation | RSNA key management as defined in 11.6, PMKSA caching as defined in 11.5.9.3 with SHA256 key derivation or authenticated mesh peering exchange as defined in 13.5 | Defined in 11.6.1.7.2 |
| 00-0F-AC | 9 | FT authentication over SAE with SHA-256 | FT key management defined in 11.6.1.7 | Defined in 11.6.1.7.2 |
| 00-0F-AC | 10 | RP negotiated over 802.1x | RP authentication used | Defined in 11.6.1.7.2 |
| 00-0F-AC | 11-255 | Reserved | Reserved | Reserved |
| Vendor OUI | Any | Vendor-specific | Vendor-specific | Vendor-specific |
| Other | Any | Reserved | Reserved | Reserved |

In some embodiments, the beacon information carried may include AP's Capability to perform Perfect Forward Secrecy (PFS), IBE, and Public/Private key. In some embodiments, the beacon information carried may include cryptographic suite supported. In some embodiments, the beacon information carried may include security posture information, which may provide qualitative or quantitative information about the level of security assurance of the AP or WLAN. In some embodiments, the beacon information carried may include URI to an AP's certificate. In some embodiments, the beacon information carried may include uniform resource identifier (URI) to the hotspot network's or the WLAN network's detailed assurance information.

In some embodiments, the probe response or ANQP may include an AP Nonce for each STA. In some embodiments, the probe response or ANQP may include a public key of an AP used in case of PFS.

FIG. 36 illustrates a RSN IE 3600 with an AKM suite list according to some disclosed embodiments. In some embodiments, the RSN IE 3600 may be modified to provide additional information in a regular probe response or beacon message. For example, one of the reserved RSN capabilities bits 3602 may be used to indicate the security capability for an AP and AAA server to use. For example one of the reserved RSN capabilities bits 3602 may be used to indicate the AP and AAA sever support EAP-RP.

In some embodiments, enhancements to information advertised by a network operator are disclosed. In some embodiments, the ANDSF information provided by a network 1224 to a STA 102 includes one or more of the following parameters. (1) AP's capability to perform perfect forward secrecy (PFS): IBE, Public/Private key. (2) Cryptogrpahic suite supported by AP. (3) Security posture information, which may provide qualitative or quantitative information about the level of security assurance of the AP or WLAN. (4) AP Nonces for that STA 102. (5) Public Key of AP Used in case of PFS. (6) IPv4 or IPv6 address that a STA 102 can use once authenticated. And, (7) IPv6 network Prefix information of the AP/HN network.

The ANDSF protocol may be used to perform parallel key generation and delivery as described here. The STA 102 may be capable of processing and inferring ANDSF information.

In some embodiments, a method of fast security setup on a multi-RAT wireless transmit/receive unit (WTRU) of establishing secure communications between a first RAT of the WTRU and a first access point (AP) may comprise determining security parameters for the WTRU to use for the secure communications using the first RAT with the first AP. The method may include authenticating the WTRU with the first AP.

Authenticating may generate a pairwise master key (PMK). The method may include determining temporal keys to use for the secure communication. The method may include using at least one of: the determined security parameters, the PMK, or the determined temporal keys, for establishing secure communications between a second RAT of the multi-RAT WTRU and at least one of the first AP or a second AP.

Determining temporal keys may include the WTRU and the first AP exchanging information using at least one of the second RAT of the WTRU and a third RAT of the WTRU; the WTRU receiving a group temporal key (GTK) from the AP encoded using a pairwise temporal key (PTK) created by the AP using at least some of the exchanged information; the WTRU using at least some of the exchanged information to create the PTK; and the WTRU sending an acknowledgement to the AP of the received GTK.

The method may include WTRU installing the determined security parameters for the second RAT; and wherein the first RAT and the second RAT have a same media access control (MAC) address.

The method may include the WTRU installing the created PMK for the second RAT; and the WTRU deriving a PTK for the second RAT using the PMK and using information received from the first AP.

Determining temporal keys may include determining a pairwise temporal key (PTK) from the PMK and information received from the first AP.

Using may include installing the determined PTK on both the first RAT and the second RAT, wherein the first RAT and the second RAT have the same media access control (MAC) address.

Determining temporal keys may include receiving a global temporal key (GTK) from the first AP and using may include installing the received GTK on both the first RAT and the second RAT.

Installing may include using an opportunistic multi-MAC aggregation (OMMA) to install the GTK in a protocol stack of the second RAT. At least one of the first access point and the second access point may be WTRUs.

The method of may include storing the PMK in a cache associated with an identification (PMKID); disassociating from the first access point; sending an association request to the first RAT including the PMKID; receiving an indication from the first access point that the PMKID is valid; and establishing a security setup with the first RAT using the PMK.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media.

Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for fast security setup for use in a wireless transmit/receive unit (WTRU) capable of supporting multiple radio access technologies (RATs), the method comprising:
    associating, by the WTRU, with a first access point access point (AP) associated with a first RAT;
    authenticating, by the WTRU, with a network associated with the first AP, wherein the authenticating generates a master key stored by the WTRU and stored by the network;
    discovering, by the WTRU, a second AP associated with a second RAT;
    sending, by the WTRU, identity information of the second AP to the network via the first AP; and
    using, by the WTRU, the master key for establishing secure communications with the second AP.

2. The method of claim 1, further comprising:
    discovering that the second AP supports a third RAT;
    associating the master key with a corresponding third RAT protocol stack of the WTRU; and
    deriving a pairwise temporal key (PTK) for the third RAT using the master key and using information received from the second AP via the third RAT.

3. The method of claim 2, further comprising:
    authenticating with the second AP using the third RAT and the PTK.

4. The method of claim 1, wherein the network is at least one of: a private network, a private network with guest access, a chargeable public network, a free public network, or a service provider network, and wherein the authenticating is performed at an application layer of the network, and wherein the second RAT is an 802.11 type network.

5. A wireless transmit/receive unit (WTRU) capable of supporting multiple radio access technologies (RATs), the WTRU comprising:
    a first transceiver configured to associate with a first access point access point (AP) associated with a first RAT, and to authenticate with a network associated with the first AP;
    at least one storage configured to store a master key associated with the authentication of the WTRU with the network;
    a second transceiver configured to discover a second AP associated with a second RAT;
    wherein the first transceiver is further configured to transmit identity information of the second AP to the network via the first AP; and
    wherein the second transceiver is further configured to use the master key for establishing secure communications with the second AP.

6. The WTRU of claim 5, wherein the second transceiver is further configured to discover that the second AP supports a third RAT, further comprising:
    a processor configured to associate the master key with a corresponding third RAT protocol stack, and to derive a pairwise temporal key (PTK) for the third RAT using the master key and using information received from the second AP via the third RAT.

7. The WTRU of claim 6, further comprising:
    a third transceiver configured to authenticate with the second AP using the third RAT and the PTK.

8. The WTRU of claim 5, wherein the network is at least one of: a private network, a private network with guest access, a chargeable public network, a free public network, or a service provider network, and wherein the authenticating is performed at an application layer of the network, and wherein the second RAT is an 802.11 type network.

* * * * *